(12) United States Patent
Kimura et al.

(10) Patent No.: US 10,567,016 B2
(45) Date of Patent: Feb. 18, 2020

(54) TRANSMISSION DEVICE, RECEPTION DEVICE, TRANSMISSION METHOD, AND RECEPTION METHOD

(71) Applicant: Panasonic Intellectual Property Corporation of America, Torrance, CA (US)

(72) Inventors: Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/270,930

(22) Filed: Feb. 8, 2019

(65) Prior Publication Data

US 2019/0173502 A1    Jun. 6, 2019

Related U.S. Application Data

(63) Continuation of application No. PCT/JP2017/027831, filed on Aug. 1, 2017.

(60) Provisional application No. 62/374,227, filed on Aug. 12, 2016.

(51) Int. Cl.
*H04B 1/04* (2006.01)
*H04B 1/10* (2006.01)

(52) U.S. Cl.
CPC .............. *H04B 1/0475* (2013.01); *H04B 1/10* (2013.01)

(58) Field of Classification Search
CPC ................................. H04B 1/0475; H04B 1/10
See application file for complete search history.

(56) References Cited

U.S. PATENT DOCUMENTS

| 5,642,397 | A  | * | 6/1997 | Agbaje-Anozie | ...... | H04B 1/713 340/7.24 |
| 9,960,944 | B2 | * | 5/2018 | Park | ...................... | H04L 1/0048 |
| 2014/0153615 | A1 | * | 6/2014 | Park | ...................... | H04L 1/0041 375/150 |

FOREIGN PATENT DOCUMENTS

CA         2 940 700         9/2015

OTHER PUBLICATIONS

International Search Report (ISR) dated Oct. 17, 2017 in International (PCT) Application No. PCT/JP2017/027831.

(Continued)

*Primary Examiner* — Jaison Joseph
(74) *Attorney, Agent, or Firm* — Wenderoth, Lind & Ponack, L.L.P.

(57) ABSTRACT

A transmission device includes a first mapper, a second mapper, a converter, a superposer, and a transmitter. The first mapper is configured to map a first bit stream of a first data series to generate a first modulated symbol stream. The second mapper is configured to map a second bit stream of a second data series to generate a second modulated symbol stream. The first modulated symbol stream and the second modulated symbol stream are representable on a complex plane extending in a first direction and a second direction. The converter is configured to convert the second modulated symbol stream in accordance with the first modulated symbol stream only in the first direction on the complex plane. The superposer is configured to superpose the first modulated symbol stream and the second modulated symbol stream converted by the converter, at an amplitude ratio, to generate a multiplexed signal.

26 Claims, 30 Drawing Sheets

(56) References Cited

OTHER PUBLICATIONS

Seokhyun Yoon, et al., "Performance of Superposition Coded Broadcast/Unicast Service Overlay System", IEICE Trans. Commun., vol. E91-B, No. 9 Sep. 2008, pp. 2933-2939.
Thomas M. Cover, "Broadcast Channels", IEEE Transactions on Information Theory, vol. IT-18, No. 1, Jan. 1972, pp. 2-14.
J. Zoellner, et al., "Optimization of High-order Non-uniform QAM Constellations", IEEE International Symposium on Broadband Multimedia Systems and Broadcasting, Jun. 2013.
Extended European Search Report dated Aug. 2, 2019 in corresponding European Patent Application No. 17839277.5.

* cited by examiner

TRANSMISSION DEVICE, RECEPTION DEVICE, TRANSMISSION METHOD, AND RECEPTION METHOD

CROSS REFERENCE TO RELATED APPLICATIONS

This application is a U.S. continuation application of PCT International Patent Application Number PCT/JP2017/027831 filed on Aug. 1, 2017, claiming the benefit of priority of U.S. Provisional Patent Application No. 62/374,227 filed on Aug. 12, 2016, the entire contents of which are hereby incorporated by reference.

BACKGROUND

1. Technical Field

The present disclosure relates to a transmission device, a reception device, a transmission method, and a reception method.

2. Description of the Related Art

A multiplexing scheme utilizing superposition coding is known as a scheme to multiplex and send a plurality of data series (Seokhyun YOON and Donghee KIM, Performance of Superposition Coded Broadcast/Unicast Service Overlay System, IEICE Transactions on Communications, vol. E91-B, No.9). Other known multiplexing schemes include time division multiplexing and frequency division multiplexing (Thomas M. Cover, Broadcast Channels, IEEE Transactions on Information Theory, vol. IT-18, No.1).

Compared to time division multiplexing and frequency division multiplexing, the multiplexing scheme utilizing superposition coding is suited to multiplexing a plurality of data series that are required to have different levels of noise tolerance (receiver tolerance). The multiplexing scheme utilizing superposition coding is also termed as layer division multiplexing. The multiplexing scheme utilizing superposition coding applied to multiple access is also known as non-orthogonal division multiple access (NOMA).

In the multiplexing scheme utilizing superposition coding, a transmission device superposes a plurality of modulated symbols, which are obtained by modulating each of a plurality of data series, using predetermined power allocation, and transmits the superposed modulated symbols. A reception device sequentially demodulates the modulated symbols that are multiplexed by superposition coding, starting with modulated symbols in a layer with high noise tolerance until the completion of demodulating modulated symbols in a layer to which a desired data series belongs.

More specifically, the reception device demodulates the modulated symbols in a layer with the highest noise tolerance to estimate a data series. When a desired data series is yet to be estimated, the reception device generates a replica of each modulated symbol from another data series that has been estimated to cancel the replica from the received signal, and demodulates modulated symbols in a layer with the second highest noise tolerance to estimate another data series. The reception device repeats these processes until the desired data series is estimated.

SUMMARY

According to an aspect of the present disclosure, a transmission device includes a first mapper, a second mapper, a converter, a superposer, and a transmitter. The first mapper is configured to map a first bit stream of a first data series to generate a first modulated symbol stream. The second mapper is configured to map a second bit stream of a second data series to generate a second modulated symbol stream. The first modulated symbol stream and the second modulated symbol stream are representable on a complex plane extending in a first direction and a second direction perpendicular to the first direction. The converter is configured to convert the second modulated symbol stream in accordance with the first modulated symbol stream only in the first direction on the complex plane. The superposer is configured to superpose the first modulated symbol stream and the second modulated symbol stream converted by the converter, at an amplitude ratio, to generate a multiplexed signal. The transmitter is configured to transmit the multiplexed signal.

Further merits and advantageous effects in one aspect of the present disclosure will become apparent from the following description and drawings. These merits and advantageous effects are provided by the characteristics described in the following description and drawings. However, not all of these merits and advantageous effects are required to be provided, and thus one or more of these merits and advantageous effects may be provided by one or more of the characteristics described in the description and drawings.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
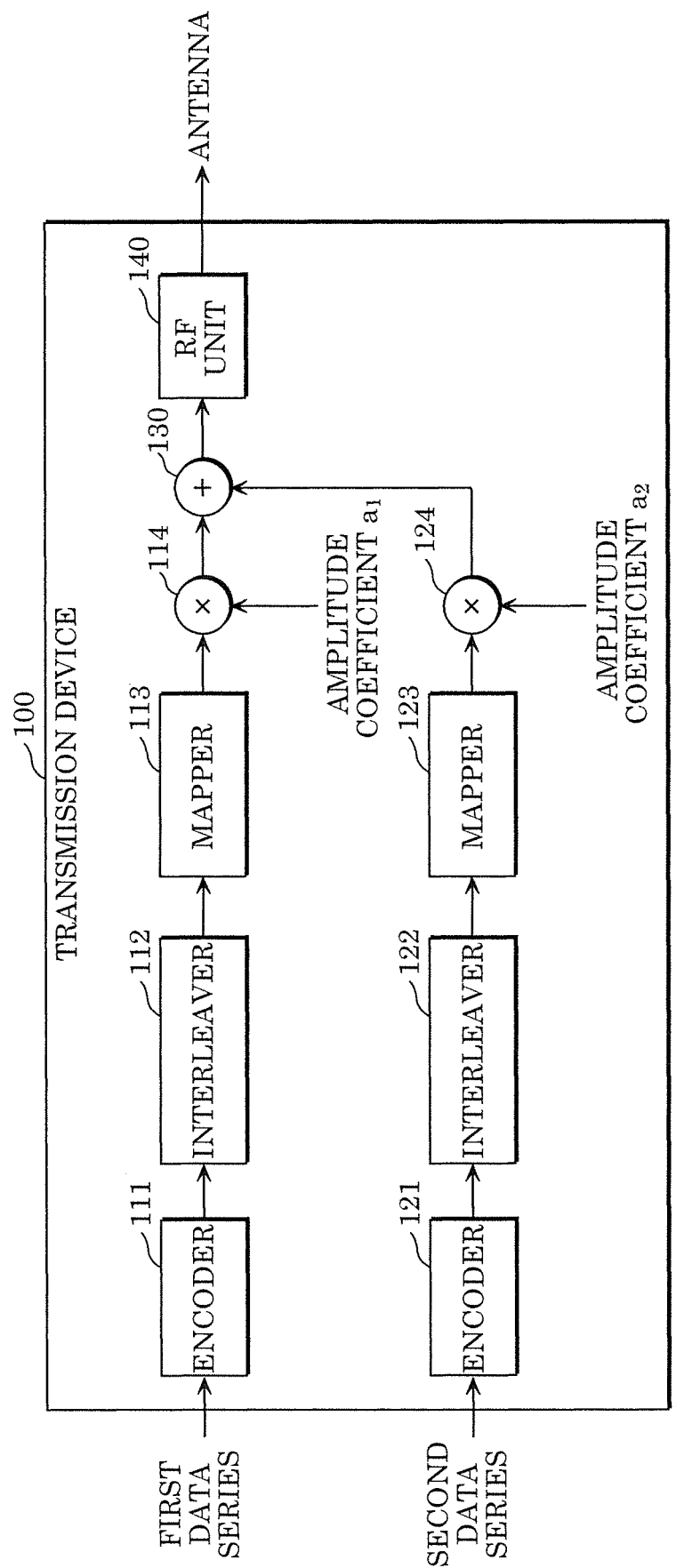
FIG. 1 is a block diagram of an example configuration of a transmission device according to Embodiment 1.

In some cases, the multiplexing scheme utilizing superposition coding fails to efficiently process a plurality of data series.

For example, the multiplexing scheme utilizing superposition coding is subjected to processing delays due to the process that requires sequential decoding of a plurality of multiplexed data series. Furthermore, the multiplexing scheme utilizing superposition coding requires the reception device to include an arithmetic resource, etc. for re-modulating a forward decoded data series. The reception device is also required to include a memory resource, etc. for holding received symbols used to decode the subsequent data series, from when the previous data series is decoded and re-modulated until when a modulated symbol stream of the previous data series is obtained.

Moreover, the multiplexing scheme utilizing superposition coding may suffer a decrease in transmission capacity due to a plurality of superposed data series affecting each other.

The present disclosure provides exemplary embodiments that solve the above-described problems involved in the multiplexing scheme utilizing superposition coding. The present disclosure, however, also provides an aspect that solves not completely but partially the above-described problems, or an aspect that solves a problem different from the above-described problems.

The following describes in detail the embodiments according to the present disclosure with reference to the drawings. Note that the following embodiments, etc. show a comprehensive or specific illustration of the present disclosure. The numerical values, shapes, materials, structural components, the arrangement and connection of the structural components, steps, the processing order of the steps, etc. shown in the following embodiments, etc. are mere examples, and thus are not intended to limit the present disclosure. Of the structural components described in the following embodiments, etc. structural components not recited in any one of the independent claims that indicate the broadest concepts of the present disclosure will be described as optional structural components.

Also note that encoding may mean error control coding. Error control coding is also referred to as error-correcting coding. Also, decoding may mean error control decoding. Error control decoding is also referred to as error-correcting decoding or error correction. Also, unknown may mean undetermined, and transmission may mean sending.

Embodiment 1

The present embodiment describes multiplexing a plurality of data series onto a plurality of layers by a multiplexing scheme utilizing superposition coding, and transmitting the multiplexed data series.

To simplify the description without loss of generality, the present embodiment and other embodiments describe an example in which two data series are multiplexed onto two different layers to be transmitted. However, the multiplexing scheme described in the present embodiment and other embodiments is applicable to three or more data series multiplexed onto three or more different layers to be transmitted.

Also, the present embodiment and other embodiments use a first layer to which a first data series belongs as a layer with higher noise tolerance than a second layer to which a second data series belongs.

FIG. 1 shows an example configuration of transmission device 100 that multiplexes two data series onto two layers by superposition coding, and transmits the multiplexed data series. The configuration and operation of transmission device 100 will be described with reference to FIG. 1.

Transmission device 100 includes encoder 111, interleaver 112, mapper 113, multiplier 114, encoder 121, interleaver 122, mapper 123, multiplier 124, adder 130, and radio frequency unit (RF unit) 140. These structural components may also be implemented as dedicated or general-purpose circuits. Multiplier 114, multiplier 124, and adder 130 can also be represented collectively as a superposer. RF unit 140 can also be represented as a transmitter. RF unit 140 may include an antenna.

Encoder 111 encodes an inputted first data series on the basis of a first error control coding scheme to generate a first bit stream. Interleaver 112 permutes the bits in the first bit stream generated by encoder 111 on the basis of a first permutation rule. Such permutation is also referred to as interleaving.

Mapper 113 maps the first bit stream permuted by interleaver 112 in accordance with a first mapping scheme (a first modulation scheme) to generate a first modulated symbol stream that includes a plurality of first modulated symbols. In the mapping in accordance with the first mapping scheme, mapper 113 maps each group of bits that includes a first number of bits in the first bit stream onto one of the signal points in a first constellation, in accordance with the values of such a group of bits.

Encoder 121 encodes an inputted second data series on the basis of a second error control coding scheme to generate a second bit stream. Interleaver 122 permutes the bits in the second bit stream generated by encoder 121 on the basis of a second permutation rule. Such permutation is also referred to as interleaving.

Mapper 123 maps the second bit stream permuted by interleaver 122 in accordance with a second mapping scheme (a second modulation scheme) to generate a second modulated symbol stream that includes a plurality of second modulated symbols. In the mapping in accordance with the second mapping scheme, mapper 123 maps each group of bits that includes a second number of bits in the second bit stream onto one of the signal points in a second constellation, in accordance with the values of such a group of bits.

When a mapping scheme used is PSK modulation such as BPSK and QPSK, or QAM modulation such as 16QAM and 64QAM, each modulated symbol can be represented by a complex number, for example, with the real part representing the magnitude of the in-phase component and the imaginary part representing the magnitude of the orthogonal component. Meanwhile, when a mapping scheme used is PAM modulation, each modulated symbol can be represented by a real number.

Multiplier 114 multiplies each first modulated symbol in the first modulated symbol stream by first amplitude coefficient $a_1$. Multiplier 124 multiplies each second modulated symbol in the second modulated symbol stream by second amplitude coefficient $a_2$. Adder 130 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 140 sends the generated superposed modulated symbol stream as a signal. More specifically, RF unit 140 generates, from the superposed modulated symbol stream generated by adder 130, a radio-frequency signal as a signal corresponding to the superposed modulated symbol stream to send such a radio-frequency signal from the antenna.

Stated differently, the superposer constituted by multiplier 114, multiplier 124, and adder 130 superposes the first modulated symbol stream and the second modulated symbol stream at a predetermined amplitude ratio, thereby generating a multiplexed signal into which the first data series and the second data series are multiplexed. Subsequently, RF unit 140 sends the multiplexed signal. Note that the multiplexed signal corresponds to the superposed modulated symbol stream. Also note that the predetermined amplitude ratio may be 1:1, and that the multiplication may be omitted.

Figure 2:
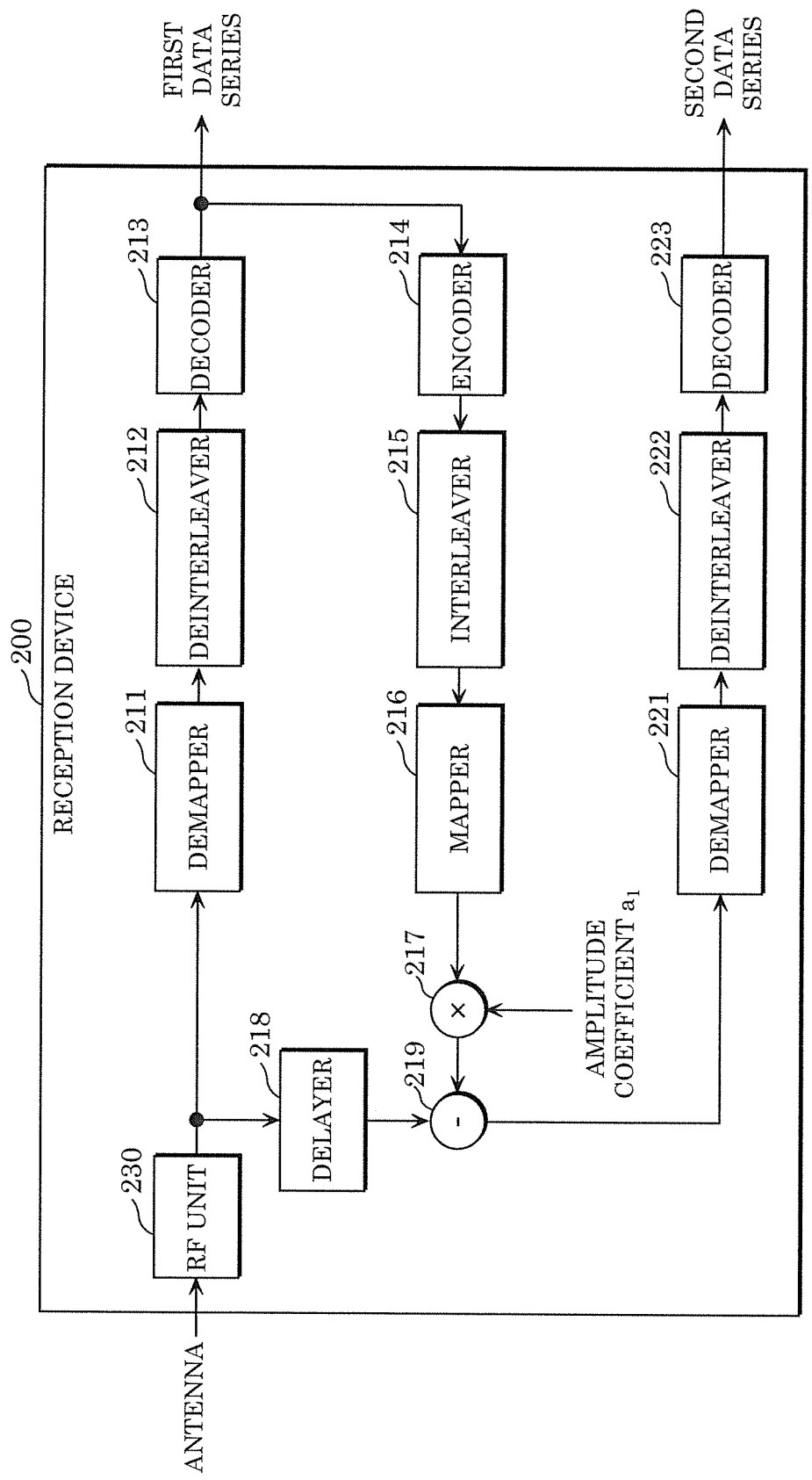
FIG. 2 is a block diagram of an example configuration of a reception device according to Embodiment 1.

FIG. 2 shows an example configuration of reception device 200 capable of receiving and sequentially decoding the signal on which two data series are multiplexed onto two layers by superposition coding, and capable of obtaining (extracting) one of or both of the multiplexed two data series. The configuration and operation of reception device 200 will be described with reference to FIG. 2.

Reception device 200 includes RF unit 230, demapper 211, deinterleaver 212, decoder 213, encoder 214, interleaver 215, mapper 216, multiplier 217, delayer 218, subtractor 219, demapper 221, deinterleaver 222, and decoder 223. These structural components may also be implemented as dedicated or general-purpose circuits.

Demapper 211, deinterleaver 212, decoder 213, encoder 214, interleaver 215, mapper 216, multiplier 217, delayer 218, subtractor 219, demapper 221, deinterleaver 222, and decoder 223 can also be represented collectively as a deriver. RF unit 230 can also be represented as a receiver. RF unit 230 may include an antenna.

Reception device 200 receives by an antenna the multiplexed signal sent from transmission device 100, and inputs such a multiplexed signal into RF unit 230. Stated differently, RF unit 230 receives the multiplexed signal via the antenna. The multiplexed signal received by RF unit 230 is also represented as a received signal, and corresponds to the superimposed modulated symbol stream into which the first modulated symbol stream and the second modulated symbol stream are multiplexed. RF unit 230 generates a baseband received signal from the radio-frequency received signal.

Demapper 211 demaps the baseband received signal on the basis of the first constellation of the first mapping scheme to generate a first bit likelihood stream. For example, amplitude coefficient $a_1$ is reflected in the first constellation for demapping.

Deinterleaver 212 permutes the first bit likelihood stream on the basis of a permutation rule that is a reverse rule of the first permutation rule. Such permutation is also referred to as deinterleaving. Decoder 213 performs decoding that is based on the first error control coding scheme by use of the first bit likelihood stream permuted by deinterleaver 212, and outputs the decoding result as the first data series.

Here, of the received signal corresponding to the superposed modulated symbol stream, demapper 211 treats the components corresponding to the second modulated symbols in the second data series as an unknown signal (noise), and performs demapping on the basis of the first constellation of the first mapping scheme.

When only the first data series is to be obtained, reception device 200 terminates the process upon completing the estimation of the first data series. Meanwhile, when the second data series is to be obtained in addition to the first data series, or when only the second data series is to be obtained, reception device 200 performs the processes described below to obtain the second data series.

Encoder 214 encodes the first data series obtained by decoder 213 on the basis of the first error control coding scheme to generate the first bit stream. Interleaver 215 permutes the bits in the first bit stream generated by encoder 214 on the basis of the first permutation rule. Such permutation is also referred to as interleaving.

Mapper 216 maps the first bit stream permuted by interleaver 215 in accordance with the first mapping scheme to generate the first modulated symbol stream that includes a plurality of first modulated symbols. Multiplier 217 multiplies the first modulated symbol stream outputted by mapper 216 by first amplitude coefficient $a_1$.

Delayer 218 delays the received signal outputted from RF unit 230 during the time from when RF unit 230 outputs the baseband received signal to when multiplier 217 outputs the reproduced first modulated symbol stream.

Subtractor 219 subtracts, from the received signal delayed by delayer 218, the first modulated symbol stream multiplied by first amplitude coefficient $a_1$ by multiplier 217. Through this, subtractor 219 removes the components corresponding to the first modulated symbols from the received signal on which the components corresponding to the first modulated symbols, the components corresponding to the second modulated symbols, and noise are superposed. Subsequently, subtractor 219 outputs a signal on which the components corresponding to the second modulated symbols and noise are superposed as a signal corresponding to the second modulated symbol stream.

Demapper 221 demaps the signal outputted from subtractor 219 on the basis of the second constellation of the second mapping scheme to generate a second bit likelihood stream. For example, amplitude coefficient $a_2$ is reflected in the second constellation for demapping.

Deinterleaver 222 permutes the second bit likelihood stream on the basis of a permutation rule that is a reverse rule of the second permutation rule. Such permutation is also referred to as deinterleaving. Decoder 223 decodes the second bit likelihood stream permuted by deinterleaver 222 on the basis of the second error control coding scheme, and outputs the decoding result as the second data series.

Through the above processes, reception device 200 obtains one of or both of the first data series and the second data series from the signal received by the antenna.

<Superposition Coding>

The following describes superposition coding.

Using signal power $P_s(W)$, noise power $P_n(W)$, and transmission bandwidth $B(Hz)$, transmission capacity $C_T$ (bit/s) is given as the Shannon limit by Equation 1.

[Math. 1]

$$C_T = B \cdot \log_2\left(1 + \frac{P_s}{P_n}\right) \quad \text{(Equation 1)}$$

Transmission capacity $C$(bit/s/Hz) per Hz normalized by the transmission bandwidth is given by Equation 2.

[Math. 2]

$$C = \log_2\left(1 + \frac{P_s}{P_n}\right) \quad \text{(Equation 2)}$$

In the following, "transmission capacity per Hz" will be simply referred to as "transmission capacity".

In superposition coding of the first data series and the second data series, signal power $P_{s1}(W)$ of the first layer corresponding to the first data series, signal power $P_{s2}(W)$ of the second layer corresponding to the second data series, and the entire signal power $P_s(W)$ satisfy: $P_s = P_{s1} + P_{s2}$.

When demodulating the first layer, reception device 200 regards the components of the modulated symbols in the second layer as unknown components superposed on the modulated symbols in the first layer, i.e., noise. As such, transmission capacity $C_1$ of the first layer is given by Equation 3.

[Math. 3]

$$C_1 = \log_2\left(1 + \frac{P_{s1}}{P_{s2} + P_n}\right) \quad \text{(Equation 3)}$$

When reception device 200 demodulates the second layer, the components of the modulated symbols in the first layer have already been removed from the received signal. As such, transmission capacity $C_2$ of the second layer is given by Equation 4.

[Math. 4]

$$C_2 = \log_2\left(1 + \frac{P_{s2}}{P_n}\right) \quad \text{(Equation 4)}$$

As shown by Equation 5, the total of transmission capacity $C_1$ of the first layer and transmission capacity $C_2$ of the second layer agrees with the Shannon limit.

[Math. 5]

$$\begin{aligned}C_1 + C_2 &= \log_2\left(1 + \frac{P_{s1}}{P_{s2} + P_n}\right) + \log_2\left(1 + \frac{P_{s2}}{P_n}\right) \\ &= \log_2\left(\frac{P_s + P_n}{P_{s2} + P_n}\right) + \log_2\left(\frac{P_{s2} + P_n}{P_n}\right) \\ &= \log_2\left(\frac{P_s + P_n}{P_n}\right) \\ &= \log_2\left(1 + \frac{P_s}{P_n}\right)\end{aligned} \quad \text{(Equation 5)}$$

In the present embodiment, signal power $P_{s1}$ of the first layer corresponding to the first data series is proportional to the second power of first amplitude coefficient $a_1$, and signal power $P_{s2}$ of the second layer corresponding to the second data series is proportional to the second power of second amplitude coefficient $a_2$. The allocation of signal power to a plurality of layers is determined by an amplitude coefficient that is multiplied to the modulated symbols of each layer.

Figure 3:
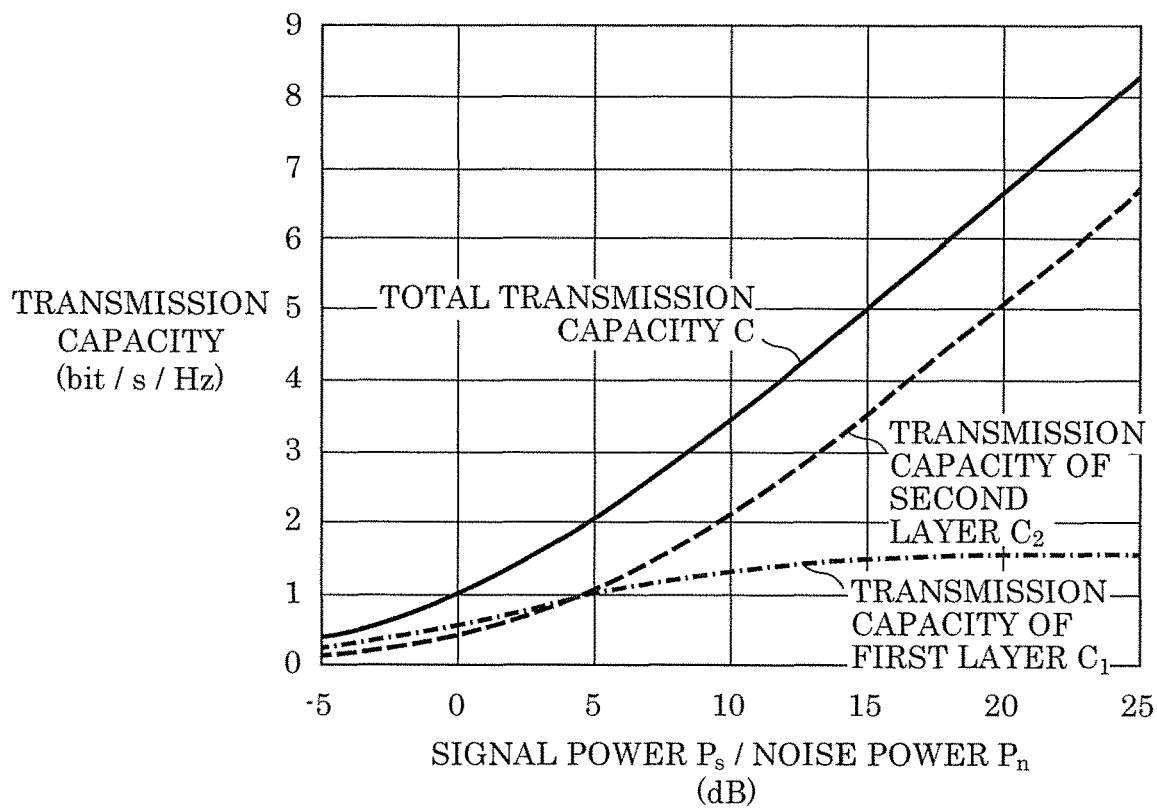
FIG. 3 is a diagram showing transmission capacities in superposition coding.

FIG. 3 shows an example simulation result of each transmission capacity when the ratio between signal power $P_{s1}$ of the first layer and signal power $P_{s2}$ of the second layer is $P_{s1}:P_{s2}=2:1$. In FIG. 3, the lateral axis represents as dB (decibel) the ratio of signal power $P_s$ to noise power $P_n$ (SNR), and the vertical axis represents transmission capacity. In FIG. 3, the dot-and-dash line indicates transmission capacity $C_1$ of the first layer, the broken line indicates transmission capacity $C_2$ of the second layer, and the solid line indicates the total transmission capacity of transmission capacity $C_1$ of the first layer and transmission capacity $C_2$ of the second layer.

Note that SNR, which means a ratio of signal power to noise power, is also referred to as a signal-to-noise power ratio or a signal-to-noise ratio.

<Non-Uniform Constellation>

Transmission device 100 according to the present embodiment can employ any mapping scheme for each of the first mapping scheme and the second mapping scheme. Reception device 200 demodulates the first layer, with the second modulated symbols of the second layer remaining unknown. As such, a mapping scheme such as QPSK, for example, that mainly supports a low SNR is suitable as the first mapping scheme.

Figure 4:
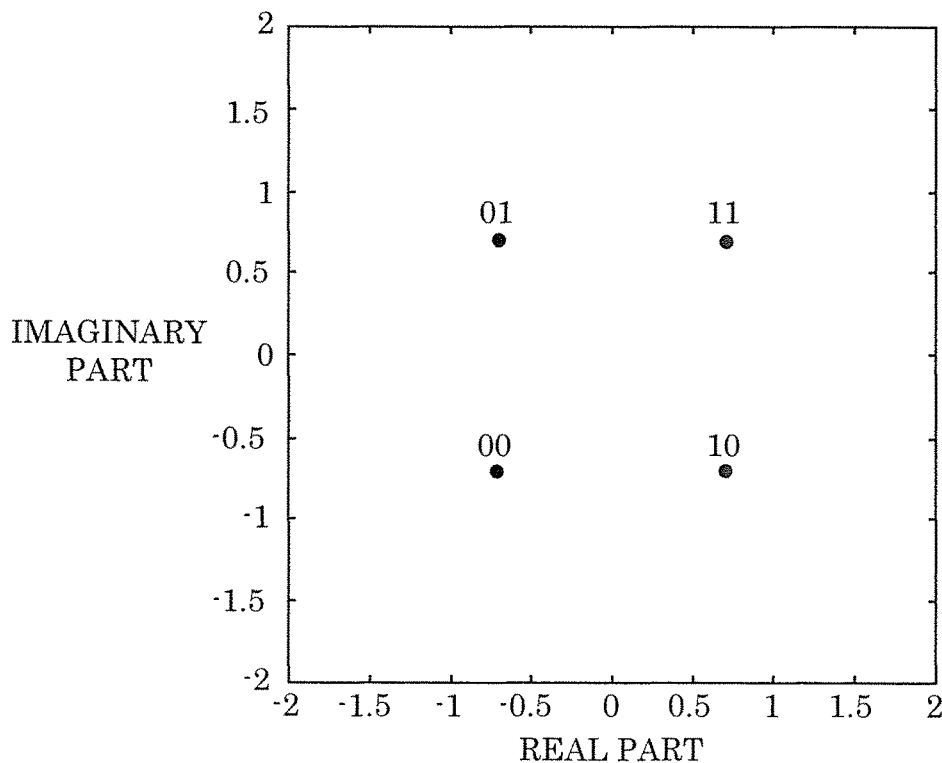
FIG. 4 is a diagram showing an example QPSK constellation.

FIG. 4 shows an example QPSK constellation. More specifically, four QPSK signal points are plotted in the complex plane, with the lateral axis representing the real part (the real component) and the vertical axis representing the imaginary part (the imaginary component). In QPSK, a group of bits (00, 01, 10, or 11) is associated with a modulated symbol indicating a complex number on the basis of the constellation shown in FIG. 4.

Meanwhile, the second layer is demodulated with the modulated symbols in the first layer having been removed. As such, the second mapping scheme may be a mapping scheme that utilizes multilevel constellation supporting a high SNR.

Non-uniform constellations as disclosed in J. Zoellner and N. Loghin, Optimization of High-order Non-uniform QAM Constellations, IEEE International Symposium on Broadband Multimedia Systems and Broadcasting 2013 have received recent attention as multilevel constellations. Unlike conventional uniform constellations that include uniformly spaced signal points, such as a QAM constellation, a non-uniform constellation includes ununiformly spaced signal points. In some cases, a mapping scheme using a non-uniform constellation improves the transmission capacity compared to a mapping scheme using a uniform constellation.

Figure 5:
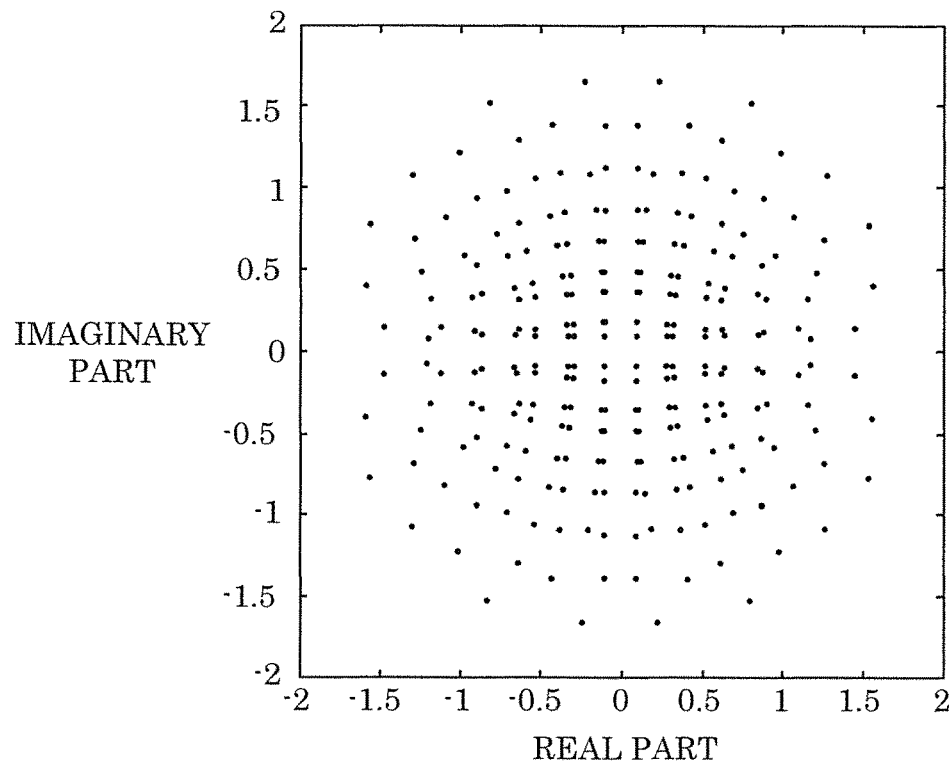
FIG. 5 is a diagram showing an example non-uniform constellation.

FIG. 5 shows an example non-uniform constellation including 256 signal points (Nu-256QAM). In FIG. 5, 256 non-uniform constellation signal points are plotted in the complex plane, with the lateral axis representing the real part and the vertical axis representing the imaginary part.

The following describes an example of using QPSK shown in FIG. 4 as the first mapping scheme and Nu-256QAM shown in FIG. 5 as the second mapping scheme in the multiplexing scheme that utilizes superposition coding.

Figure 6:
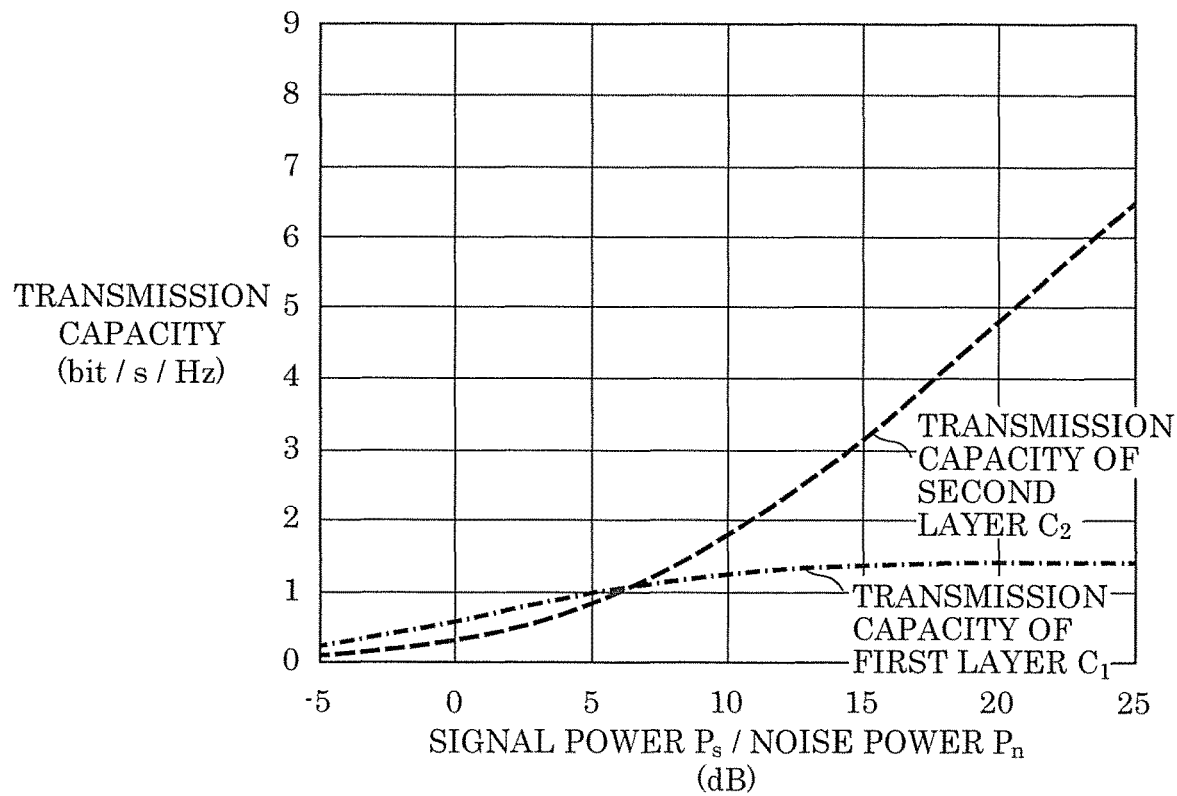
FIG. 6 is a diagram showing transmission capacities in superposition coding using QPSK and Nu-256QAM.

FIG. 6 shows an example simulation result of each transmission capacity when the ratio between signal power $P_{s1}$ of the first layer and signal power $P_{s2}$ of the second layer is $P_{s1}:P_{s2}=2:1$. In FIG. 6, the lateral axis represents as dB (decibel) the ratio of signal power $P_s$ to noise power $P_n$ (SNR), and the vertical axis represents transmission capacity. In FIG. 6, the dot-and-dash line indicates transmission capacity $C_1$ of the first layer, and the broken line indicates transmission capacity $C_2$ of the second layer. A combination of QPSK and Nu-256QAM achieves a transmission capacity that is close to the limit shown in FIG. 3.

As described above, transmission device 100 according to the present embodiment is capable of highly efficient multiplexing and transmission of a plurality of data series by a multiplexing scheme utilizing superposition coding. Reception device 200 is capable of receiving a plurality of data series that have been multiplexed in a highly efficient manner by the multiplexing scheme utilizing superposition coding. Transmission device 100 and reception device 200 are also capable of increasing the transmission capacity by use of a non-uniform constellation.

Note that permutation (interleaving and deinterleaving) reduces the effects that may be caused when successive errors occur. Permutation (interleaving and deinterleaving) also controls the correspondence among bits included in codewords in error correcting coding, modulated symbols, and bits included in such modulated symbols. However, such permutation (interleaving and deinterleaving) may be omitted.

Stated differently, interleaver 112 and interleaver 122 are optional structural components, and thus may not be included in transmission device 100. Similarly, deinterleaver 212, interleaver 215, and deinterleaver 222 are optional structural components, and thus may not be included in reception device 200.

Interleaving and deinterleaving, however, make a pair. As such, when transmission device 100 includes interleaver 112 and interleaver 122, reception device 200 basically includes deinterleaver 212, interleaver 215, and deinterleaver 222. Meanwhile, when transmission device 100 does not include interleaver 112 and interleaver 122, reception device 200 does not include deinterleaver 212, interleaver 215, and deinterleaver 222.

Also, amplitude coefficient $a_1$ may be reflected in the mapping performed by mapper 216 of reception device 200. In such a case, reception device 200 may omit the multiplication, and thus may not include multiplier 217.

Error control coding on the first data series and the second data series may be performed by an external device that is different from transmission device 100. In such a case, transmission device 100 may omit the error control coding, and may not include encoder 111 and encoder 121.

Embodiment 2

<Parallel Decoding of Signal Obtained by Superposition Coding>

The present embodiment describes a reception method for parallel decoding of a signal obtained by superposition coding. The configuration of the transmission device is the same as the configuration of transmission device 100 shown in FIG. 1, and thus will not be described. In parallel decoding in superposition coding, the reception device treats the components of the modulated symbol stream in the first layer as an unknown signal (noise) to decode the second layer, without removing the components of the modulated symbol stream in the first layer included in the received signal.

Figure 7:
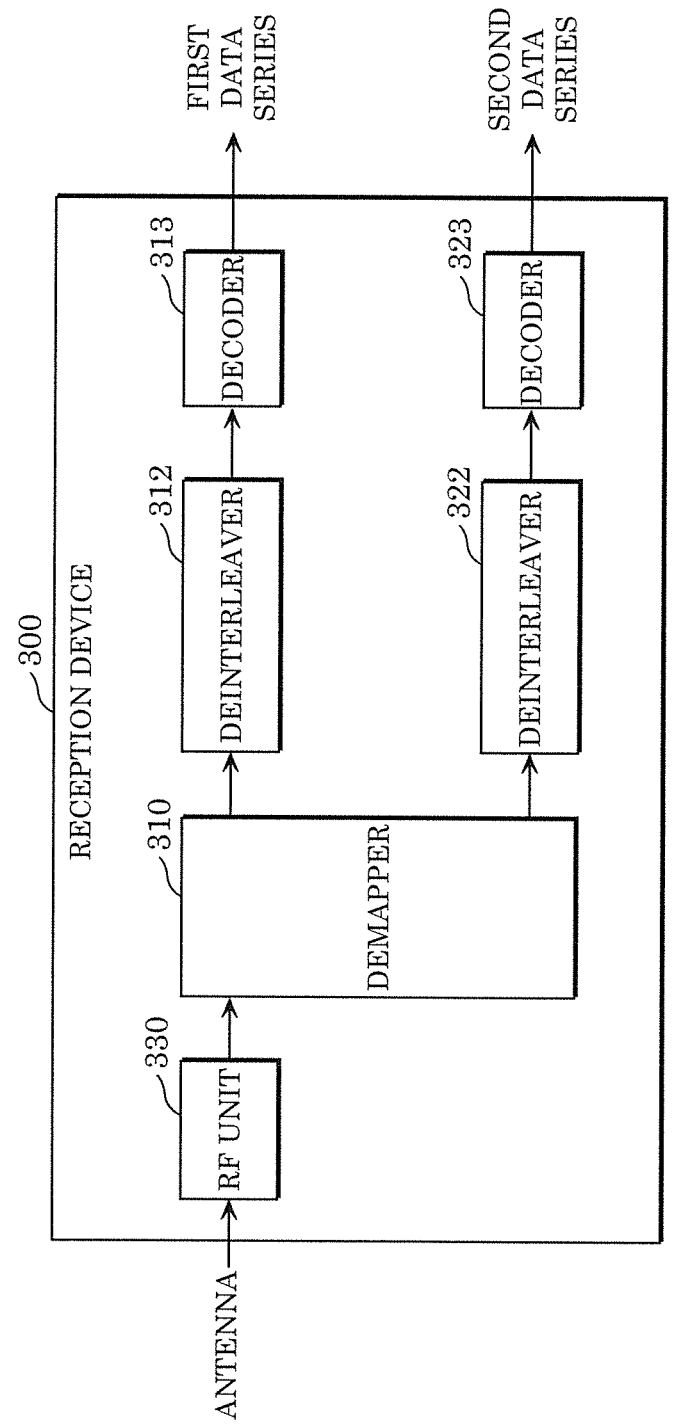
FIG. 7 is a block diagram of a first example configuration of a reception device according to Embodiment 2.

FIG. 7 shows an example configuration of reception device 300 capable of receiving and performing parallel decoding on the signal on which two data series are multiplexed onto two layers by superposition coding, and capable of obtaining one of or both of the multiplexed two data series. The configuration and operation of reception device 300 will be described with reference to FIG. 7.

Reception device 300 includes RF unit 330, demapper 310, deinterleaver 312, decoder 313, deinterleaver 322, and decoder 323. These structural components may also be implemented as dedicated or general-purpose circuits. Demapper 310, deinterleaver 312, decoder 313, deinterleaver 322, and decoder 323 can also be represented collectively as a deriver. RF unit 330 can also be represented as a receiver. RF unit 330 may include an antenna.

Reception device 300 receives by an antenna the multiplexed signal sent from transmission device 100, and inputs such a multiplexed signal into RF unit 330. Stated differently, RF unit 330 receives the multiplexed signal via the antenna. The multiplexed signal received by RF unit 330 is also represented as a received signal. RF unit 330 generates a baseband received signal from the radio-frequency received signal.

Demapper 310 demaps the baseband received signal to generate the first bit likelihood stream and the second bit likelihood stream. For example, demapper 310 performs such demapping on the basis of a superposition constellation that shows the arrangement of the signal points of superposed modulated symbols obtained by superposing the first modulated symbols and the second modulated symbols by superposition coding.

The superposition constellation is determined in accordance with the first constellation of the first mapping scheme, the second constellation of the second mapping scheme, first amplitude coefficient $a_1$, first amplitude coefficient $a_2$, etc.

Figure 8:
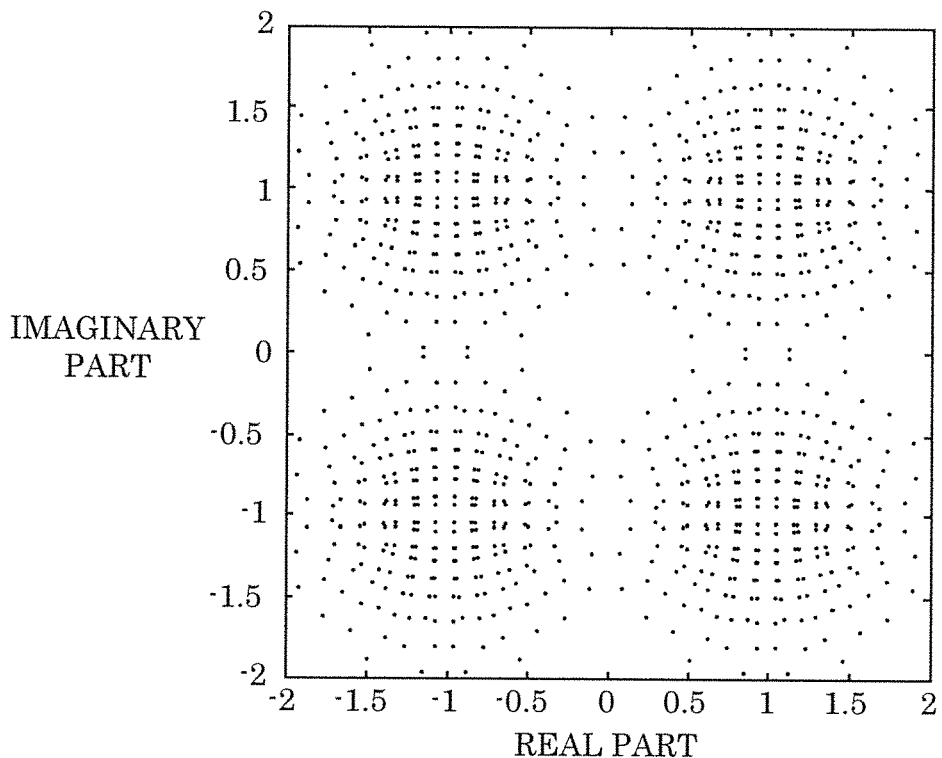
FIG. 8 is a diagram showing an example superposition constellation.

FIG. 8 shows an example superposition constellation, which is more specifically a combination of the QPSK constellation shown in FIG. 4 and the Nu-256QAM constellation shown in FIG. 5. Even more specifically, the Nu-256QAM constellation (256 signal points) is placed on each of the four regions in the complex plane in accordance with the four signal points of the QPSK constellation. These four regions, each corresponding to Nu-256QAM constellation, may partially overlap with each other.

Demapper 310 performs demapping on the basis of the superposition constellation as shown in FIG. 8. Stated differently, demapper 310 generates the first bit likelihood stream, with the modulated symbol stream of the second layer remaining unknown, and generates the second bit likelihood stream, with the modulated symbol stream of the first layer remaining unknown.

Note that demapper 310 may use the first constellation of the first mapping scheme to generate the first bit likelihood stream, and may use the above-described superposition constellation to generate the second bit likelihood stream.

The first constellation, when used to generate the first bit likelihood stream, enables demapper 310 to reduce the number of signal points that should be considered in generating the first bit likelihood stream, compared to when the superposition constellation is also used to generate the first bit likelihood stream. This thus enables demapper 310 to reduce the number of arithmetic computations.

Demapper 310 corresponds, for example, to the first demapper that demaps the received signal to generate the first bit likelihood stream and the second demapper that demaps the received signal to generate the second bit likelihood stream. Demapper 310 may include the first demapper that demaps the received signal to generate the first bit likelihood stream and the second demapper that demaps the received signal to generate the second bit likelihood stream.

Deinterleaver 312 permutes the first bit likelihood stream on the basis of a permutation rule that is a reverse rule of the first permutation rule. Such permutation is also referred to as deinterleaving. Decoder 313 decodes the first bit likelihood stream permuted by deinterleaver 312 on the basis of the first error control coding scheme, and outputs the decoding result as the first data series.

Deinterleaver 322 permutes the second bit likelihood stream on the basis of a permutation rule that is a reverse rule of the second permutation rule. Such permutation is also referred to as deinterleaving. Decoder 323 decodes the second bit likelihood stream permuted by deinterleaver 322 on the basis of the second error control coding scheme, and outputs the decoding result as the second data series.

Note that permutation (deinterleaving) may be omitted as in the case of Embodiment 1. Stated differently, deinterleaver 312 and deinterleaver 322 are optional structural components, and thus may not be included in reception device 300.

Interleaving and deinterleaving, however, make a pair. As such, when transmission device 100 includes interleaver 112 and interleaver 122, reception device 300 basically includes deinterleaver 312 and deinterleaver 322. Meanwhile, when transmission device 100 does not include interleaver 112 and interleaver 122, reception device 300 does not include deinterleaver 312 and deinterleaver 322.

Figure 9:
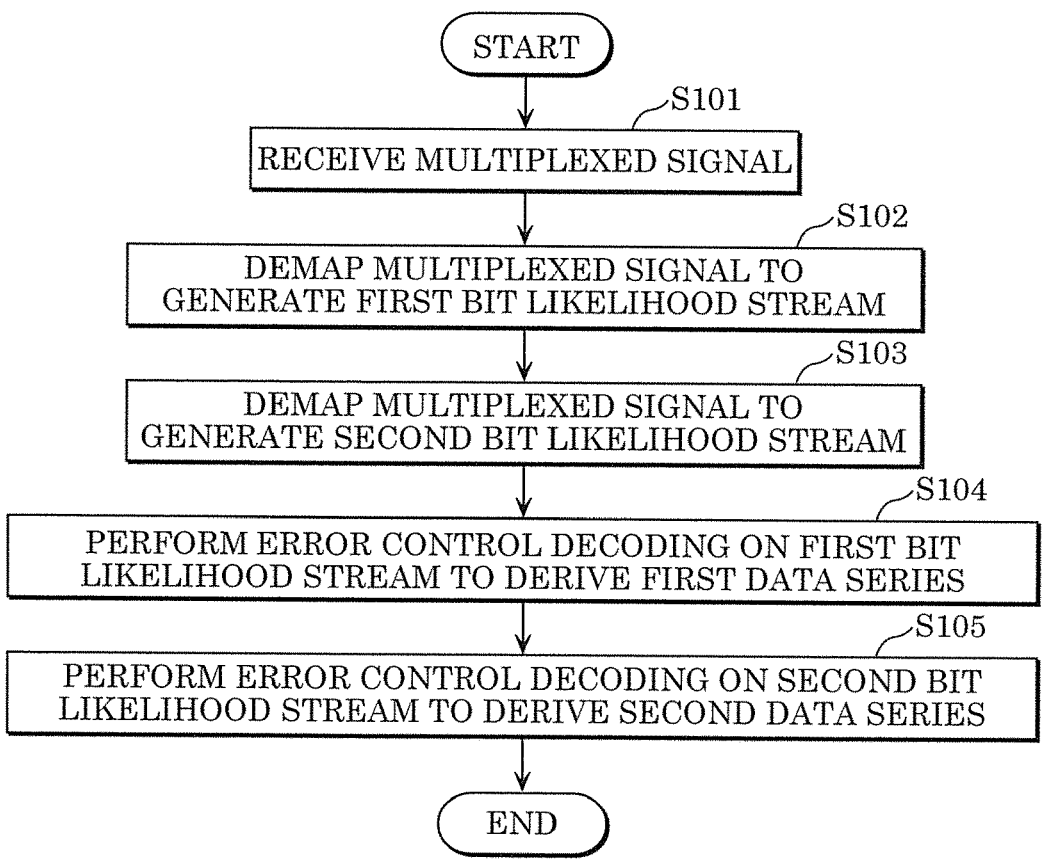
FIG. 9 is a flowchart of a first example of reception operations according to Embodiment 2.

FIG. 9 is a flowchart of example operations performed by reception device 300. First, RF unit 330 receives the multiplexed signal into which the first data series and the second data series are multiplexed (S101).

Next, demapper 310 demaps the multiplexed signal to generate the first bit likelihood stream of the first data series (S102). Demapper 310 demaps the multiplexed signal to generate the second bit likelihood stream of the second data series (S103). Deinterleaver 312 may deinterleave such a generated first bit likelihood stream. Also, deinterleaver 322 may deinterleave such a generated second bit likelihood stream.

Then, decoder 313 performs error control decoding on the first bit likelihood stream to derive the first data series (S104). Also, decoder 323 performs error control decoding on the second bit likelihood stream to derive the second data series (S105).

Note that processes on the first bit likelihood stream (generation, deinterleaving, and error control decoding) and processes on the second bit likelihood stream (generation, deinterleaving, and error control decoding) are basically performed in parallel.

Reception device 300 as shown in FIG. 7 that performs parallel decoding has lower performance in decoding the second layer than that of reception device 200 as shown in FIG. 2 that performs sequential decoding.

Figure 10:
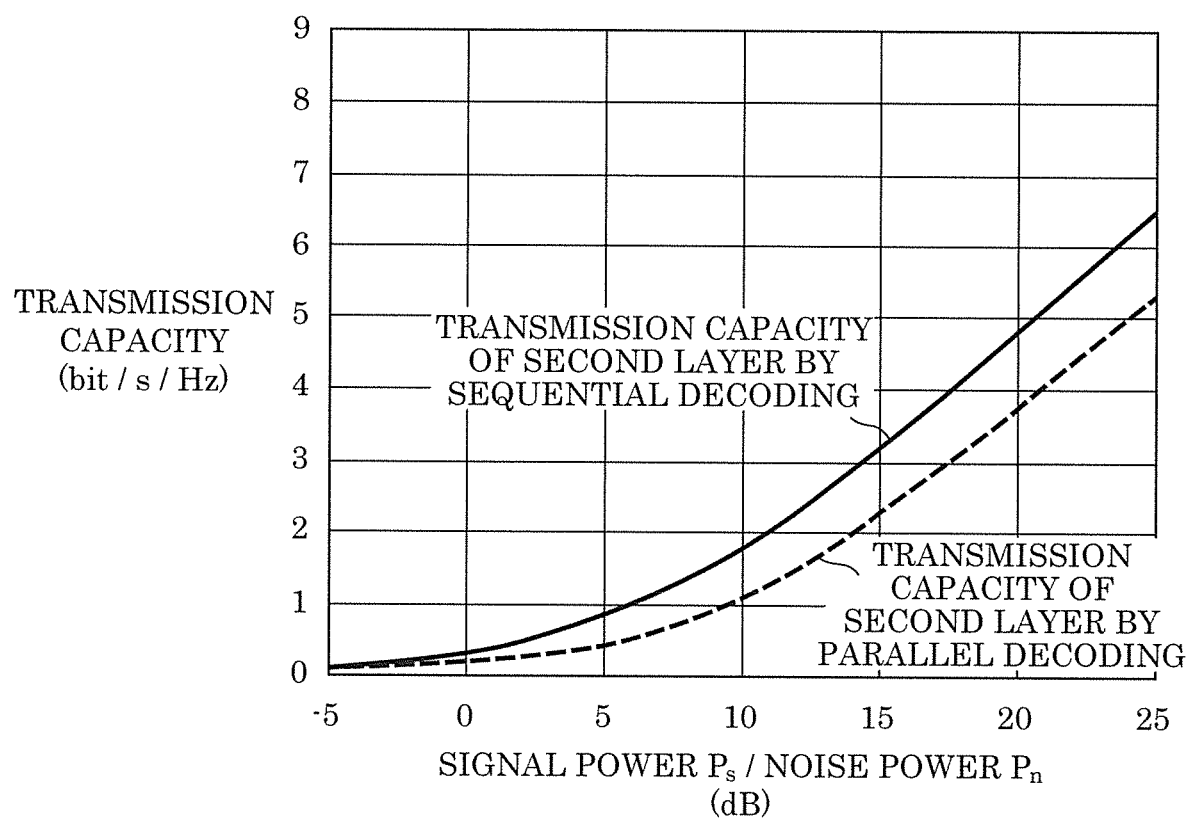
FIG. 10 is a diagram showing an example result of simulation to compare sequential decoding and parallel decoding in superposition coding.

FIG. 10 shows an example simulation result of the transmission capacity of the second layer when the ratio between signal power $P_{s1}$ of the first layer and signal power $P_{s2}$ of the second layer is $P_{s1}:P_{s2}=2:1$. In FIG. 10, the lateral axis represents as dB (decibel) the ratio of signal power $P_s$ to noise power Pn (SNR), and the vertical axis represents transmission capacity. In FIG. 10, the solid line indicates the transmission capacity of the second layer when sequential decoding is performed, and the broken line indicates the transmission capacity of the second layer when parallel decoding is performed.

As FIG. 10 shows, in the decoding of the second layer, parallel decoding involves an increased SNR with respect to the same transmission capacity and a decreased transmission capacity with respect to the same SNR, compared to sequential decoding.

As described above, reception device 300 according to the present embodiment that performs parallel decoding has lower performance in decoding the second data series transmitted on the second layer than that of reception device 200 that performs sequential decoding. However, reception device 300 reduces the number of structural components required for decoding the second layer.

More specifically, reception device 300 eliminates the need for encoder 214, interleaver 215, mapper 216, and multiplier 217 that are required by reception device 200 shown in FIG. 2 performing sequential decoding to reproduce the modulated symbol stream of the first layer. Reception device 300 also eliminates the need for delayer 218 that delays the received signal and subtractor 219 that removes the components of the modulated symbols in the first layer reproduced from the received signal.

The circuit size can be thus reduced. Reception device 300 also requires a smaller number of arithmetic computations and lower power consumption than those required by reception device 200.

Reception device 200 shown in FIG. 2 that performs sequential decoding demodulates the first layer in the received signal to obtain the first data series, generates the first modulated symbol stream from the obtained first data series, and then starts demodulating the second layer in the received signal to obtain the second data series. Meanwhile, reception device 300 according to the present embodiment that performs parallel decoding is capable of simultaneously obtaining the first data series and the second data series in parallel, thereby reducing processing delays.

Alternatively, the reception device may observe the SNR of the received signal to make selection between parallel decoding to be performed when the SNR is high and sequential decoding to be performed when the SNR is low.

In such a case, reception device 200 shown in FIG. 2 includes, for example, a controller that makes selection between sequential decoding and parallel decoding depending on the SNR. Such a controller may be included in RF unit 230 or demapper 221. Furthermore, demapper 221 is configured to perform demapping based on the superposition constellation, which is described as an operation performed by demapper 310 shown in FIG. 7, in addition to demapping that is based on the second constellation.

Demapper 221 switches between demapping to be performed on the signal outputted from subtractor 219 on the basis of the second constellation and demapping to be performed on the signal outputted from RF unit 230 on the basis of the superposition constellation. For example, demapper 221 switches between these demapping operations in accordance with a control signal from the controller.

Figure 11:
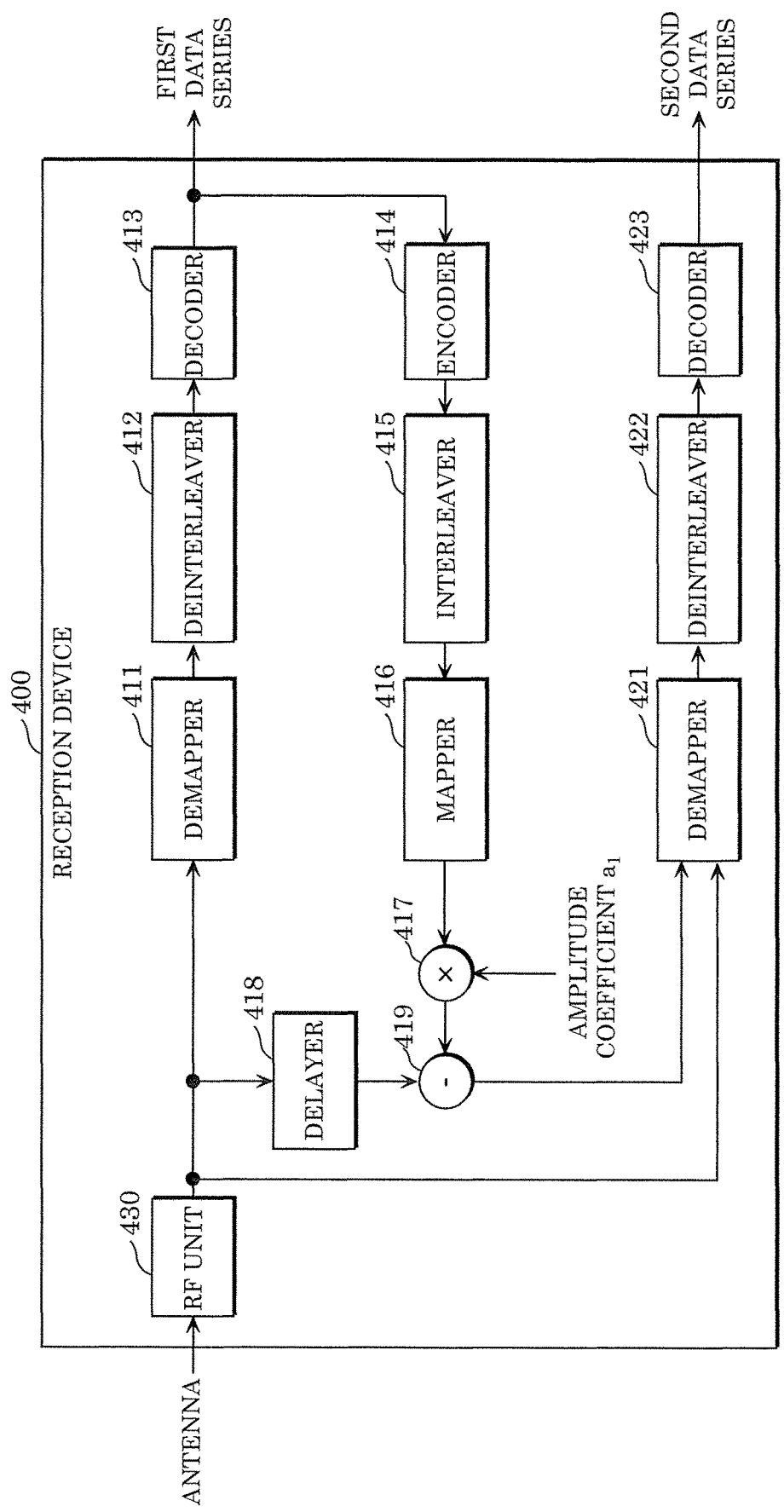
FIG. 11 is a block diagram of a second example configuration of the reception device according to Embodiment 2.

FIG. 11 shows an example configuration of reception device 400 that selectively performs parallel decoding and sequential decoding. Reception device 400 includes RF unit 430, demapper 411, deinterleaver 412, decoder 413, encoder 414, interleaver 415, mapper 416, multiplier 417, delayer 418, subtractor 419, demapper 421, deinterleaver 422, and decoder 423. Structural components of reception device 400 shown in FIG. 11 and structural components of reception device 200 shown in FIG. 2 are basically the same.

However, demapper 421 of reception device 400 performs demapping that is based on the superposition constellation in addition to demapping that is based on the second constellation of the second mapping scheme. For example, depending on the SNR, demapper 421 switches between demapping to be performed on the signal outputted from subtractor 419 on the basis of the second constellation and demapping to be performed on the signal outputted from RF unit 430 on the basis of the superposition constellation.

Although the example shown in FIG. 11 omits a controller that makes selection between sequential decoding and parallel decoding depending on the SNR, the controller may be included in demapper 421, in RF unit 430, or in reception device 400 as a new structural component.

Figure 12:
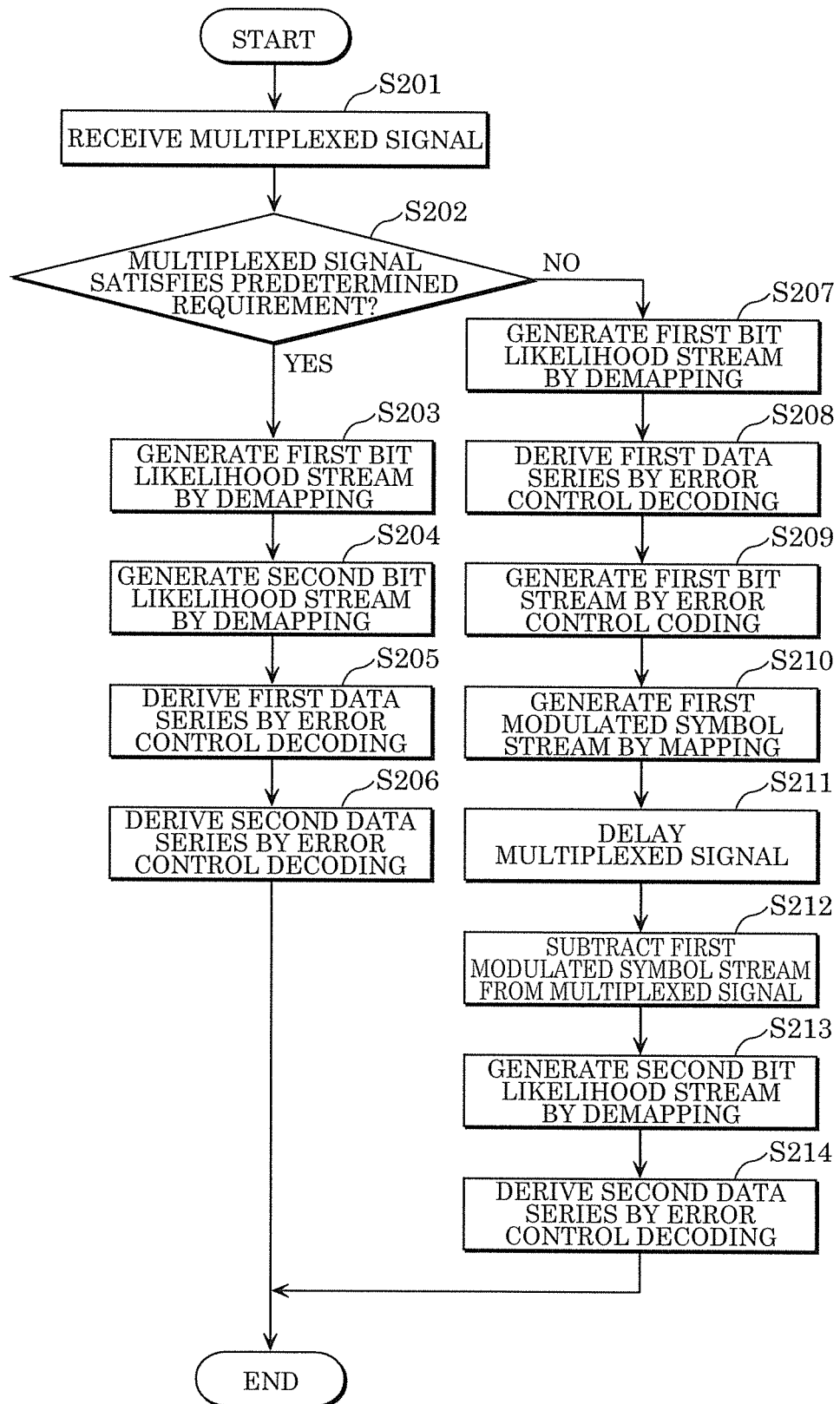
FIG. 12 is a flowchart of a second example of reception operations according to Embodiment 2.

FIG. 12 is a flowchart of example operations performed by reception device 400. First, RF unit 430 receives the multiplexed signal into which the first data series and the second data series are multiplexed (S201). Then, RF unit 430 determines whether the multiplexed signal satisfies a predetermined requirement. The predetermined requirement, for example, is that the SNR should be higher than a predetermined threshold.

When the multiplexed signal satisfies the predetermined requirement (Yes in S202), demapper 411 demaps the multiplexed signal to generate the first bit likelihood stream of the first data series (S203). Also, demapper 421 demaps the multiplexed signal to generate the second bit likelihood stream of the second data series (S204). Deinterleaver 412 may deinterleave such a generated first bit likelihood stream. Also, deinterleaver 422 may deinterleave such a generated second bit likelihood stream.

Decoder 413 performs error control decoding on the first bit likelihood stream to derive the first data series (S205). Also, decoder 423 performs error control decoding on the second bit likelihood stream to derive the second data series (S206).

These operations (S203 to S206) are basically the same as the operations (S102 to S105) shown in FIG. 9.

Meanwhile, when the multiplexed signal fails to satisfy the predetermined requirement (No in S202), demapper 411 demaps the multiplexed signal to generate the first bit likelihood stream of the first data series (S207). Deinterleaver 412 may deinterleave such a generated first bit likelihood stream. Then, decoder 413 performs error control decoding on the first bit likelihood stream to derive the first data series (S208).

Next, encoder 414 performs error control coding on the first data series to generate the first bit stream (S209). Interleaver 415 may interleave such a generated first bit stream. Then, mapper 416 maps the first bit stream to generate the first modulated symbol stream (S210). Multiplier 417 may multiply the first modulated symbol stream by amplitude coefficient $a_1$.

Delayer 418 delays the multiplexed signal until the first modulated symbol stream is generated (S211). Then, subtractor 419 subtracts the first modulated symbol stream from the multiplexed signal (S212).

Next, demapper 421 demaps the multiplexed signal from which the first modulated symbol stream has been subtracted to generate the second bit likelihood stream (S213). Deinterleaver 422 may deinterleave such a generated second bit likelihood stream. Then, decoder 423 performs error control decoding on the second bit likelihood stream to derive the second data series (S214).

Through these operations, reception device 400 performs parallel decoding when the SNR is high, thereby reducing the number of arithmetic computations and power consumption. Reception device 400 also performs parallel decoding when the SNR is high, thereby reducing processing delays. Meanwhile, reception device 400 performs sequential decoding when the SNR is low, thereby increasing the possibility of correctly decoding the second data series.

Note that the first mapping scheme and the second mapping scheme according to the present embodiment are basically the same as the first mapping scheme and the second mapping scheme according to Embodiment 1. Stated differently, the first constellation and the second constellation according to the present embodiment are basically the same as the first constellation and the second constellation according to Embodiment 1. Any one of a uniform constellation and a non-uniform constellation may be used as the second mapping scheme.

Embodiment 3

<Variation of Superposition Coding (Modified Superposition Coding)>

The present embodiment describes a method of multiplexing and transmitting a plurality of data series by a variation of superposition coding (modified superposition coding), which is a modified version of the above-described superposition coding.

Figure 13:
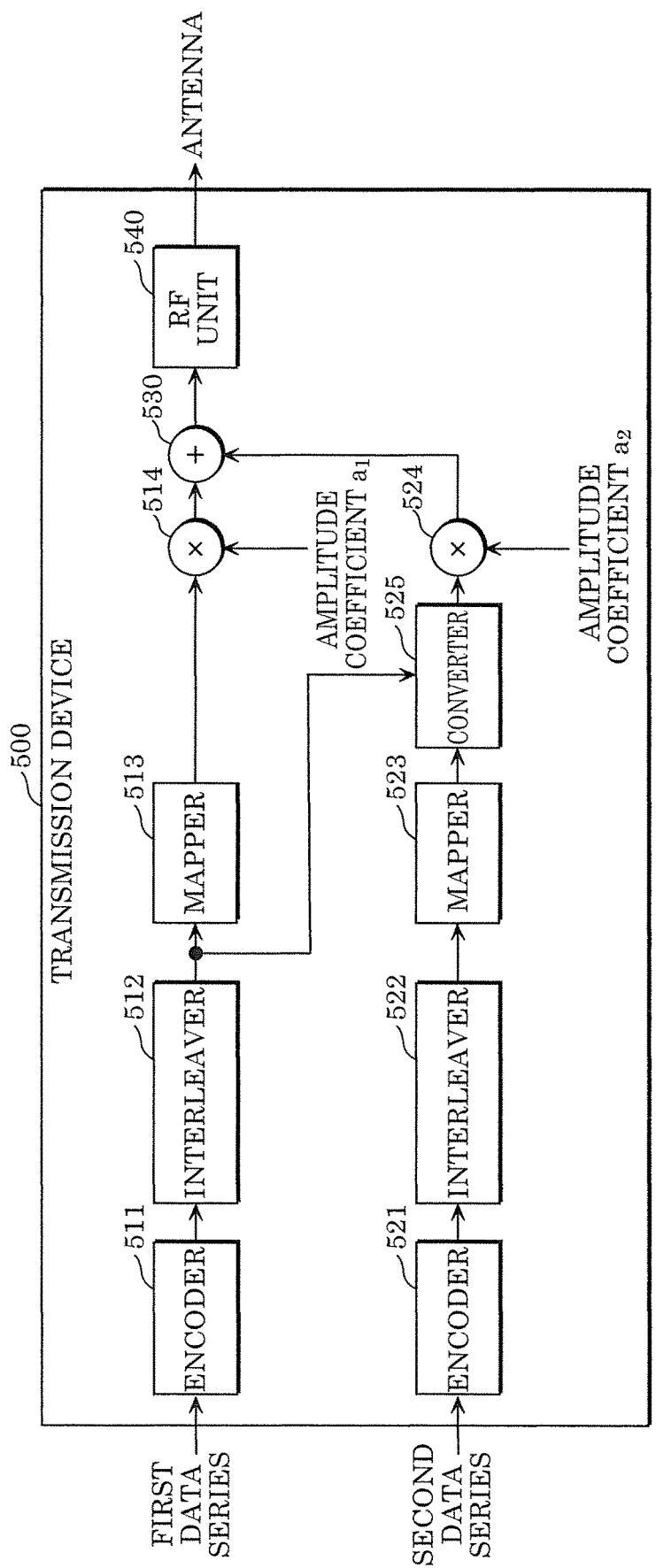
FIG. 13 is a block diagram of a first example configuration of a transmission device according to Embodiment 3.

FIG. 13 shows an example configuration of transmission device 500 that multiplexes two data series onto two layers by the variation of superposition coding, and transmits a multiplexed data series. The configuration and operation of transmission device 500 will be described with reference to FIG. 13.

Transmission device 500 includes encoder 511, interleaver 512, mapper 513, multiplier 514, encoder 521, interleaver 522, mapper 523, converter 525, multiplier 524, adder 530, and RF unit 540. These structural components may also be implemented as dedicated or general-purpose circuits. Multiplier 514, multiplier 524, and adder 530 can also be represented collectively as a superposer. RF unit 540 can also be represented as a transmitter. RF unit 540 may include an antenna.

Encoder 511 encodes an inputted first data series on the basis of a first error control coding scheme to generate a first bit stream. Interleaver 512 permutes the bits in the first bit stream generated by encoder 511 on the basis of a first permutation rule. Such permutation is also referred to as interleaving.

Mapper 513 maps the first bit stream permuted by interleaver 512 in accordance with a first mapping scheme to generate a first modulated symbol stream that includes a plurality of first modulated symbols. In the mapping in accordance with the first mapping scheme, mapper 513 maps each group of bits that includes a first number of bits in the first bit stream onto one of the signal points in a first constellation in accordance with the values of such a group of bits.

When PSK modulation such as BPSK and QPSK, or QAM modulation such as 16QAM and 64QAM is used as the first mapping scheme, each first modulated symbol can be represented by a complex number, for example, with the real part representing the magnitude of the in-phase component and the imaginary part representing the magnitude of the orthogonal component. Meanwhile, when PAM modulation is used as the first mapping scheme, each first modulated symbol can be represented by a real number.

Encoder 521 encodes an inputted second data series on the basis of a second error control coding scheme to generate a second bit stream. Interleaver 522 permutes the bits in the second bit stream generated by encoder 521 on the basis of a second permutation rule. Such permutation is also referred to as interleaving.

Mapper 523 maps the second bit stream permuted by interleaver 522 in accordance with a second mapping scheme to generate a second modulated symbol stream that includes a plurality of second modulated symbols. In the mapping in accordance with the second mapping scheme, mapper 523 maps each group of bits that includes a second number of bits in the second bit stream onto one of the signal points in a second constellation in accordance with the values of such a group of bits.

When PSK modulation such as BPSK and QPSK, or QAM modulation such as 16QAM and 64QAM is used as the second mapping scheme, each second modulated symbol can be represented by a complex number, for example, with the real part representing the magnitude of the in-phase component and the imaginary part representing the magnitude of the orthogonal component. Meanwhile, when PAM modulation is used as the second mapping scheme, each second modulated symbol can be represented by a real number. Any one of a uniform constellation and a non-uniform constellation may be used as the second mapping scheme.

Converter 525 converts each second modulated symbol to be superposed with the corresponding first modulated symbol, on the basis of the values of the bits used to generate such a first modulated symbol. Through this, converter 525 converts the second modulated symbol stream.

Multiplier 514 multiplies each first modulated symbol in the first modulated symbol stream by first amplitude coefficient $a_1$. Multiplier 524 multiplies, by second amplitude coefficient $a_2$, each second modulated symbol in the second modulated symbol stream converted by converter 525. Adder 530 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 540 sends the generated superposed modulated symbol stream as a signal. More specifically, RF unit 540 generates, from the superposed modulated symbol stream generated by adder 530, a radio-frequency signal as a signal corresponding to the superposed modulated symbol stream to send such a radio-frequency signal from the antenna.

Stated differently, the superposer constituted by multiplier 514, multiplier 524, and adder 530 superposes the first modulated symbol stream and the second modulated symbol stream at a predetermined amplitude ratio, thereby generating a multiplexed signal into which the first data series and the second data series are multiplexed. Subsequently, RF unit 540 sends the multiplexed signal. Note that the multiplexed signal corresponds to the superposed modulated symbol stream. Also note that the predetermined amplitude ratio may be 1:1, and that the multiplication may be omitted.

The following shows an example case in which QPSK is used as the first mapping scheme to describe the operation of converter 525.

For example, when $S_1(t)$ is the t-th modulated symbol in the first modulated symbol stream generated by mapper 513, and $b_1(t)$ and $b_2(t)$ are a plurality of bits to be mapped onto $S_1(t)$, modulated symbol $S_1(t)$ is given by Equation 6.

[Math. 6]

$$S_1(t) = \frac{(2 \cdot b_1(t) - 1) + i \cdot (2 \cdot b_2(t) - 1)}{\sqrt{2}} \qquad \text{(Equation 6)}$$

Here, i denotes the imaginary unit. Modulated symbol $S_1(t)$ may also be given by an equation in which one of or both of the (positive/negative) polarities of the real part and the imaginary part of Equation 6 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 525 converts, into $S'_2(t)$, the t-th modulated symbol $S_2(t)$ in the second modulated symbol stream generated by mapper 523, on the basis of $b_1(t)$ and $b_2(t)$ as shown by Equation 7.

[Math. 7]

$$S'_2(t) = (-1)^{b_1(t)} \cdot Re[S_2(t)] + i \cdot (-1)^{b_2(t)} \cdot Im[S_2(t)] \qquad \text{(Equation 7)}$$

Here, $S'_2(t)$ is the converted t-th modulated symbol in the second modulated symbol stream. $Re[S_2(t)]$ is the value of the real part of $S_2(t)$, and $Im[S_2(t)]$ is the value of the imaginary part of $S_2(t)$. Modulated symbol $S'_2(t)$ may be given by an equation in which one of or both of the polarities of the real part and the imaginary part of Equation 7 are reversed.

As described above, the variation of superposition coding controls the polarities of the real part and the imaginary part of each second modulated symbol in accordance with the values of the bits to be mapped onto the first modulated symbol that is superposed with such a second modulated symbol. Note that the polarities of the real part and the imaginary part of each second modulated symbol may be controlled in accordance with the first modulated symbol that is superposed with such a second modulated symbol. Also, the polarity of one of the real part and the imaginary part of each second modulated symbol may be controlled, or the polarities of both the real part and the imaginary part of each second modulated symbol may be controlled.

Figure 14:
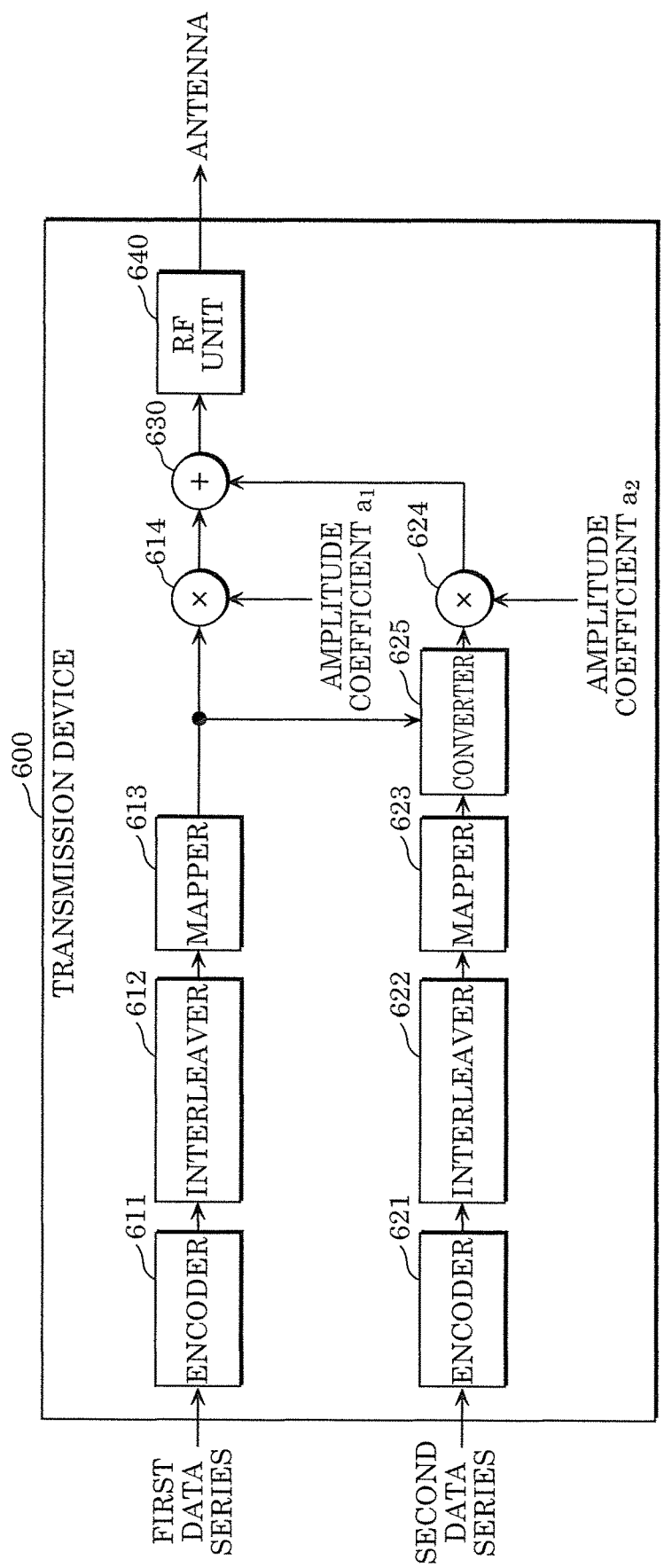
FIG. 14 is a block diagram of a second example configuration of the transmission device according to Embodiment 3.

FIG. 14 shows an example configuration of transmission device 600 that multiplexes two data series onto two layers by the variation of superposition coding, and transmits the multiplexed data series. The configuration of transmission device 600 is different from the configuration of transmission device 500. The configuration and operation of transmission device 600 will be described with reference to FIG. 14.

Transmission device 600 includes encoder 611, interleaver 612, mapper 613, multiplier 614, encoder 621, interleaver 622, mapper 623, converter 625, multiplier 624, adder 630, and RF unit 640. These structural components may also be implemented as dedicated or general-purpose circuits. Multiplier 614, multiplier 624, and adder 630 can also be represented collectively as a superposer. RF unit 640 can also be represented as a transmitter. RF unit 640 may include an antenna.

Encoder 611 encodes an inputted first data series on the basis of a first error control coding scheme to generate a first bit stream. Interleaver 612 permutes the bits in the first bit stream generated by encoder 611 on the basis of a first permutation rule. Such permutation is also referred to as interleaving.

Mapper 613 maps the first bit stream permuted by interleaver 612 in accordance with a first mapping scheme to generate a first modulated symbol stream that includes a plurality of first modulated symbols. In the mapping in accordance with the first mapping scheme, mapper 613 maps each group of bits that includes a first number of bits in the first bit stream onto one of the signal points in a first constellation in accordance with the values of such a group of bits.

Encoder 621 encodes an inputted second data series on the basis of a second error control coding scheme to generate a second bit stream. Interleaver 622 permutes the bits in the second bit stream generated by encoder 621 on the basis of a second permutation rule. Such permutation is also referred to as interleaving.

Mapper 623 maps the second bit stream permuted by interleaver 622 in accordance with a second mapping scheme to generate a second modulated symbol stream that includes a plurality of second modulated symbols. In the mapping in accordance with the second mapping scheme, mapper 623 maps each group of bits that includes a second number of bits in the second bit stream onto one of the signal points in a second constellation in accordance with the values of such a group of bits.

Converter 625 converts each second modulated symbol to be superposed with the corresponding first modulated symbol, on the basis of the generated first modulated symbol. Through this, converter 625 converts the second modulated symbol stream.

Multiplier 614 multiplies each first modulated symbol in the first modulated symbol stream by first amplitude coefficient $a_1$. Multiplier 624 multiplies, by second amplitude coefficient $a_2$, each second modulated symbol in the second modulated symbol stream converted by converter 625. Adder 630 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 640 sends the generated superposed modulated symbol stream as a signal. More specifically, RF unit 640 generates, from the superposed modulated symbol stream generated by adder 630, a radio-frequency signal as a signal corresponding to the superposed modulated symbol stream to send such a radio-frequency signal from the antenna.

Stated differently, the superposer constituted by multiplier 614, multiplier 624, and adder 630 superposes the first modulated symbol stream and the second modulated symbol stream at a predetermined amplitude ratio, thereby generating a multiplexed signal into which the first data series and the second data series are multiplexed. Subsequently, RF unit 640 sends the multiplexed signal. Note that the multiplexed signal corresponds to the superposed modulated symbol stream. Also note that the predetermined amplitude ratio may be 1:1, and that the multiplication may be omitted.

The following shows an example case in which QPSK is used as the first mapping scheme to describe the operation of converter 625.

For example, when $S_1(t)$ is the t-th modulated symbol in the first modulated symbol stream generated by mapper 613, and $b_1(t)$ and $b_2(t)$ are a plurality of bits to be mapped onto $S_1(t)$, modulated symbol $S_1(t)$ is given by Equation 8.

[Math. 8]

$$S_1(t) = \frac{(2 \cdot b_1(t) - 1) + i \cdot (2 \cdot b_2(t) - 1)}{\sqrt{2}} \qquad \text{(Equation 8)}$$

Here, i denotes the imaginary unit. Modulated symbol $S_1(t)$ may also be given by an equation in which one of or both of the polarities of the real part and the imaginary part of Equation 8 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 625 converts, into $S'_2(t)$, the t-th modulated symbol $S_2(t)$ in the second modulated symbol stream generated by mapper 623, on the basis of modulated symbol $S_1(t)$ as shown by Equation 9.

[Math. 9]

$$S'_2(t) = -\text{sgn}(Re[S_1(t)]) \cdot Re[S_2(t)] - i \cdot \text{sgn}(Im[S_1(t)]) \cdot Im[S_2(t)] \qquad \text{(Equation 9)}$$

Here, $S'_2(t)$ is the converted t-th modulated symbol in the second modulated symbol stream. $Re[S_2(t)]$ is the value of the real part of $S_2(t)$, and $Im[S_2(t)]$ is the value of the imaginary part of $S_2(t)$. Also, $\text{sgn}(Re[S_1(t)])$ is the polarity of the real part of $S_1(t)$, and $\text{sgn}(Im[S_1(t)])$ is the polarity of the imaginary part of $S_1(t)$.

Modulated symbol $S'_2(t)$ may be given by an equation in which one of or both of the polarities of the real part and the imaginary part of Equation 9 are reversed. Note that the conversion that is based on Equation 9 is substantially the same as the conversion that is based on Equation 7.

As described above, the variation of superposition coding controls the polarities of the real part and the imaginary part of each second modulated symbol in accordance with the first modulated symbol that is superposed with such a second modulated symbol. Note that the polarities of the real part and the imaginary part of each second modulated symbol may be controlled in accordance with the values of the bits to be mapped onto the first modulated symbol that is superposed with such a second modulated symbol. Also, the polarity of one of the real part and the imaginary part of each second modulated symbol may be controlled, or the polarities of both the real part and the imaginary part of each second modulated symbol may be controlled.

Figure 15:
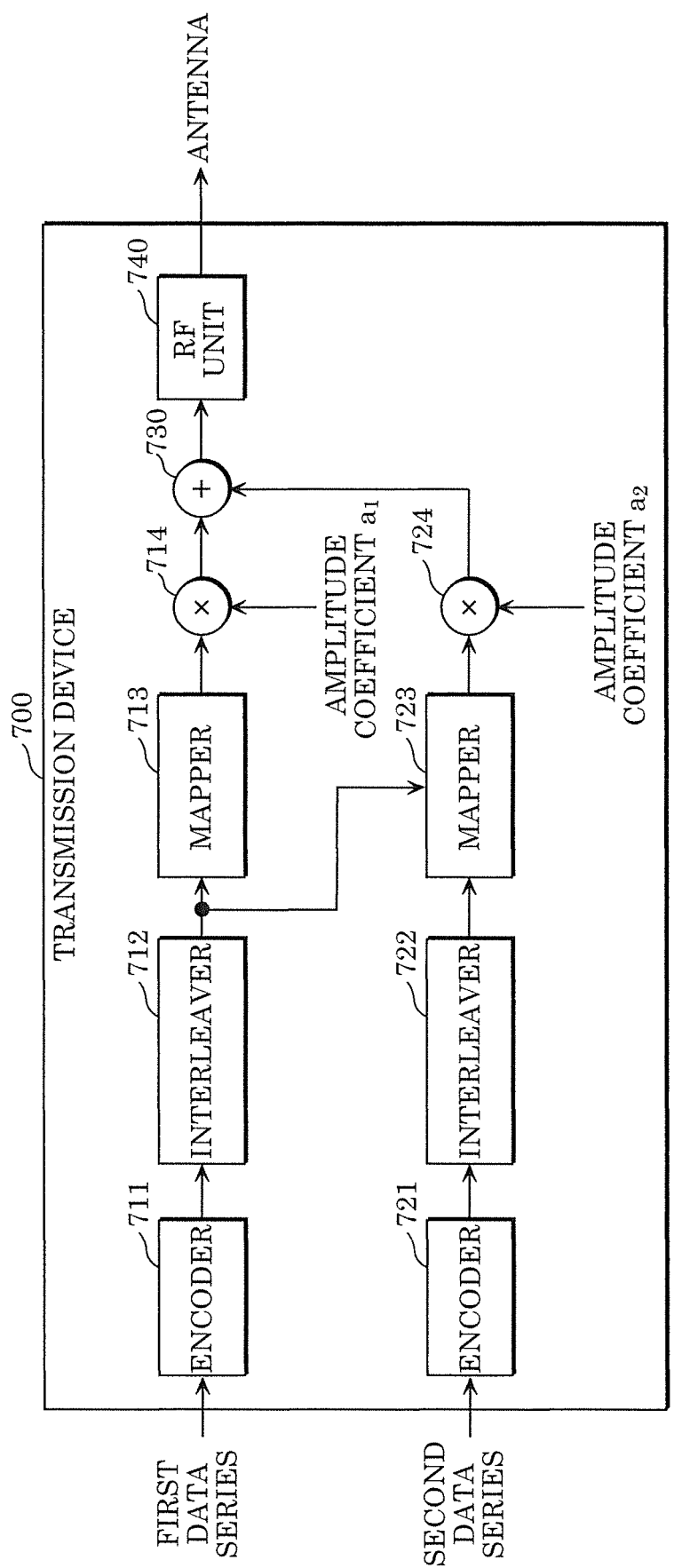
FIG. 15 is a block diagram of a third example configuration of the transmission device according to Embodiment 3.

FIG. 15 shows an example configuration of transmission device 700 that multiplexes two data series onto two layers by the variation of superposition coding, and transmits the multiplexed data series. The configuration of transmission device 700 is different from the configurations of transmission devices 500 and 600. The configuration and operation of transmission device 700 will be described with reference to FIG. 15.

Transmission device 700 includes encoder 711, interleaver 712, mapper 713, multiplier 714, encoder 721, interleaver 722, mapper 723, multiplier 724, adder 730, and RF unit 740. These structural components may also be implemented as dedicated or general-purpose circuits. Multiplier 714, multiplier 724, and adder 730 can also be represented collectively as a superposer. RF unit 740 can also be represented as a transmitter. RF unit 740 may include an antenna. Mapper 723 may include a converter.

Encoder 711 encodes an inputted first data series on the basis of a first error control coding scheme to generate a first bit stream. Interleaver 712 permutes the bits in the first bit stream generated by encoder 711 on the basis of a first permutation rule. Such permutation is also referred to as interleaving.

Mapper 713 maps the first bit stream permuted by interleaver 712 in accordance with a first mapping scheme to generate a first modulated symbol stream that includes a plurality of first modulated symbols. In the mapping in accordance with the first mapping scheme, mapper 713 maps each group of bits that includes a first number of bits in the first bit stream onto one of the signal points in a first constellation in accordance with the values of such a group of bits.

Encoder 721 encodes an inputted second data series on the basis of a second error control coding scheme to generate a second bit stream. Interleaver 722 permutes the bits in the second bit stream generated by encoder 721 on the basis of a second permutation rule. Such permutation is also referred to as interleaving.

Mapper 723 converts (modifies) a second mapping scheme in accordance with the first bit stream to be mapped to the first modulated symbol stream by mapper 713. Mapper 723 then maps the second bit stream interleaved by interleaver 722 in accordance with the second mapping scheme that has been converted in accordance with the first bit stream. Through these processes, mapper 723 generates a second modulated symbol stream that includes a plurality of second modulated symbols.

In the mapping in accordance with the second mapping scheme, mapper 723 maps each group of bits that includes a second number of bits in the second bit stream onto one of the signal points in a second constellation in accordance with the values of such a group of bits.

Multiplier 714 multiplies each first modulated symbol in the first modulated symbol stream by first amplitude coefficient $a_1$. Multiplier 724 multiplies each second modulated symbol in the second modulated symbol stream by second amplitude coefficient $a_2$. Adder 730 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 740 sends the generated superposed modulated symbol stream as a signal. More specifically, RF unit 740 generates, from the superposed modulated symbol stream generated by adder 730, a radio-frequency signal as a signal corresponding to the superposed modulated symbol stream to send such a radio-frequency signal from the antenna.

Stated differently, the superposer constituted by multiplier 714, multiplier 724, and adder 730 superposes the first modulated symbol stream and the second modulated symbol stream at a predetermined amplitude ratio, thereby generating a multiplexed signal into which the first data series and the second data series are multiplexed. Subsequently, RF unit 740 sends the multiplexed signal. Note that the multiplexed signal corresponds to the superposed modulated symbol stream. Also note that the predetermined amplitude ratio may be 1:1, and that the multiplication may be omitted.

The following shows an example case in which QPSK is used as the first mapping scheme to describe the operation of mapper 723.

For example, when $S_1(t)$ is the t-th modulated symbol in the first modulated symbol stream generated by mapper 713, and $b_1(t)$ and $b_2(t)$ are a plurality of bits to be mapped onto $S_1(t)$, modulated symbol $S_1(t)$ is given by Equation 10.

[Math. 10]

$$S_1(t) = \frac{(2 \cdot b_1(t) - 1) + i \cdot (2 \cdot b_2(t) - 1)}{\sqrt{2}} \qquad \text{(Equation 10)}$$

Here, i denotes the imaginary unit. Modulated symbol $S_1(t)$ may also be given by an equation in which one of or both of the polarities of the real part and the imaginary part of Equation 10 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Mapper 723 performs exclusive-OR between $b_1(t)$ and the bit that most contributes to the real part of the second constellation among the bits in the second bit stream inputted from interleaver 722. Mapper 723 also performs exclusive-OR between $b_2(t)$ and the bit that most contributes to the imaginary part of the second constellation among the bits in the second bit stream inputted from interleaver 722. Mapper 723 then maps the second bit stream on which exclusive-OR has been performed, on the basis of the second constellation.

Here, the bit that most contributes to the real part of the second constellation is a bit that causes the polarity of the real part of the second constellation to be reversed, for example, when the value of such a bit is reversed from 0 to 1 or from 1 to 0. Stated differently, the bit that most contributes to the real part of the second constellation refers to a bit that causes the negative/positive sign of the value of the real part of each modulated symbol to be reversed, for example, when the value of such a bit is reversed from 0 to 1 or from 1 to 0.

Similarly, the bit that most contributes to the imaginary part of the second constellation is a bit that causes the polarity of the imaginary part of the second constellation to be reversed, for example, when the value of such a bit is reversed from 0 to 1 or from 1 to 0. Stated differently, the bit that most contributes to the imaginary part of the second constellation refers to a bit that causes the negative/positive sign of the value of the imaginary part of each modulated symbol to be reversed when the value of such a bit is reversed from 0 to 1 or from 1 to 0.

In the above description, mapper 723 converts the second bit stream, thereby substantially converting the second mapping scheme (the second constellation). However, mapper 723 may directly convert the second mapping scheme (the second constellation) without converting the second bit stream. Stated differently, mapper 723 may convert the correspondence between groups of bits and signal points in the second constellation.

Also, the conversion performed by mapper 723 may be performed by the converter included in mapper 723.

As described above, the variation of superposition coding controls the polarities of the real part and the imaginary part of each second modulated symbol in accordance with the values of the bits to be mapped onto the first modulated symbol that is superposed with such a second modulated symbol. Note that the polarities of the real part and the imaginary part of each second modulated symbol may be controlled in accordance with the first modulated symbol that is superposed with such a second modulated symbol. Also, the polarity of one of the real part and the imaginary part of each second modulated symbol may be controlled, or the polarities of both the real part and the imaginary part of each second modulated symbol may be controlled.

<Sequential Decoding of Signal Obtained by Variation of Superposition Coding>

Figure 16:
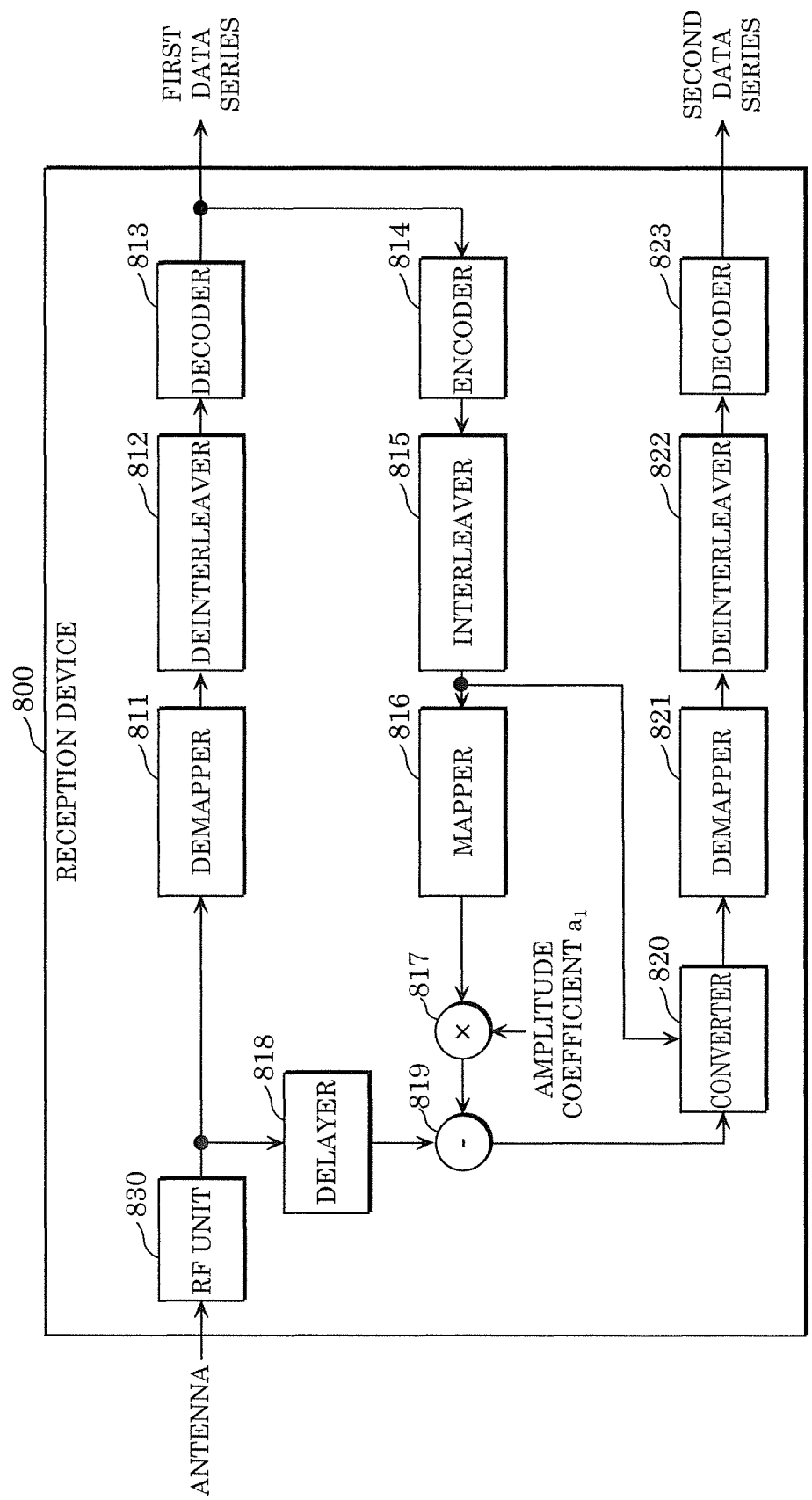
FIG. 16 is a block diagram of a first example configuration of a reception device according to Embodiment 3.

FIG. 16 shows an example configuration of reception device 800 capable of receiving and sequentially decoding the signal on which two data series are multiplexed onto two layers by the above-described variation of superposition coding, and capable of obtaining one of or both of the multiplexed two data series. The configuration and operation of reception device 800 will be described with reference to FIG. 16.

Reception device 800 includes RF unit 830, demapper 811, deinterleaver 812, decoder 813, encoder 814, interleaver 815, mapper 816, multiplier 817, delayer 818, subtractor 819, converter 820, demapper 821, deinterleaver 822, and decoder 823. These structural components may also be implemented as dedicated or general-purpose circuits.

Demapper 811, deinterleaver 812, decoder 813, encoder 814, interleaver 815, mapper 816, multiplier 817, delayer 818, subtractor 819, converter 820, demapper 821, deinterleaver 822, and decoder 823 can also be represented collectively as a deriver. RF unit 830 can also be represented as a receiver. RF unit 830 may include an antenna.

Reception device 800 receives by an antenna the multiplexed signal sent from transmission device 500, 600, or 700, and inputs such a multiplexed signal into RF unit 830. Stated differently, RF unit 830 receives the multiplexed signal via the antenna. The multiplexed signal received by RF unit 830 is also represented as a received signal, and corresponds to the superposed modulated symbol stream into which the first modulated symbol stream and the second modulated symbol stream are multiplexed. RF unit 830 generates a baseband received signal from the radio-frequency received signal.

Demapper 811 demaps the baseband received signal on the basis of the first constellation of the first mapping scheme to generate the first bit likelihood stream. For example, amplitude coefficient $a_1$ is reflected in the first constellation for demapping.

Deinterleaver 812 permutes the first bit likelihood stream on the basis of a permutation rule that is a reverse rule of the first permutation rule. Such permutation is also referred to as deinterleaving. Decoder 813 performs decoding that is based on the first error control coding scheme by use of the first bit likelihood stream permuted by deinterleaver 812, and outputs the decoding result as the first data series.

Here, of the received signal corresponding to the superposed modulated symbol stream, demapper 811 treats the components corresponding to the second modulated symbols in the second data series as an unknown signal (noise), and performs demapping on the basis of the first constellation of the first mapping scheme.

When only the first data series is to be obtained, reception device 800 terminates the process upon completing the estimation of the first data series. Meanwhile, when the second data series is to be obtained in addition to the first data series, or when only the second data series is to be obtained, reception device 800 performs the processes described below to obtain the second data series.

Encoder 814 encodes the first data series obtained by decoder 813 on the basis of the first error control coding scheme to generate the first bit stream. Interleaver 815 permutes the bits in the first bit stream generated by encoder 814 on the basis of the first permutation rule. Such permutation is also referred to as interleaving.

Mapper 816 maps the first bit stream permuted by interleaver 815 in accordance with the first mapping scheme to generate the first modulated symbol stream that includes a plurality of first modulated symbols. Multiplier 817 multiplies the first modulated symbol stream outputted by mapper 816 by first amplitude coefficient $a_1$.

Delayer 818 delays the received signal outputted from RF unit 830 during the time from when RF unit 830 outputs the baseband received signal to when multiplier 817 outputs the reproduced first modulated symbol stream.

Subtractor 819 subtracts, from the received signal delayed by delayer 818, the first modulated symbol stream multiplied by first amplitude coefficient $a_1$ by multiplier 817. Through this, subtractor 819 removes the components corresponding to the first modulated symbols from the received signal on which the components corresponding to the first modulated symbols, the components corresponding to the second modulated symbols, and noise are superposed. Subsequently, subtractor 819 outputs a signal on which the components corresponding to the second modulated symbols and noise are superposed as a signal corresponding to the second modulated symbol stream.

Converter 820 converts the signal outputted from subtractor 819 as a signal corresponding to the second modulated symbol stream by use of the first bit stream reproduced through encoding, interleaving, etc. Demapper 821 demaps the signal outputted by converter 820 on the basis of the second constellation of the second mapping scheme to generate the second bit likelihood stream. For example, amplitude coefficient $a_2$ is reflected in the second constellation for demapping.

Deinterleaver 822 permutes the second bit likelihood stream on the basis of a permutation rule that is a reverse rule of the second permutation rule. Such permutation is also referred to as deinterleaving. Decoder 823 decodes the second bit likelihood stream permuted by deinterleaver 822 on the basis of the second error control coding scheme, and outputs the decoding result as the second data series.

The following shows an example case in which QPSK is used as the first mapping scheme to describe the operation of converter 820.

For example, when $S_1(t)$ is the t-th modulated symbol in the first modulated symbol stream generated by mapper 816, and $b_1(t)$ and $b_2(t)$ are a plurality of bits to be mapped onto $S_1(t)$, modulated symbol $S_1(t)$ is given by Equation 11.

[Math. 11]

$$S_1(t) = \frac{(2 \cdot b_1(t) - 1) + i \cdot (2 \cdot b_2(t) - 1)}{\sqrt{2}} \quad \text{(Equation 11)}$$

Here, i denotes the imaginary unit. Modulated symbol $S_1(t)$ may also be given by an equation in which one of or both of the polarities of the real part and the imaginary part of Equation 11 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 820 converts, into $S'_2(t)$, signal $S_2(t)$ corresponding to the t-th modulated symbol in the second modulated symbol stream out of the signal outputted by subtractor 819, on the basis of $b_1(t)$ and $b_2(t)$ as shown by Equation 12.

[Math. 12]

$$S'_2(t) = (-1)^{b_1(t)} \cdot Re[S_2(t)] + i \cdot (-1)^{b_2(t)} \cdot Im[S_2(t)] \quad \text{(Equation 12)}$$

Here, $S'_2(t)$ is the signal that has undergone the conversion. Also, $Re[S_2(t)]$ is the value of the real part of $S_2(t)$, and $Im[S_2(t)]$ is the value of the imaginary part of $S_2(t)$. Signal $S'_2(t)$ that has undergone the conversion may be given by an equation in which one of or both of the polarities of the real part and the imaginary part of Equation 12 are reversed.

Through the above processes, reception device 800 obtains one of or both of the first data series and the second data series from the signal received by the antenna.

Figure 17:
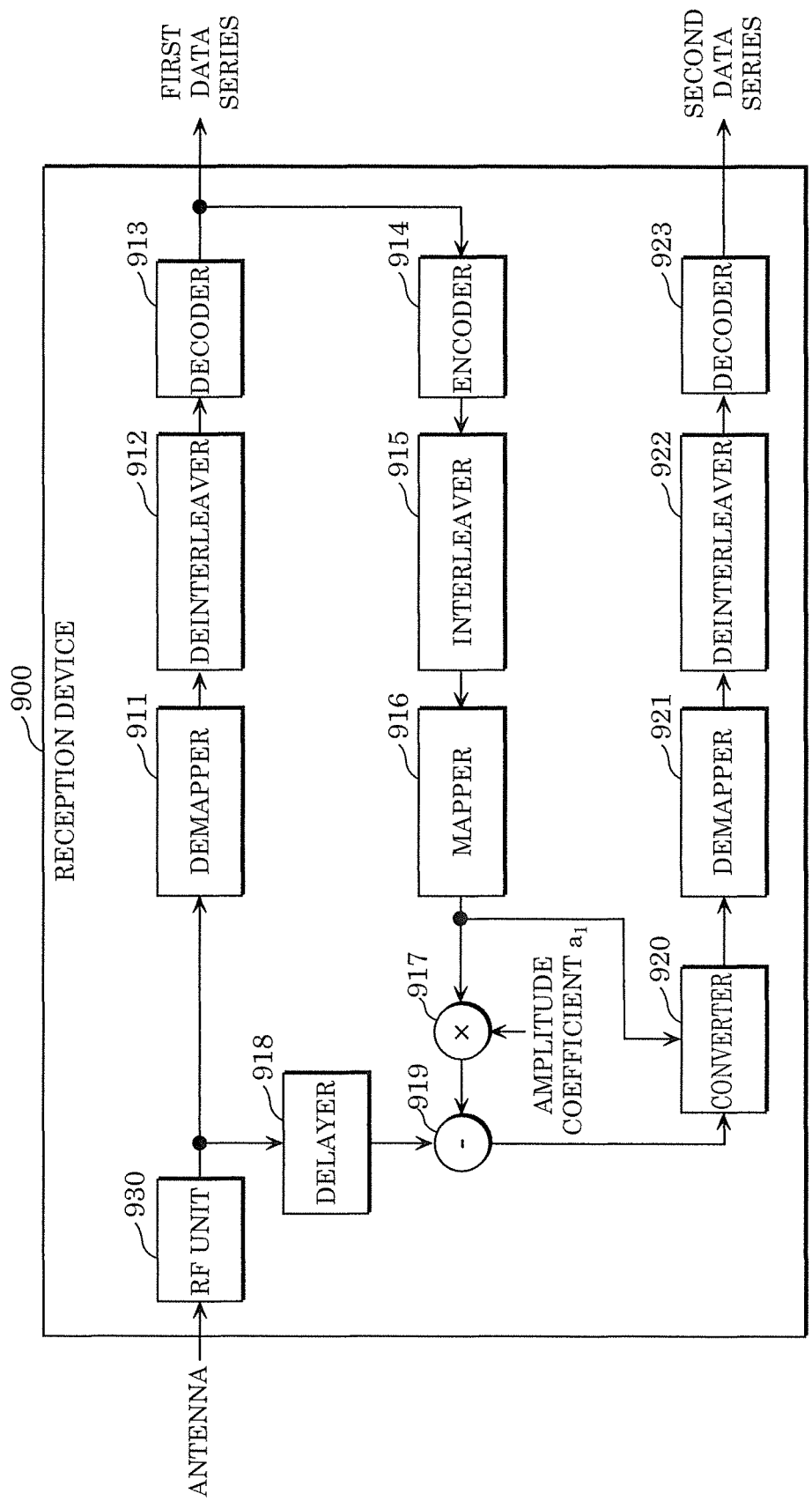
FIG. 17 is a block diagram of a second example configuration of the reception device according to Embodiment 3.

FIG. 17 shows an example configuration of reception device 900 capable of receiving and sequentially decoding the signal on which two data series are multiplexed onto two layers by the above-described variation of superposition coding, and capable of obtaining one of or both of the multiplexed two data series. The configuration of reception device 900 is different from the configuration of reception device 800. The configuration and operation of reception device 900 will be described with reference to FIG. 17.

Reception device 900 includes RF unit 930, demapper 911, deinterleaver 912, decoder 913, encoder 914, interleaver 915, mapper 916, multiplier 917, delayer 918, subtractor 919, converter 920, demapper 921, deinterleaver 922, and decoder 923. These structural components may also be implemented as dedicated or general-purpose circuits.

Demapper 911, deinterleaver 912, decoder 913, encoder 914, interleaver 915, mapper 916, multiplier 917, delayer 918, subtractor 919, converter 920, demapper 921, deinterleaver 922, and decoder 923 can also be represented collectively as a deriver. RF unit 930 can also be represented as a receiver. RF unit 930 may include an antenna.

Reception device 900 receives by an antenna the multiplexed signal sent from transmission device 500, 600, or 700, and inputs such a multiplexed signal into RF unit 930. Stated differently, RF unit 930 receives the multiplexed signal via the antenna. The multiplexed signal received by RF unit 930 is also represented as a received signal, and corresponds to the superposed modulated symbol stream into which the first modulated symbol stream and the second modulated symbol stream are multiplexed. RF unit 930 generates a baseband received signal from the radio-frequency received signal.

Demapper 911 demaps the baseband received signal on the basis of the first constellation of the first mapping scheme to generate the first bit likelihood stream. For example, amplitude coefficient $a_1$ is reflected in the first constellation for demapping.

Deinterleaver 912 permutes the first bit likelihood stream on the basis of a permutation rule that is a reverse rule of the first permutation rule. Such a permutation is also referred to as deinterleaving. Decoder 913 performs decoding that is based on the first error control coding scheme by use of the first bit likelihood stream permuted by deinterleaver 912, and outputs the decoding result as the first data series.

Here, of the received signal corresponding to the superposed modulated symbol stream, demapper 911 treats the components corresponding to the second modulated symbols in the second data series as an unknown signal (noise), and performs demapping on the basis of the first constellation of the first mapping scheme.

When only the first data series is to be obtained, reception device 900 terminates the process upon completing the estimation of the first data series. Meanwhile, when the second data series is to be obtained in addition to the first data series, or when only the second data series is to be obtained, reception device 900 performs the processes described below to obtain the second data series.

Encoder 914 encodes the first data series obtained by decoder 913 on the basis of the first error control coding scheme to generate the first bit stream. Interleaver 915 permutes the bits in the first bit stream generated by encoder 914 on the basis of the first permutation rule. Such permutation is also referred to as interleaving.

Mapper 916 maps the first bit stream permuted by interleaver 915 in accordance with the first mapping scheme to generate the first modulated symbol stream that includes a plurality of first modulated symbols. Multiplier 917 multiplies the first modulated symbol stream outputted by mapper 916 by first amplitude coefficient $a_1$.

Delayer 918 delays the received signal outputted from RF unit 930 during the time from when RF unit 930 outputs the baseband received signal to when multiplier 917 outputs the reproduced first modulated symbol stream.

Subtractor 919 subtracts, from the received signal delayed by delayer 918, the first modulated symbol stream multiplied by first amplitude coefficient $a_1$ by multiplier 917. Through this, subtractor 919 removes the components corresponding to the first modulated symbols from the received signal on which the components corresponding to the first modulated symbols, the components corresponding to the second modulated symbols, and noise are superposed. Subsequently, subtractor 919 outputs a signal on which the components corresponding to the second modulated symbols and noise are superposed as a signal corresponding to the second modulated symbol stream.

Converter 920 converts the signal outputted from subtractor 919 as a signal corresponding to the second modulated symbol stream by use of the first modulated symbol stream reproduced through encoding, interleaving, mapping, etc. Demapper 921 demaps the signal outputted by converter 920 on the basis of the second constellation of the second mapping scheme to generate the second bit likelihood stream. For example, amplitude coefficient $a_2$ is reflected in the second constellation for demapping.

Deinterleaver 922 permutes the second bit likelihood stream on the basis of a permutation rule that is a reverse rule of the second permutation rule. Such permutation is also referred to as deinterleaving. Decoder 923 decodes the second bit likelihood stream permuted by deinterleaver 922 on the basis of the second error control coding scheme, and outputs the decoding result as the second data series.

The following shows an example case in which QPSK is used as the first mapping scheme to describe the operation of converter 920.

For example, when $S_1(t)$ is the t-th modulated symbol in the first modulated symbol stream generated by mapper 916, and $b_1(t)$ and $b_2(t)$ are a plurality of bits to be mapped onto $S_1(t)$, modulated symbol $S_1(t)$ is given by Equation 13.

[Math. 13]

$$S_1(t) = \frac{(2 \cdot b_1(t) - 1) + i \cdot (2 \cdot b_2(t) - 1)}{\sqrt{2}} \quad \text{(Equation 13)}$$

Here, i denotes the imaginary unit. Modulated symbol $S_1(t)$ may also be given by an equation in which one of or both of the polarities of the real part and the imaginary part of Equation 13 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 920 converts, into $S'_2(t)$, signal $S_2(t)$ corresponding to the t-th modulated symbol in the second modulated symbol stream out of the signal outputted by subtractor 919, on the basis of modulated symbol $S_1(t)$ as shown by Equation 14.

[Math. 14]

$$S'_2(t) = -\text{sgn}(Re[S_1(t)]) \cdot Re[S_2(t)] - i \cdot \text{sgn}(Im[S_1(t)]) \cdot Im[S_2(t)] \quad \text{(Equation 14)}$$

Here, $S'_2(t)$ is the signal that has undergone the conversion. Also, $Re[S_2(t)]$ is the value of the real part of $S_2(t)$, and $Im[S_2(t)]$ is the value of the imaginary part of $S_2(t)$. Also, $\text{sgn}(Re[S_1(t)])$ is the polarity of the real part of $S_1(t)$, and $\text{sgn}(Im[S_1(t)])$ is the polarity of the imaginary part of $S_1(t)$. Signal $S'_2(t)$ that has undergone the conversion may be given by an equation in which one of or both of the polarities of the real part and the imaginary part of Equation 14 are reversed. Note that the conversion that is based on Equation 14 is substantially the same as the conversion that is based on Equation 12.

Through the above processes, reception device 900 obtains one of or both of the first data series and the second data series from the signal received by the antenna.

Figure 18:
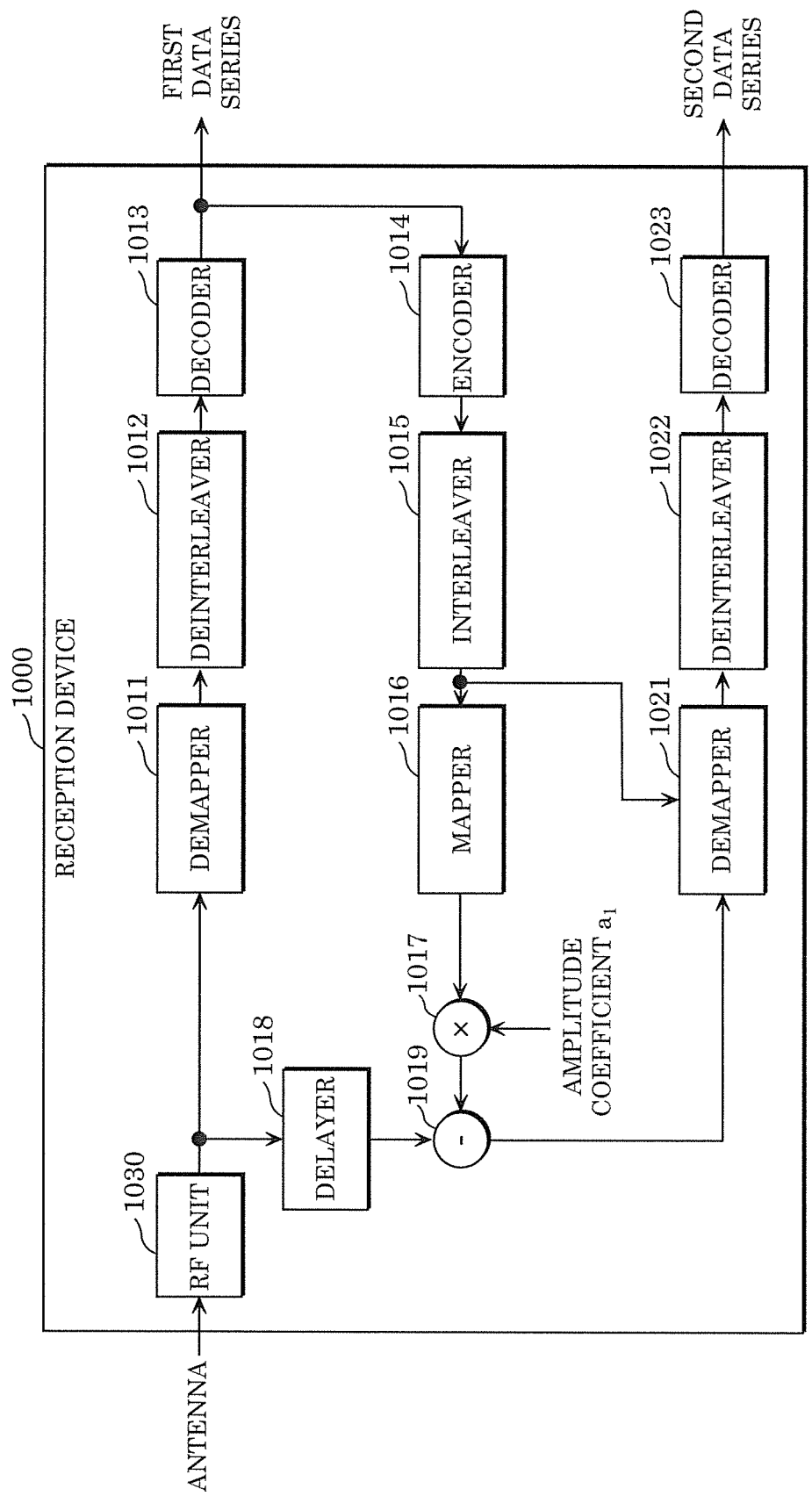
FIG. 18 is a block diagram of a third example configuration of the reception device according to Embodiment 3.

FIG. 18 shows an example configuration of reception device 1000 capable of receiving and sequentially decoding the signal on which two data series are multiplexed onto two layers by the above-described variation of superposition coding, and capable of obtaining one of or both of the multiplexed two data series. The configuration of reception device 1000 is different from the configurations of reception devices 800 and 900. The configuration and operation of reception device 1000 will be described with reference to FIG. 18.

Reception device 1000 includes RF unit 1030, demapper 1011, deinterleaver 1012, decoder 1013, encoder 1014, interleaver 1015, mapper 1016, multiplier 1017, delayer 1018, subtractor 1019, demapper 1021, deinterleaver 1022, and decoder 1023. These structural components may also be implemented as dedicated or general-purpose circuits.

Demapper 1011, deinterleaver 1012, decoder 1013, encoder 1014, interleaver 1015, mapper 1016, multiplier 1017, delayer 1018, subtractor 1019, demapper 1021, deinterleaver 1022, and decoder 1023 can also be represented collectively as a deriver. RF unit 1030 can also be represented as a receiver. RF unit 1030 may include an antenna. Demapper 1021 may include a converter.

Reception device 1000 receives by an antenna the multiplexed signal sent from transmission device 500, 600, or 700, and inputs such a multiplexed signal into RF unit 1030. Stated differently, RF unit 1030 receives the multiplexed signal via the antenna. The multiplexed signal received by RF unit 1030 is also represented as a received signal, and corresponds to the superposed modulated symbol stream into which the first modulated symbol stream and the second modulated symbol stream are multiplexed. RF unit 1030 generates a baseband received signal from the radio-frequency received signal.

Demapper 1011 demaps the baseband received signal on the basis of the first constellation of the first mapping scheme to generate the first bit likelihood stream. For example, amplitude coefficient $a_1$ is reflected in the first constellation for demapping.

Deinterleaver 1012 permutes the first bit likelihood stream on the basis of a permutation rule that is a reverse rule of the first permutation rule. Such permutation is also referred to as deinterleaving. Decoder 1013 performs decoding that is based on the first error control coding scheme by use of the first bit likelihood stream permuted by deinterleaver 1012, and outputs the decoding result as the first data series.

Here, of the received signal corresponding to the superposed modulated symbol stream, demapper 1011 treats the components corresponding to the second modulated symbols in the second data series as an unknown signal (noise), and performs demapping on the basis of the first constellation of the first mapping scheme.

When only the first data series is to be obtained, reception device 1000 terminates the process upon completing the estimation of the first data series. Meanwhile, when the second data series is to be obtained in addition to the first data series, or when only the second data series is to be obtained, reception device 1000 performs the processes described below to obtain the second data series.

Encoder 1014 encodes the first data series obtained by decoder 1013 on the basis of the first error control coding scheme to generate the first bit stream. Interleaver 1015 permutes the bits in the first bit stream generated by encoder 1014 on the basis of the first permutation rule. Such permutation is also referred to as interleaving.

Mapper 1016 maps the first bit stream permuted by interleaver 1015 in accordance with the first mapping scheme to generate the first modulated symbol stream that includes a plurality of first modulated symbols. Multiplier 1017 multiplies the first modulated symbol stream outputted by mapper 1016 by first amplitude coefficient $a_1$.

Delayer 1018 delays the received signal outputted from RF unit 1030 during the time from when RF unit 1030 outputs the baseband received signal to when multiplier 1017 outputs the reproduced first modulated symbol stream.

Subtractor 1019 subtracts, from the received signal delayed by delayer 1018, the first modulated symbol stream multiplied by first amplitude coefficient $a_1$ by multiplier 1017. Through this, subtractor 1019 removes the components corresponding to the first modulated symbols from the received signal on which the components corresponding to the first modulated symbols, the components corresponding to the second modulated symbols, and noise are superposed. Subsequently, subtractor 1019 outputs a signal on which the components corresponding to the second modulated symbols and noise are superposed as a signal corresponding to the second modulated symbol stream.

Demapper 1021 demaps the signal outputted from subtractor 1019 as a signal corresponding to the second modulated symbol stream on the basis of the second constellation of the second mapping scheme to generate the second bit likelihood stream. Such a process reflects the first bit stream reproduced through encoding, interleaving, etc. For example, amplitude coefficient $a_2$ is reflected in the second constellation for demapping.

Deinterleaver 1022 permutes the second bit likelihood stream on the basis of a permutation rule that is a reverse rule of the second permutation rule. Such permutation is also referred to as deinterleaving. Decoder 1023 decodes the second bit likelihood stream permuted by deinterleaver 1022 on the basis of the second error control coding scheme, and outputs the decoding result as the second data series.

The following shows an example case in which QPSK is used as the first mapping scheme to describe the operation of demapper 1021.

For example, when $S_1(t)$ is the t-th modulated symbol in the first modulated symbol stream generated by mapper 1016, and $b_1(t)$ and $b_2(t)$ are a plurality of bits to be mapped onto $S_1(t)$, modulated symbol $S_1(t)$ is given by Equation 15.

[Math. 15]

$$S_1(t) = \frac{(2 \cdot b_1(t) - 1) + i \cdot (2 \cdot b_2(t) - 1)}{\sqrt{2}} \quad \text{(Equation 15)}$$

Here, i denotes the imaginary unit. Modulated symbol $S_1(t)$ may also be given by an equation in which one of or both of the polarities of the real part and the imaginary part of Equation 15 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Demapper 1021 demaps signal $S_2(t)$ outputted from subtractor 1019 as a signal corresponding to the t-th modulated symbol in the second modulated symbol stream on the basis of the second constellation of the second mapping scheme.

Demapper 1021 reverses the bit likelihood corresponding to the bit that most contributes to the real part of the second constellation in accordance with $b_1(t)$ among the bit likelihoods in the bit likelihood stream obtained by demapping. Demapper 1021 also reverses the bit likelihood corresponding to the bit that most contributes to the imaginary part of the second constellation in accordance with $b_2(t)$ among the bit likelihoods in the bit likelihood stream obtained by demapping.

For example, demapper 1021 performs exclusive-OR between $b_1(t)$ and the bit likelihood corresponding to the bit that most contributes to the real part of the second constellation among the bit likelihoods in the bit likelihood stream obtained by demapping. Demapper 1021 also performs exclusive-OR between $b_2(t)$ and the bit likelihood corresponding to the bit that most contributes to the imaginary part of the second constellation among the bit likelihoods in the bit likelihood stream obtained by demapping.

Demapper 1021 then outputs the bit likelihood stream that has undergone the above-described reversal processes as the second bit likelihood stream.

In the above description, demapper 1021 converts the bit likelihood stream, thereby substantially converting the second mapping scheme (the second constellation). However, demapper 1021 may directly convert the second mapping scheme (the second constellation) without converting the bit likelihood stream. Stated differently, demapper 1021 may convert the correspondence between groups of bits and signal points in the second constellation.

Also, the conversion performed by demapper 1021 may be performed by the converter included in demapper 1021.

Through the above processes, reception device 1000 obtains one of or both of the first data series and the second data series from the signal received by the antenna.

<Parallel Decoding of Signal Obtained by Variation of Superposition Coding>

The following describes a reception method for parallel decoding of a signal obtained by the variation of superposition coding according to the present embodiment. The configuration of the transmission device is the same as the configuration of transmission device 500 shown in FIG. 13, transmission device 600 shown in FIG. 14, or transmission device 700 shown in FIG. 15, and thus will not be described. In parallel decoding in the variation of superposition coding, the reception device treats the components of the modulated symbol stream in the first layer as an unknown signal (noise) to decode the second layer, without removing the components of the modulated symbol stream in the first layer included in the received signal.

Figure 19:
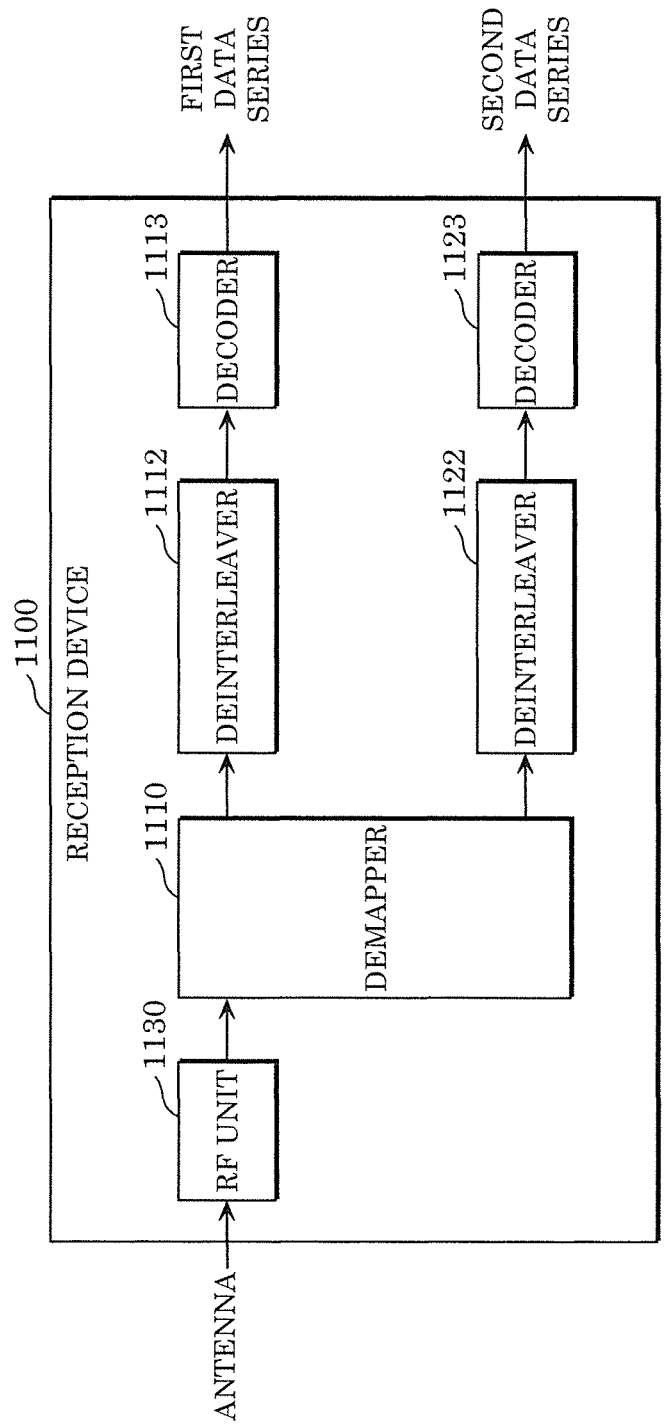
FIG. 19 is a block diagram of a fourth example configuration of the reception device according to Embodiment 3.

FIG. 19 shows an example configuration of reception device 1100 capable of receiving and performing parallel decoding on the signal on which two data series are multiplexed onto two layers by the variation of superposition coding, and capable of obtaining one of or both of the multiplexed two data series. The configuration and operation of reception device 1100 will be described with reference to FIG. 19.

Reception device 1100 includes RF unit 1130, demapper 1110, deinterleaver 1112, decoder 1113, deinterleaver 1122, and decoder 1123. These structural components may also be implemented as dedicated or general-purpose circuits. Demapper 1110, deinterleaver 1112, decoder 1113, deinterleaver 1122, and decoder 1123 can also be represented collectively as a deriver. RF unit 1130 can also be represented as a receiver. RF unit 1130 may include an antenna.

Reception device 1100 receives by an antenna the multiplexed signal sent from transmission device 500, 600, or 700, and inputs such a multiplexed signal into RF unit 1130. Stated differently, RF unit 1130 receives the multiplexed signal via the antenna. The multiplexed signal received by RF unit 1130 is also represented as a received signal. RF unit 1130 generates a baseband received signal from the radio-frequency received signal.

Demapper 1110 demaps the baseband received signal to generate the first bit likelihood stream and the second bit likelihood stream. For example, demapper 1110 performs demapping on the basis of a variation superposition constellation that shows the arrangement of signal points of superposed modulated symbols obtained by superposing the first modulated symbols and the second modulated symbols by the variation of superposition coding.

The variation superposition constellation is determined in accordance with the first constellation of the first mapping scheme, the second constellation of the second mapping scheme, first amplitude coefficient $a_1$, first amplitude coefficient $a_2$, etc.

Figure 20:
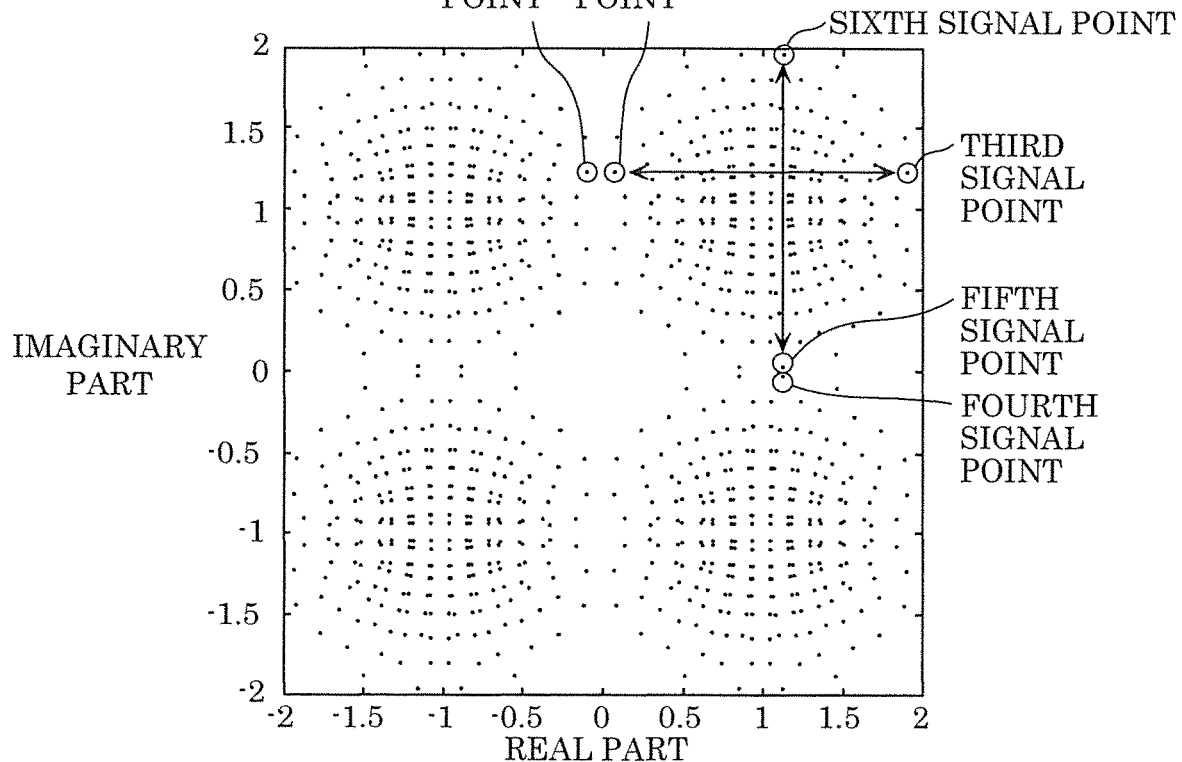
FIG. 20 is a diagram showing an example of a variation superposition constellation according to Embodiment 3.

FIG. 20 shows the variation superposition constellation that supports the variation of superposition coding. More specifically, the variation superposition constellation is a combination of the QPSK constellation shown in FIG. 4 and the Nu-256QAM constellation shown in FIG. 5.

Even more specifically, the Nu-256QAM constellation (256 signal points) is placed on each of the four regions in the complex plane in accordance with the four signal points of the QPSK constellation. These four regions, each corresponding to Nu-256QAM constellation, may partially overlap with each other. The present variation superposition constellation reflects the conversion performed on the second modulated symbol stream.

For example, when the Nu-256QAM constellation is combined with a signal point with a positive real part among the four signal points of the QPSK constellation, the polarity of the real part of the Nu-256QAM constellation is reversed. Also, for example, when the Nu-256QAM constellation is combined with a signal point with a positive imaginary part among the four signal points of the QPSK constellation, the polarity of the imaginary part of the Nu-256QAM constellation is reversed.

More specifically, a first signal point, a second signal point, a third signal point, a fourth signal point, a fifth signal point, and a sixth signal point are shown in FIG. 20. When the polarity of the real part of the Nu-256QAM constellation is not reversed, the first signal point and the third signal point correspond to the same bit values of the second bit stream. Similarly, when the polarity of the imaginary part of the Nu-256QAM constellation is not reversed, the fourth signal point and the sixth signal point correspond to the same bit values of the second bit stream.

When the polarity of the real part of the Nu-256QAM constellation is reversed, the first signal point and the second signal point correspond to the same bit values of the second bit stream. Also, when the polarity of the imaginary part of the Nu-256QAM constellation is reversed, the fourth signal point and the fifth signal point correspond to the same bit values of the second bit stream. Stated differently, such reversal enables a plurality of signal points that correspond to the same bit values of the second bit stream to approach each other and converge. This mitigates the effect of noise on demapping.

Demapper 1110 performs demapping on the basis of the variation superposition constellation as shown in FIG. 20. Stated differently, demapper 1110 generates the first bit likelihood stream with the modulated symbol stream of the second layer remaining unknown, and generates the second bit likelihood stream with the modulated symbol stream of the first layer remaining unknown.

Note that demapper 1110 may use the first constellation of the first mapping scheme to generate the first bit likelihood stream, and may use the above-described variation superposition constellation to generate the second bit likelihood stream.

The first constellation, when used to generate the first bit likelihood stream, enables demapper 1110 to reduce the number of signal points that should be considered in generating the first bit likelihood stream, compared to when the variation superposition constellation is also used to generate the first bit likelihood stream. This thus enables demapper 1110 to reduce the number of arithmetic computations.

Demapper 1110 corresponds, for example, to the first demapper that demaps the received signal to generate the first bit likelihood stream and the second demapper that demaps the received signal to generate the second bit likelihood stream. Demapper 1110 may include the first demapper that demaps the received signal to generate the first bit likelihood stream and the second demapper that demaps the received signal to generate the second bit likelihood stream.

Demapper 1110 may convert the second bit likelihood stream that is generated using not the variation superposition constellation but the superposition constellation, in accordance with the first bit likelihood stream. This enables demapper 1110 to obtain the same second bit likelihood stream as the second bit likelihood stream that is generated using the variation superposition constellation.

Demapper 1110 may convert the multiplexed signal without using the variation superposition constellation to obtain the same second bit likelihood stream as the second bit likelihood stream that is generated using the variation superposition constellation.

Deinterleaver 1112 permutes the first bit likelihood stream on the basis of a permutation rule that is a reverse rule of the first permutation rule. Such permutation is also referred to as deinterleaving. Decoder 1113 decodes the first bit likelihood stream permuted by deinterleaver 1112 on the basis of the first error control coding scheme, and outputs the decoding result as the first data series.

Deinterleaver 1122 permutes the second bit likelihood stream on the basis of a permutation rule that is a reverse rule of the second permutation rule. Such permutation is also referred to as deinterleaving. Decoder 1123 decodes the second bit likelihood stream permuted by deinterleaver 1122 on the basis of the second error control coding scheme, and outputs the decoding result as the second data series.

Through the above processes, reception device 1100 obtains one of or both of the first data series and the second data series from the signal received by the antenna.

Note that transmission devices 500, 600, and 700, and reception devices 800, 900, 1000, and 1100 may omit permutation (interleaving and deinterleaving) as in the case of Embodiment 1. Stated differently, their respective interleavers and deinterleavers are optional structural components, and thus may not be included in these devices.

Interleaving and deinterleaving, however, make a pair. As such, when transmission devices 500, 600, and 700 include their respective interleavers, reception devices 800, 900, 1000, and 1100 basically include their respective deinterleavers and interleavers. Meanwhile, when transmission devices 500, 600, and 700 do not include their respective interleavers, reception devices 800, 900, 1000, and 1100 do not include their respective deinterleavers and interleavers.

Amplitude coefficient $a_1$ may be reflected in the mapping for generating the first modulated symbols performed in reception devices 800, 900, and 1000. In such a case, the multiplication of amplitude coefficient $a_1$ may be omitted. Reception devices 800, 900, and 1000 thus may not include multipliers 817, 917, and 1017, respectively.

Error control coding on the first data series and the second data series may be performed by an external device. In such a case, transmission devices 500, 600, and 700 may omit error control coding, and may not include encoders 511, 521, 611, 621, 711, and 721.

Figure 21:
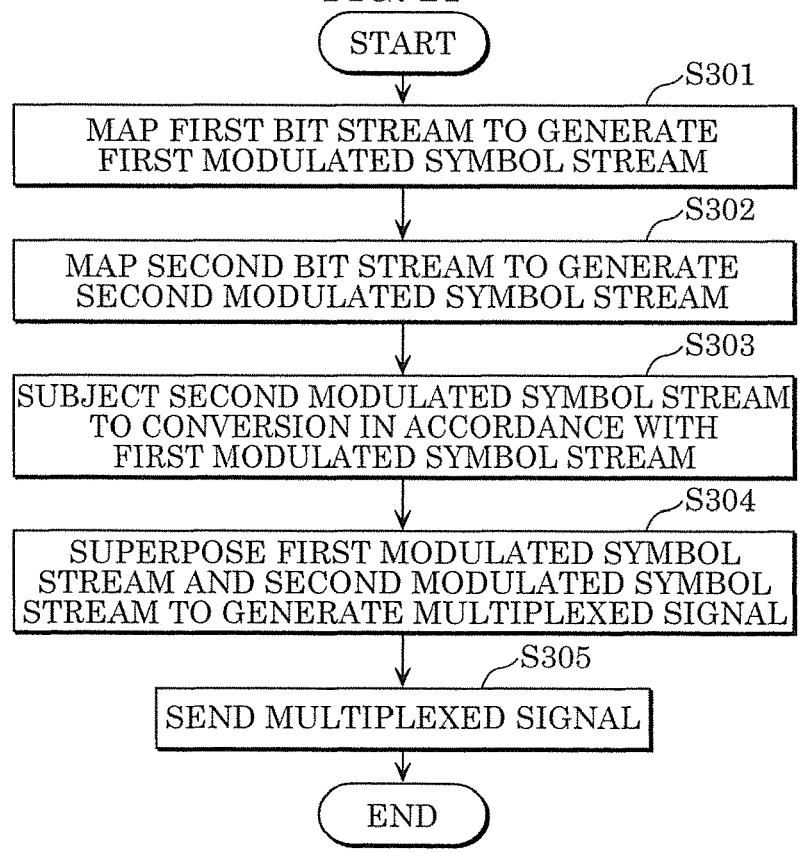
FIG. 21 is a flowchart of an example of transmission operations according to Embodiment 3.

FIG. 21 is a flowchart of example operations performed by transmission device 500. First, mapper 513 maps the first bit stream of the first data series to generate the first modulated symbol stream of the first data series (S301).

Then, mapper 523 maps the second bit stream of the second data series to generate the second modulated symbol stream of the second data series (S302).

Converter 525 subjects the second modulated symbol stream to conversion in accordance with the first modulation symbol stream (S303). More specifically, converter 525 converts the second modulated symbol stream in accordance with the first bit stream, thereby subjecting the second modulated symbol stream to conversion in accordance with the first modulated symbol stream.

Next, the superposer constituted by first multiplier 514, second multiplier 524, and adder 530 superposes the first modulated symbol stream and the second modulated symbol stream that has been subjected to conversion in accordance with the first modulated symbol stream at a predetermined amplitude ratio, thereby generating the multiplexed signal (S304). RF unit 540 then sends the generated multiplexed signal (S305).

Note that in the above operation example, transmission device 500 converts the second modulated symbol stream in accordance with the first bit stream, thereby subjecting the second modulated symbol stream to conversion in accordance with the first modulated symbol stream (S303). Alternatively, transmission device 500 may convert the second modulated symbol stream in accordance with the first modulated symbol stream, as in the case of transmission device 600, thereby subjecting the second modulated symbol stream to conversion in accordance with the first modulated symbol stream.

Alternatively, as in the case of transmission device 700, transmission device 500 may convert the second bit stream or the second mapping scheme (the second constellation) used to generate the second modulated symbol stream, in accordance with the first bit stream. Through this, the second modulated symbol stream may be subjected to conversion in accordance with the first modulated symbol stream. In such a case, the second bit stream or the second mapping scheme is converted before the second modulated symbol stream is generated.

Stated differently, the second bit stream, the second mapping scheme, or the second modulated symbol stream may be converted in accordance with the first bit stream or the first modulated symbol stream, thereby subjecting the second modulated symbol stream to conversion in accordance with the first modulated symbol stream.

Converter 525 may subject the second modulated symbol stream to conversion in accordance with the first modulated symbol stream, thereby controlling the polarities of the real part and the imaginary part of each modulated symbol in the second modulated symbol stream. Through this, converter 525 may reverse the polarity of the real part of each second modulated symbol when the real part of the corresponding first modulated symbol satisfies a predetermined real part condition, and may reverse the polarity of the imaginary part of each second modulated symbol when the imaginary part of the corresponding first modulated symbol satisfies a predetermined condition.

The predetermined real part condition may be a condition that the polarity of the real part should be a predetermined polarity of the real part, or may be a condition that the real part should be within a predetermined range of the real part greater than or equal to one. The predetermined range of the real part greater than or equal to one may be a positive range or a negative range. Similarly, the predetermined imaginary part condition may be a condition that the polarity of the imaginary part should be a predetermined polarity of the imaginary part, or may be a condition that the imaginary part should be within a predetermined range of the imaginary part greater than or equal to one. The predetermined range of the imaginary part greater than or equal to one may be a positive range or a negative range.

Figure 22:
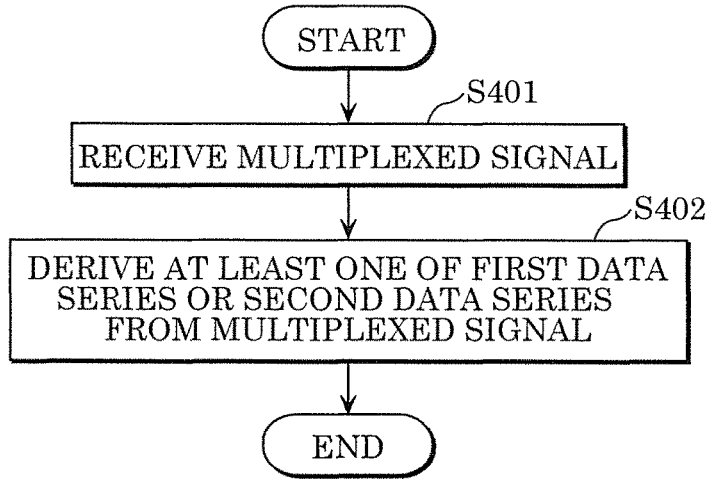
FIG. 22 is a flowchart of an example of reception operations according to Embodiment 3.

FIG. 22 is a flowchart of example operations performed by reception devices 800, 900, 1000, and 1100. First, the receiver receives the multiplexed signal (S401). Here, the receiver is RF unit 830 of reception device 800, RF unit 930 of reception device 900, RF unit 1030 of reception device 1000, or RF unit 1130 of reception device 1100.

The multiplexed signal is a signal into which a plurality of data series including the first data series in the first layer and the second data series in the second layer are multiplexed. The multiplexed signal is also a signal on which the first modulated symbol stream and the second modulated symbol stream are superposed at a predetermined amplitude ratio.

The first modulated symbol stream is a modulated symbol stream that is generated by mapping the first bit stream of the first data series. The second modulated symbol stream is a modulated symbol stream that is generated by mapping the second bit stream of the second data series, and that has been subjected to conversion in accordance with the first modulated symbol stream.

Next, the deriver derives at least one of the first data series or the second data series from the multiplexed signal (S402).

The deriver of reception device 800 is constituted, for example, by demapper 811, deinterleaver 812, decoder 813, encoder 814, interleaver 815, mapper 816, multiplier 817, delayer 818, subtractor 819, converter 820, demapper 821, deinterleaver 822, and decoder 823.

The deriver of reception device 900 is constituted, for example, by demapper 911, deinterleaver 912, decoder 913, encoder 914, interleaver 915, mapper 916, multiplier 917, delayer 918, subtractor 919, converter 920, demapper 921, deinterleaver 922, and decoder 923

The deriver of reception device 1000 is constituted, for example, by demapper 1011, deinterleaver 1012, decoder 1013, encoder 1014, interleaver 1015, mapper 1016, multiplier 1017, delayer 1018, subtractor 1019, demapper 1021, deinterleaver 1022, and decoder 1023

The deriver of reception device 1100 is constituted, for example, by demapper 1110, deinterleaver 1112, decoder 1113, deinterleaver 1122, and decoder 1123.

In accordance with the above operations, the multiplexed signal is received into which the first modulated symbol stream and the second modulated symbol stream that has been subjected to conversion in accordance with the first modulated symbol stream are multiplexed. Then, at least one of the first data series or the second data series is derived from such a multiplexed signal. Stated differently, such a configuration enables: the reception of the multiplexed signal that has been superposed in such a manner that reduces performance degradation at the time of parallel decoding: and an efficient derivation of one of or both of the first data series and the second data series from such a multiplexed signal.

Reception device 1100 as shown in FIG. 19 that performs parallel decoding has lower performance in decoding the second layer than that of reception devices 800, 900, and 1000 as shown in FIG. 16, FIG. 17, and FIG. 18 that perform sequential decoding.

Figure 23:
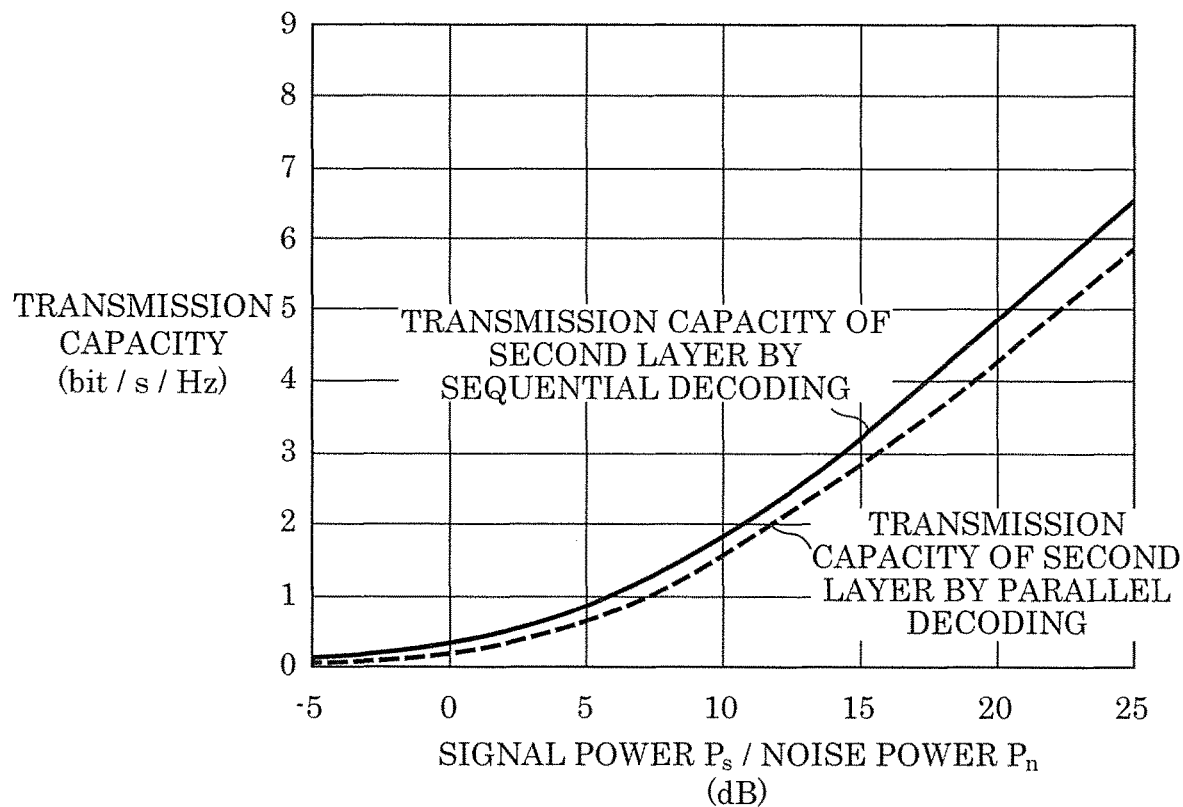
FIG. 23 is a diagram showing an example result of simulation to compare sequential decoding and parallel decoding in a variation of superposition coding.

FIG. 23 shows an example simulation result of the transmission capacity of the second layer when the ratio between signal power $P_{s1}$ of the first layer and signal power $P_{s2}$ of the second layer is $P_{s1}:P_{s2}=2:1$. In FIG. 23, the lateral axis represents as dB (decibel) the ratio of signal power $P_s$ to noise power $P_n$ (SNR), and the vertical axis represents transmission capacity. In FIG. 23, the solid line indicates the transmission capacity of the second layer when sequential decoding is performed, and the broken line indicates the transmission capacity of the second layer when parallel decoding is performed.

As FIG. 23 shows, in the decoding of the second layer, parallel decoding involves an increased SNR with respect to the same transmission capacity and a decreased transmission capacity with respect to the same SNR, compared to sequential decoding.

As described above, reception device 1100 according to the present embodiment that performs parallel decoding has lower performance in decoding the second data series transmitted on the second layer than that of reception devices 800, 900, and 1000 that perform sequential decoding. However, reception device 1100 reduces the number of structural components required to decode the second layer.

More specifically, reception device 1100 eliminates the need for the structural components that are required by reception devices 800, 900, and 1000 shown in FIG. 16, FIG. 17, and FIG. 18 performing sequential decoding to reproduce the modulated symbol stream of the first layer. Stated differently, encoders 814, 914, and 1014, interleavers 815, 915, and 1015, mappers 816, 916, and 1016, and multipliers 817, 917, and 1017 are not required.

Reception device 1100 also eliminates the need for delayers 818, 918, and 1018 that delay the received signal, and subtractors 819, 919, and 1019 that remove the components of the modulated symbols in the first layer reproduced from the received signal.

The circuit size can be thus reduced. Reception device 1100 also requires a smaller number of arithmetic computations and lower power consumption than those required by reception devices 800, 900, and 1000.

Reception devices 800, 900, and 1000 shown in FIG. 16, FIG. 17, and FIG. 18 that perform sequential decoding demodulate the first layer in the received signal to obtain the first data series, and generate the first modulated symbol stream from the obtained first data series. Subsequently, reception devices 800, 900, and 1000 start demodulating the second layer in the received signal to obtain the second data series.

Meanwhile, reception device 1100 according to the present embodiment that performs parallel decoding is capable of simultaneously obtaining the first data series and the second data series in parallel, thereby reducing processing delays.

The reception device may observe the SNR of the received signal to make selection between parallel decoding to be performed when the SNR is high and sequential decoding to be performed when the SNR is low.

In such a case, reception device 800 shown in FIG. 16 includes, for example, a controller that makes selection between sequential decoding and parallel decoding depending on the SNR. Such a controller may be included in RF unit 830 or demapper 821. Furthermore, demapper 821 is configured to perform demapping based on the variation superposition constellation, which is described as an operation performed by demapper 1110 shown in FIG. 19, in addition to demapping that is based on the second constellation.

Demapper 821 switches between demapping to be performed on the signal outputted from converter 820 on the basis of the second constellation and demapping to be performed on the signal outputted from RF unit 830 on the basis of the variation superposition constellation. For example, demapper 821 switches between these demapping operations in accordance with a control signal from the controller.

Note that such a configuration is also obtained by a combination of reception device 400 shown in FIG. 11, reception device 800 (converter 820, demapper 821, etc.) shown in FIG. 16, and reception device 1100 (demapper 1110, etc.) shown in FIG. 19.

Another configuration is that reception device 900 shown in FIG. 17 includes, for example, a controller that makes selection between sequential decoding and parallel decoding depending on the SNR. Such a controller may be included in RF unit 930 or demapper 921. Furthermore, demapper 921 is configured to perform demapping based on the variation superposition constellation, which is described as an operation performed by demapper 1110 shown in FIG. 19, in addition to demapping that is based on the first bit stream and the second constellation.

Demapper 921 switches between demapping to be performed on the signal outputted from converter 920 on the basis of the second constellation and demapping to be performed on the signal outputted from RF unit 930 on the basis of the variation superposition constellation. For example, demapper 921 switches between these demapping operations in accordance with a control signal from the controller.

Note that such a configuration is also obtained by a combination of reception device 400 shown in FIG. 11, reception device 900 (converter 920, demapper 921, etc.) shown in FIG. 17, and reception device 1100 (demapper 1110, etc.) shown in FIG. 19.

Still another configuration is that reception device 1000 shown in FIG. 18 includes, for example, a controller that makes selection between sequential decoding and parallel decoding depending on the SNR. Such a controller may be included in RF unit 1030 or demapper 1021. Furthermore, demapper 1021 is configured to perform demapping based on the variation superposition constellation, which is described as an operation performed by demapper 1110 shown in FIG. 19, in addition to demapping that is based on the first bit stream and the second constellation.

Demapper 1021 switches between demapping to be performed on the signal outputted from subtractor 1019 on the basis of the second constellation and demapping to be performed on the signal outputted from RF unit 1030 on the basis of the variation superposition constellation. For example, demapper 1021 switches between these demapping operations in accordance with a control signal from the controller.

Note that such a configuration is also obtained by a combination of reception device 400 shown in FIG. 11, reception device 1000 (demapper 1021, etc.) shown in FIG. 18, and reception device 1100 (demapper 1110, etc.) shown in FIG. 19.

As described above, reception devices 800, 900, and 1000 perform parallel decoding when the SNR is high, thereby reducing the number of arithmetic computations and power consumption. Reception devices 800, 900, and 1000 also perform parallel decoding when the SNR is high, thereby reducing processing delays. Meanwhile, reception devices 800, 900, and 1000 perform sequential decoding when the SNR is low, thereby increasing the possibility of correctly decoding the second data series.

Comparison between the transmission capacity in the multiplexing scheme utilizing superposition coding shown in FIG. 10 and the transmission capacity in the multiplexing scheme utilizing the variation of superposition coding shown in FIG. 23 presents the findings described below.

The characteristics of the transmission capacities exhibited by sequential decoding (indicated by the solid line) are the same between the multiplexing scheme utilizing superposition coding (FIG. 10) and the multiplexing scheme utilizing the variation of superposition coding (FIG. 23). Meanwhile, the characteristics of the transmission capacities exhibited by parallel decoding (indicated by the broken line) are improved by use of the multiplexing scheme utilizing the variation of superposition coding (FIG. 23) compared to the multiplexing scheme utilizing the superposition coding (FIG. 10). Stated differently, the multiplexing scheme utilizing the variation of superposition coding provides desirable results both in sequential decoding and parallel decoding.

Embodiment 4

<Variation of Superposition Coding (Modified Superposition Coding)>

The present embodiment describes a method of multiplexing a plurality of data series using a variation of superposition coding (modified superposition coding), which is a modified version of the above-described superposition coding, and transmitting the plurality of multiplexed data series.

Figure 24:
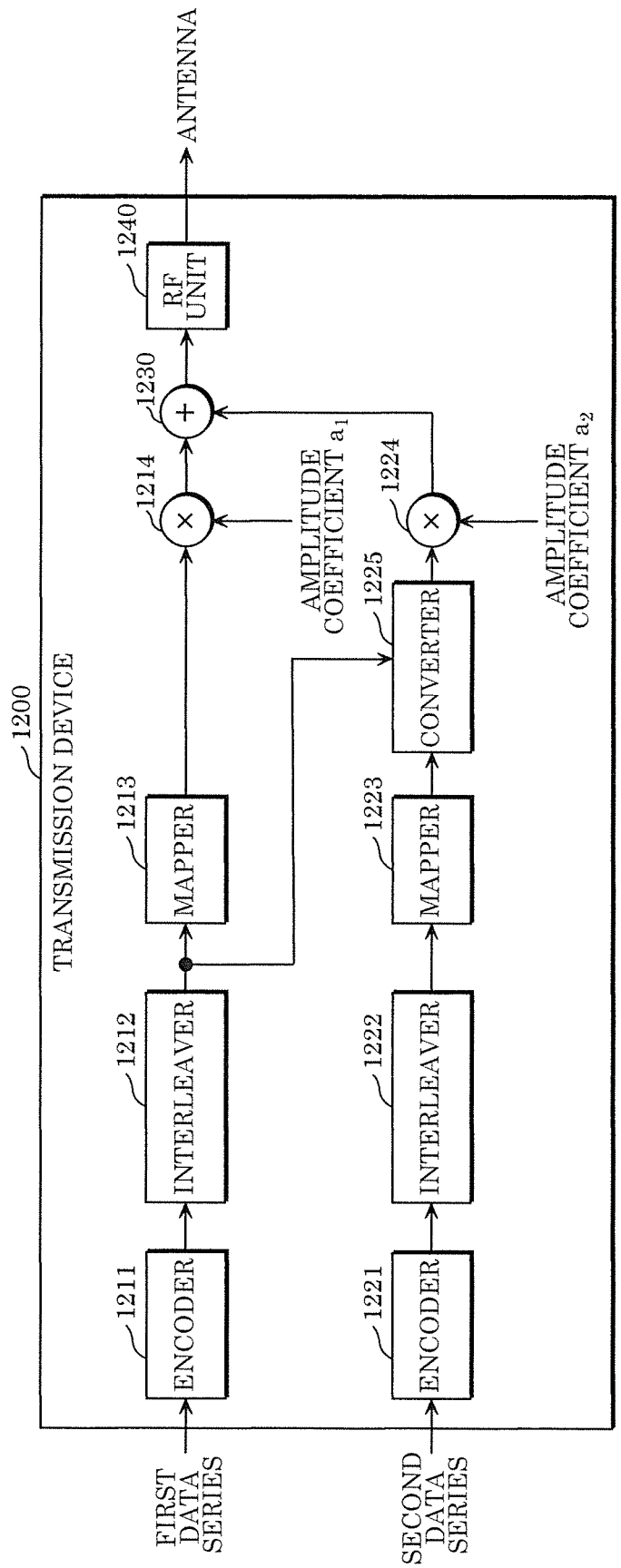
FIG. 24 is a block diagram showing a first example configuration of a transmission device according to Embodiment 4.

FIG. 24 shows an example configuration of transmission device 1200 that multiplexes two data series onto two layers using the variation of superposition coding, and transmits a multiplexed data series. The configuration and operation of transmission device 1200 is to be described with reference to FIG. 24.

Transmission device 1200 includes encoder 1211, interleaver 1212, mapper 1213, multiplier 1214, encoder 1221, interleaver 1222, mapper 1223, converter 1225, multiplier 1224, adder 1230, and RF unit 1240. These structural components may also be implemented as dedicated or general-purpose circuits. Multiplier 1214, multiplier 1224, and adder 1230 can also be represented collectively as a superposer. RF unit 1240 can also be represented as a transmitter. RF unit 1240 may include an antenna.

Encoder 1211 encodes an inputted first data series on the basis of a first error control coding scheme to generate a first bit stream. Interleaver 1212 permutes the bits in the first bit stream generated by encoder 1211 on the basis of a first permutation rule. Such permutation is also referred to as interleaving.

Mapper 1213 maps the first bit stream permuted by interleaver 1212 in accordance with a first mapping scheme to generate a first modulated symbol stream that includes a plurality of first modulated symbols. In the mapping in accordance with the first mapping scheme, mapper 1213 maps each group of bits that includes a first number of bits in the first bit stream onto one of the signal points in a first constellation in accordance with the values of such a group of bits.

When PSK modulation such as BPSK and QPSK, or QAM modulation such as 16QAM and 64QAM is used as the first mapping scheme, each first modulated symbol can be represented by a complex number, for example, with the real part representing the magnitude of the in-phase component and the imaginary part representing the magnitude of the orthogonal component. Meanwhile, when PAM modulation is used as the first mapping scheme, each first modulated symbol can be represented by a real number.

Encoder 1221 encodes an inputted second data series on the basis of a second error control coding scheme to generate a second bit stream. Interleaver 1222 permutes the bits in the second bit stream generated by encoder 1221 on the basis of a second permutation rule. Such permutation is also referred to as interleaving.

Mapper 1223 maps the second bit stream permuted by interleaver 1222 in accordance with a second mapping scheme to generate a second modulated symbol stream that includes a plurality of second modulated symbols. In the mapping in accordance with the second mapping scheme, mapper 1223 maps each group of bits that includes a second number of bits in the second bit stream onto one of the signal points in a second constellation in accordance with the values of such a group of bits.

When PSK modulation such as BPSK and QPSK, or QAM modulation such as 16QAM and 64QAM is used as the second mapping scheme, each second modulated symbol can be represented by a complex number, for example, with the real part representing the magnitude of the in-phase component and the imaginary part representing the magnitude of the orthogonal component. Meanwhile, when PAM modulation is used as the second mapping scheme, each second modulated symbol can be represented by a real number. Any one of a uniform constellation and a non-uniform constellation may be used as the second mapping scheme.

Converter 1225 converts each second modulated symbol to be superposed with the corresponding first modulated symbol, on the basis of the values of the bits used to generate such a first modulated symbol. Through this, converter 1225 converts the second modulated symbol stream.

Multiplier 1214 multiplies each first modulated symbol in the first modulated symbol stream by first amplitude coefficient $a_1$. Multiplier 1224 multiplies, by second amplitude coefficient $a_2$, each second modulated symbol in the second modulated symbol stream converted by converter 1225.

Multiplier 1224 may multiply both the real part and the imaginary part of each second modulated symbol by second amplitude coefficient $a_2$, or may multiply only one of the real part and the imaginary part by second amplitude coefficient $a_2$. Alternatively, multiplier 1224 may multiply the real part and the imaginary part of each second modulated symbol by different amplitude coefficients.

For example, when a first modulated symbol is constituted by only a real part, multiplier 1224 may multiply only the real part of a second modulated symbol by second amplitude coefficient $a_2$. Multiplier 1224 does not need to multiply the imaginary part of the second modulated symbol by an amplitude coefficient, or may multiply the imaginary part by an amplitude coefficient smaller than second amplitude coefficient $a_2$.

Adder 1230 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 1240 sends the generated superposed modulated symbol stream as a signal. More specifically, RF unit 1240 generates, from the superposed modulated symbol stream generated by adder 1230, a radio-frequency signal as a signal corresponding to the superposed modulated symbol stream to send such a radio-frequency signal from the antenna.

Stated differently, the superposer constituted by multiplier 1214, multiplier 1224, and adder 1230 superposes the first modulated symbol stream and the second modulated symbol stream at a predetermined amplitude ratio, thereby generating a multiplexed signal into which the first data series and the second data series are multiplexed. Subsequently, RF unit 1240 sends the multiplexed signal. Note that the multiplexed signal corresponds to the superposed modulated symbol stream.

Also the predetermined amplitude ratio may be fixed (for example, 1:1), and the multiplication may be omitted. In the superposition of the first modulated symbol stream and the second modulated symbol stream, an amplitude ratio constituted by a proportion of the first modulated symbol stream, a proportion of the real component of the second modulated symbol stream, and a proportion of the imaginary component of the second modulated symbol stream may be used as the predetermined amplitude ratio. The proportion of one of the real component and the imaginary component that is not included in the first modulated symbol stream may be higher than the proportion of the other. Note that the proportion can also be represented as weight.

The following shows an example case in which BPSK is used as the first mapping scheme to describe the operation of converter 1225.

For example, when $S_1(t)$ is the t-th modulated symbol in the first modulated symbol stream generated by mapper 1213, and $b_1(t)$ is a bit to be mapped onto $S_1(t)$, modulated symbol $S_1(t)$ is given by Equation 16.

[Math. 16]

$$S_1(t) = 2 \cdot b_1(t) - 1 \quad \text{(Equation 16)}$$

Modulated symbol $S_1(t)$ may also be given by an equation in which the (positive/negative) polarity in Equation 16 is reversed. Converter 1225 converts, into $S'_2(t)$, the t-th modulated symbol $S_2(t)$ in the second modulated symbol stream generated by mapper 1223, on the basis of $b_1(t)$ as shown by Equation 17.

[Math. 17]

$$S'_2(t) = (-1)^{b_1(t)} \cdot Re[S_2(t)] + i \cdot Im[S_2(t)] \quad \text{(Equation 17)}$$

Here, $S'_2(t)$ is the converted t-th modulated symbol in the second modulated symbol stream. Further, i denotes the imaginary unit. $Re[S_2(t)]$ is the value of the real part of $S_2(t)$, and $Im[S_2(t)]$ is the value of the imaginary part of $S_2(t)$. Modulated symbol $S'_2(t)$ may be given by an equation in which one of or both of the polarities of the real part and the imaginary part of Equation 17 are reversed.

As described above, the polarity of the real part of each second modulated symbol is controlled in accordance with the values of the bits to be mapped onto the first modulated symbol that is superposed with such a second modulated symbol. Note that the polarity of the real part of each second modulated symbol may be controlled in accordance with the first modulated symbol that is superposed with such a second modulated symbol.

In the above, superposition coding is performed on the real part. Accordingly, a first modulated symbol is constituted by a real component, and the real component of the first modulated symbol and the real component of a second modulated symbol are superposed on a single real component. However, superposition coding may be performed on the imaginary part. Accordingly, a first modulated symbol may be constituted by an imaginary component, and the imaginary component of the first modulated symbol and the imaginary component of a second modulated symbol may be superposed on a single real component.

Figure 25:
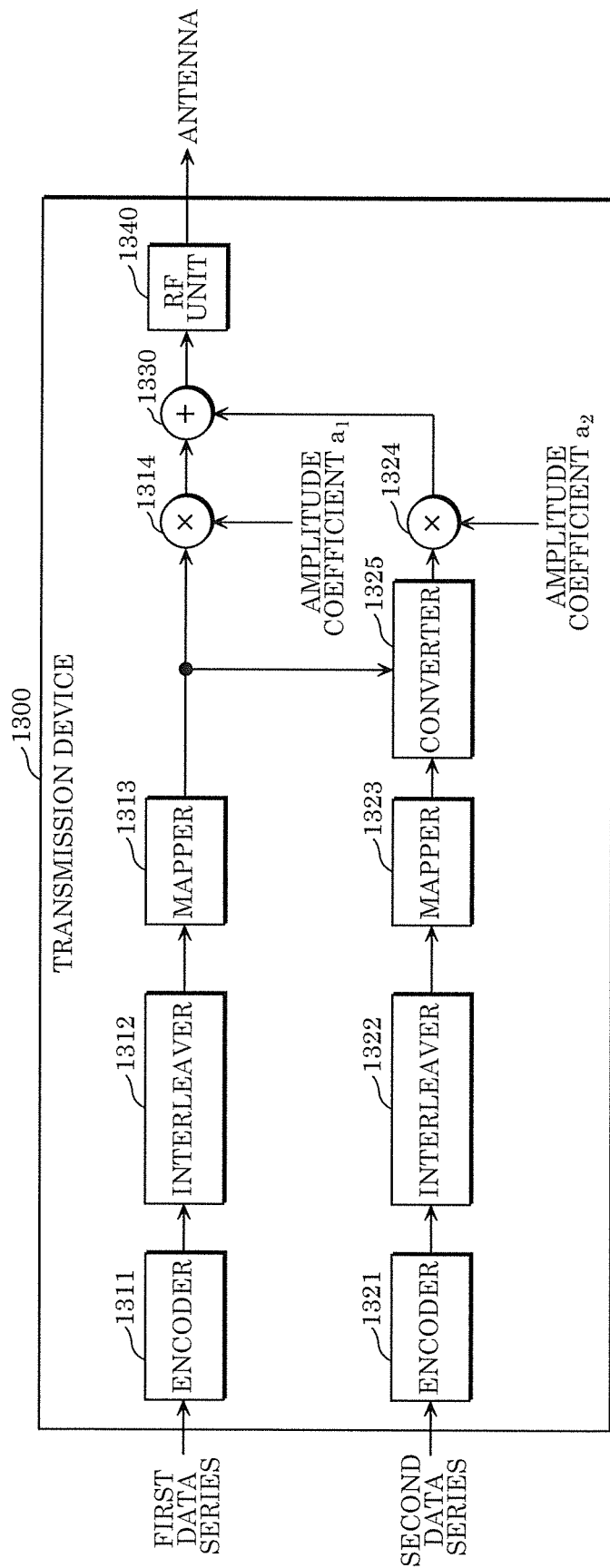
FIG. 25 is a block diagram showing a second example configuration of the transmission device according to Embodiment 4.

FIG. 25 shows an example configuration of transmission device 1300 that multiplexes two data series onto two layers by the variation of superposition coding, and transmits the multiplexed data series. The configuration of transmission device 1300 is different from the configuration of transmission device 1200. The configuration and operation of transmission device 1300 will be described with reference to FIG. 25.

Transmission device 1300 includes encoder 1311, interleaver 1312, mapper 1313, multiplier 1314, encoder 1321, interleaver 1322, mapper 1323, converter 1325, multiplier 1324, adder 1330, and RF unit 1340. These structural components may also be implemented as dedicated or general-purpose circuits. Multiplier 1314, multiplier 1324, and adder 1330 can also be represented collectively as a superposer. RF unit 1340 can also be represented as a transmitter. RF unit 1340 may include an antenna.

Encoder 1311 encodes an inputted first data series on the basis of a first error control coding scheme to generate a first bit stream. Interleaver 1312 permutes the bits in the first bit stream generated by encoder 1311 on the basis of a first permutation rule. Such permutation is also referred to as interleaving.

Mapper 1313 maps the first bit stream permuted by interleaver 1312 in accordance with a first mapping scheme to generate a first modulated symbol stream that includes a plurality of first modulated symbols. In the mapping in accordance with the first mapping scheme, mapper 1313 maps each group of bits that includes a first number of bits in the first bit stream onto one of the signal points in a first constellation in accordance with the values of such a group of bits.

Encoder 1321 encodes an inputted second data series on the basis of a second error control coding scheme to generate a second bit stream. Interleaver 1322 permutes the bits in the second bit stream generated by encoder 1321 on the basis of a second permutation rule. Such permutation is also referred to as interleaving.

Mapper 1323 maps the second bit stream permuted by interleaver 1322 in accordance with a second mapping scheme to generate a second modulated symbol stream that includes a plurality of second modulated symbols. In the mapping in accordance with the second mapping scheme, mapper 1323 maps each group of bits that includes a second number of bits in the second bit stream onto one of the signal points in a second constellation in accordance with the values of such a group of bits.

Converter 1325 converts each second modulated symbol to be superposed with the corresponding first modulated symbol, on the basis of the generated first modulated symbol. Through this, converter 1325 converts the second modulated symbol stream.

Multiplier 1314 multiplies each first modulated symbol in the first modulated symbol stream by first amplitude coefficient $a_1$. Multiplier 1324 multiplies, by second amplitude coefficient $a_2$, each second modulated symbol in the second modulated symbol stream converted by converter 1325.

Multiplier 1324 may multiply both the real part and the imaginary part of a second modulated symbol by second amplitude coefficient $a_2$, or may multiply only one of the real part and the imaginary part by second amplitude coefficient $a_2$. Alternatively multiplier 1324 may multiply the real part and the imaginary part of a second modulated symbol by different amplitude coefficients.

For example, when the first modulated symbol is constituted by only a real part, multiplier 1324 may multiply only the real part of a second modulated symbol by second amplitude coefficient $a_2$. Multiplier 1324 does not need to multiply the imaginary part of the second modulated symbol by an amplitude coefficient, or may multiply the imaginary part by an amplitude coefficient smaller than second amplitude coefficient $a_2$.

Adder 1330 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 1340 sends the generated superposed modulated symbol stream as a signal. More specifically, RF unit 1340 generates, from the superposed modulated symbol stream generated by adder 1330, a radio-frequency signal as a signal corresponding to the superposed modulated symbol stream to send such a radio-frequency signal from the antenna.

Stated differently, the superposer constituted by multiplier 1314, multiplier 1324, and adder 1330 superposes the first modulated symbol stream and the second modulated symbol stream at a predetermined amplitude ratio, thereby generating a multiplexed signal into which the first data series and the second data series are multiplexed. Subsequently, RF unit 1340 sends the multiplexed signal. Note that the multiplexed signal corresponds to the superposed modulated symbol stream.

Also the predetermined amplitude ratio may be fixed (for example, 1:1), and the multiplication may be omitted. In the superposition of the first modulated symbol stream and the second modulated symbol stream, an amplitude ratio constituted by a proportion of the first modulated symbol stream, a proportion of the real component of the second modulated symbol stream, and a proportion of the imaginary component of the second modulated symbol stream may be used as the predetermined amplitude ratio. The proportion of one of the real component and the imaginary component that is not included in the first modulated symbol stream may be higher than the proportion of the other. Note that the proportion can also be represented as weight.

The following shows an example case in which BPSK is used as the first mapping scheme to describe the operation of converter 1325.

For example, when $S_1(t)$ is the t-th modulated symbol in the first modulated symbol stream generated by mapper 1313, and $b_1(t)$ is a bit to be mapped onto $S_1(t)$, modulated symbol $S_1(t)$ is given by Equation 18.

[Math. 18]

$$S_1(t) = 2 \cdot b_2(t) - 1 \quad \text{(Equation 18)}$$

Modulated symbol $S_1(t)$ may also be given by an equation in which the polarity in Equation 18 is reversed. Converter 1325 converts, into $S'_2(t)$, t-th modulated symbol $S_2(t)$ in the second modulated symbol stream generated by mapper 1323, on the basis of modulated symbol $S_1(t)$ as shown by Equation 19.

[Math. 19]

$$S'_2(t) = -\text{sgn}(S_1(t)) \cdot Re[S_2(t)] i \cdot Im[S_2(t)] \quad \text{(Equation 19)}$$

Here, i denotes the imaginary unit. $S'_2(t)$ is the converted t-th modulated symbol in the second modulated symbol stream. $Re[S_2(t)]$ is the value of the real part of $S_2(t)$, and $Im[S_2(t)]$ is the value of the imaginary part of $S_2(t)$. Also, $\text{sgn}(S_1(t))$ is the polarity of $S_1(t)$.

Modulated symbol $S'_2(t)$ may be given by an equation in which one of or both of the polarities of the real part and the imaginary part of Equation 19 are reversed. Note that the conversion that is based on Equation 19 is substantially the same as the conversion that is based on Equation 17.

As described above, the polarity of the real part of each second modulated symbol is controlled in accordance with the first modulated symbol that is superposed with such a second modulated symbol. Note that the polarity of the real part of each second modulated symbol may be controlled in accordance with the values of the bits to be mapped onto the first modulated symbol that is superposed with such a second modulated symbol.

In the above, superposition coding is performed on the real part. Accordingly, a first modulated symbol is constituted by a real component, and the real component of the first modulated symbol and the real component of a second modulated symbol are superposed on a single real component. However, superposition coding may be performed on the imaginary part. Accordingly, a first modulated symbol may be constituted by an imaginary component, and the imaginary component of the first modulated symbol and the imaginary component of a second modulated symbol may be superposed on a single real component.

Figure 26:
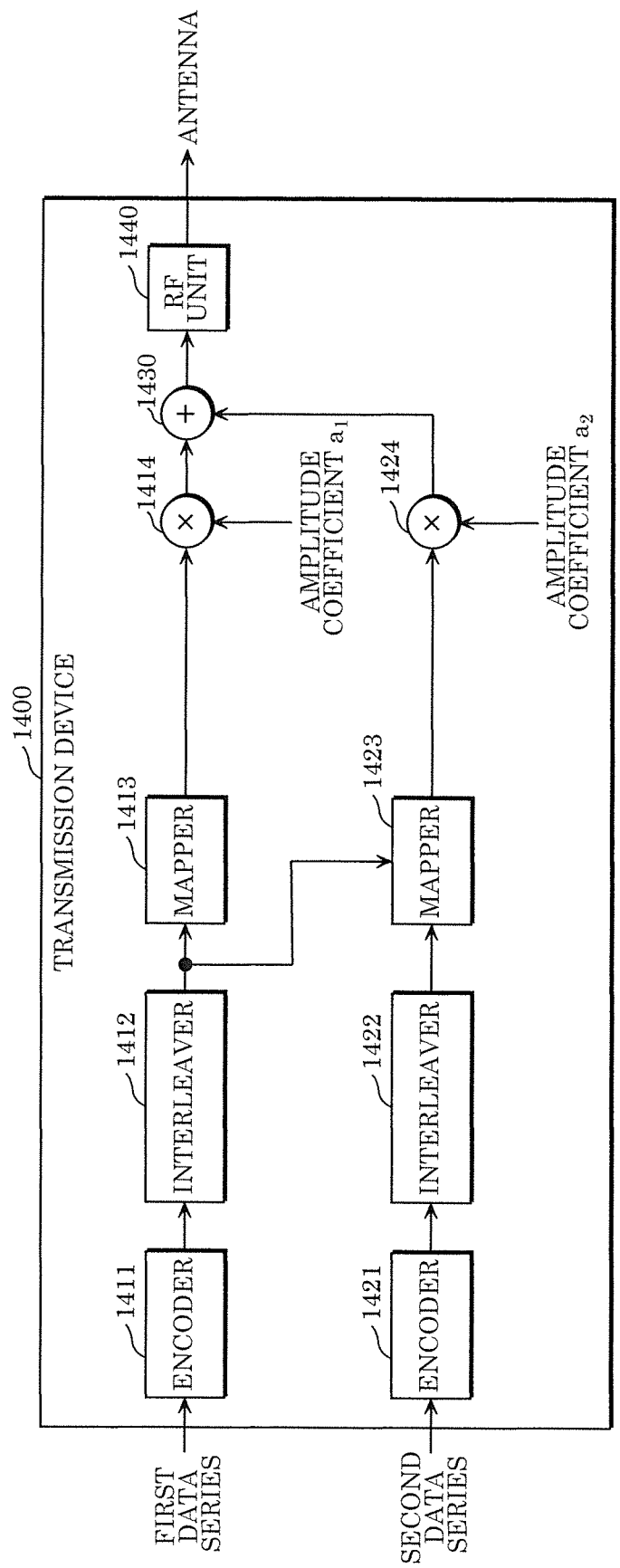
FIG. 26 is a block diagram showing a third example configuration of the transmission device according to Embodiment 4.

FIG. 26 shows an example configuration of transmission device 1400 that multiplexes two data series onto two layers by the variation of superposition coding, and transmits the multiplexed data series. The configuration of transmission device 1400 is different from the configurations of transmission devices 1200 and 1300. The configuration and operation of transmission device 1400 will be described with reference to FIG. 26.

Transmission device 1400 includes encoder 1411, interleaver 1412, mapper 1413, multiplier 1414, encoder 1421, interleaver 1422, mapper 1423, multiplier 1424, adder 1430, and RF unit 1440. These structural components may also be implemented as dedicated or general-purpose circuits. Multiplier 1414, multiplier 1424, and adder 1430 can also be represented collectively as a superposer. RF unit 1440 can also be represented as a transmitter. RF unit 1440 may include an antenna. Mapper 1423 may include a converter.

Encoder 1411 encodes an inputted first data series on the basis of a first error control coding scheme to generate a first bit stream. Interleaver 1412 permutes the bits in the first bit stream generated by encoder 1411 on the basis of a first permutation rule. Such permutation is also referred to as interleaving.

Mapper 1413 maps the first bit stream permuted by interleaver 1412 in accordance with a first mapping scheme to generate a first modulated symbol stream that includes a plurality of first modulated symbols. In the mapping in accordance with the first mapping scheme, mapper 1413 maps each group of bits that includes a first number of bits in the first bit stream onto one of the signal points in a first constellation in accordance with the values of such a group of bits.

Encoder 1421 encodes an inputted second data series on the basis of a second error control coding scheme to generate a second bit stream. Interleaver 1422 permutes the bits in the second bit stream generated by encoder 1421 on the basis of a second permutation rule. Such permutation is also referred to as interleaving.

Mapper 1423 converts (modifies) a second mapping scheme in accordance with the first bit stream to be mapped to the first modulated symbol stream by mapper 1413. Mapper 1423 then maps the second bit stream interleaved by interleaver 1422 in accordance with the second mapping scheme that has been converted in accordance with the first bit stream. Through these processes, mapper 1423 generates a second modulated symbol stream that includes a plurality of second modulated symbols.

In the mapping in accordance with the second mapping scheme, mapper 1423 maps each group of bits that includes a second number of bits in the second bit stream onto one of the signal points in a second constellation in accordance with the values of such a group of bits.

Multiplier 1414 multiplies each first modulated symbol in the first modulated symbol stream by first amplitude coefficient $a_1$. Multiplier 1424 multiplies each second modulated symbol in the second modulated symbol stream by second amplitude coefficient $a_2$.

Multiplier 1424 may multiply both the real part and the imaginary part of a second modulated symbol by second amplitude coefficient $a_2$, or may multiply only one of the real part and the imaginary part by second amplitude coefficient $a_2$. Alternatively, multiplier 1424 may multiply the real part and the imaginary part of a second modulated symbol by different amplitude coefficients.

For example, when a first modulated symbol is constituted by only a real part, multiplier 1424 may multiply only the real part of a second modulated symbol by second amplitude coefficient $a_2$. Multiplier 1424 does not need to multiply the imaginary part of the second modulated symbol by an amplitude coefficient, or may multiply the imaginary part by an amplitude coefficient smaller than second amplitude coefficient $a_2$.

Adder 1430 superposes first modulated symbols multiplied by first amplitude coefficient $a_1$ and second modulated symbols having the real parts multiplied by second amplitude coefficient $a_2$ to generate a superposed modulated symbol stream that includes a plurality of superposed modulated symbols.

RF unit 1440 sends the generated superposed modulated symbol stream as a signal. More specifically, RF unit 1440 generates, from the superposed modulated symbol stream generated by adder 1430, a radio-frequency signal as a signal corresponding to the superposed modulated symbol stream to send such a radio-frequency signal from the antenna.

Stated differently, the superposer constituted by multiplier 1414, multiplier 1424, and adder 1430 superposes the first modulated symbol stream and the second modulated symbol stream at a predetermined amplitude ratio, thereby generating a multiplexed signal into which the first data series and the second data series are multiplexed. Subsequently, RF unit 1440 sends the multiplexed signal. Note that the multiplexed signal corresponds to the superposed modulated symbol stream.

Also the predetermined amplitude ratio may be fixed (for example, 1:1), and the multiplication may be omitted. In the superposition of the first modulated symbol stream and the second modulated symbol stream, an amplitude ratio constituted by a proportion of the first modulated symbol stream, a proportion of the real component of the second modulated symbol stream, and a proportion of the imaginary component of the second modulated symbol stream may be used as the predetermined amplitude ratio. The proportion of one of the real component and the imaginary component that is not included in the first modulated symbol stream may be higher than the proportion of the other. Note that the proportion can also be represented as weight.

The following shows an example case in which BPSK is used as the first mapping scheme to describe the operation of mapper 1423.

For example, when $S_1(t)$ is the t-th modulated symbol in the first modulated symbol stream generated by mapper 1413, and $b_1(t)$ is a bit to be mapped onto $S_1(t)$, modulated symbol $S_1(t)$ is given by Equation 20.

[Math. 20]

$$S_1(t)=2 \cdot b_1(t)-1 \qquad \text{(Equation 20)}$$

Modulated symbol stream $S_1(t)$ may also be given by an equation in which the polarity in Equation 20 is reversed. Mapper 1423 performs exclusive-OR between $b_1(t)$ and the bit that most contributes to the real part of the second constellation among the bits in the second bit stream inputted from interleaver 1422. Mapper 1423 then maps the second bit stream on which exclusive-OR has been performed, on the basis of the second constellation.

Here, the bit that most contributes to the real part of the second constellation is a bit that causes the polarity of the real part of the second constellation to be reversed, for example, when the value of such a bit is reversed from 0 to 1 or from 1 to 0. Stated differently, the bit that most contributes to the real part of the second constellation refers to a bit that causes the negative/positive sign of the value of the real part of each modulated symbol to be reversed, for example, when the value of such a bit is reversed from 0 to 1 or from 1 to 0.

In the above description, mapper 1423 converts the second bit stream, thereby substantially converting the second mapping scheme (the second constellation). However, mapper 1423 may directly convert the second mapping scheme (the second constellation) without converting the second bit stream. Stated differently, mapper 1423 may convert the correspondence between groups of bits and signal points in the second constellation.

Also, the conversion performed by mapper 1423 may be performed by the converter included in mapper 1423.

As described above, the polarity of the real part of each second modulated symbol is controlled in accordance with the values of the bits to be mapped onto the first modulated symbol that is superposed with such a second modulated symbol. Note that the polarity of the real part of each second modulated symbol may be controlled in accordance with the first modulated symbol that is superposed with such a second modulated symbol.

In the above, superposition coding is performed on the real part. Accordingly, a first modulated symbol is constituted by a real component, and the real component of the first modulated symbol and the real component of a second modulated symbol are superposed on a single real component. However, superposition coding may be performed on the imaginary part. Accordingly, a first modulated symbol may be constituted by an imaginary component, and the imaginary component of the first modulated symbol and the imaginary component of a second modulated symbol may be superposed on a single imaginary component.

<Sequential Decoding of Signal Obtained by Variation of Superposition Coding>

Figure 27:
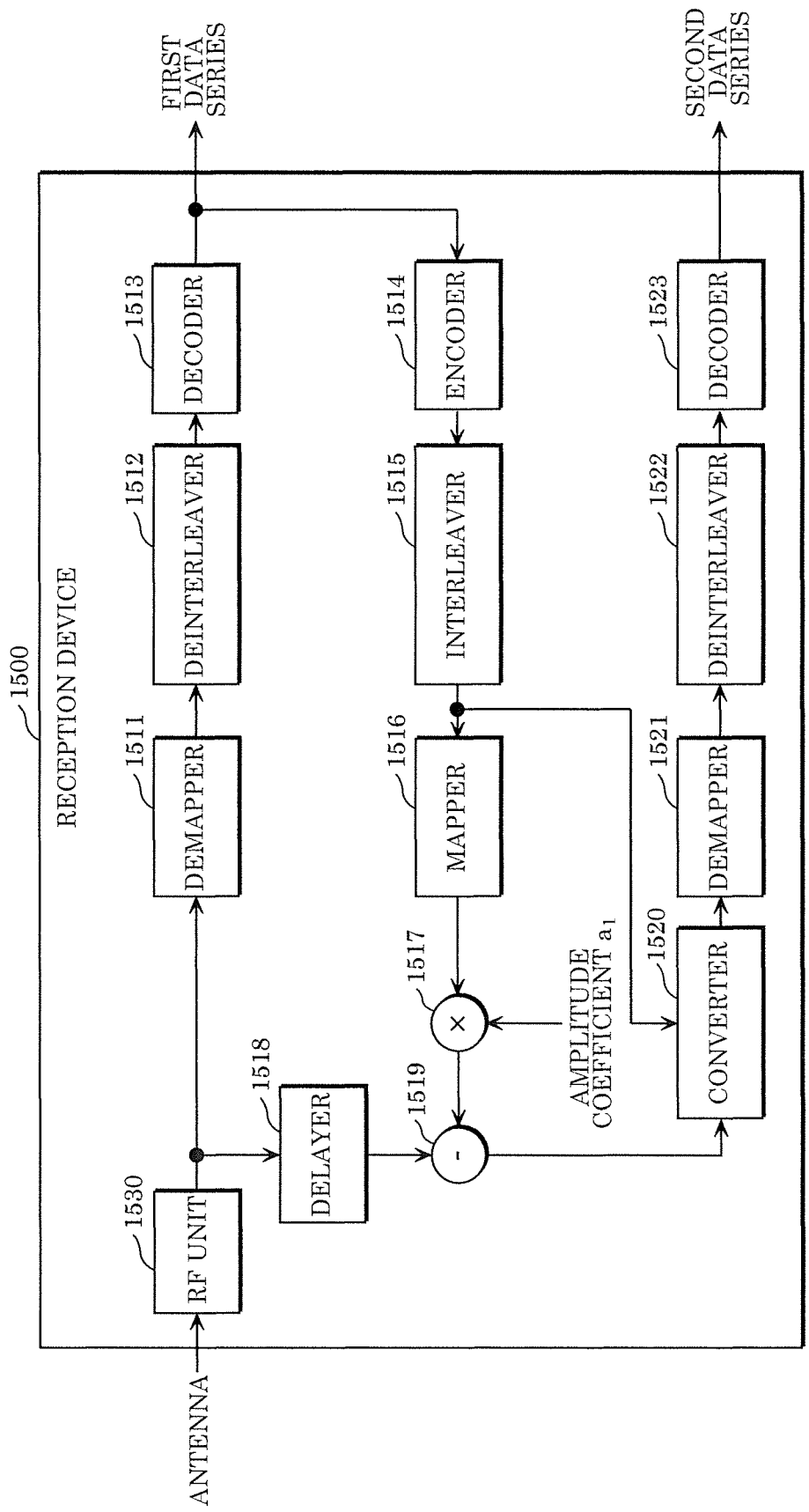
FIG. 27 is a block diagram showing a first example configuration of a reception device according to Embodiment 4.

FIG. 27 shows an example configuration of reception device 1500 capable of receiving and sequentially decoding the signal on which two data series are multiplexed onto two layers by the above-described variation of superposition coding, and capable of obtaining one of or both of the multiplexed two data series. The configuration and operation of reception device 1500 will be described with reference to FIG. 27.

Reception device 1500 includes RF unit 1530, demapper 1511, deinterleaver 1512, decoder 1513, encoder 1514, interleaver 1515, mapper 1516, multiplier 1517, delayer 1518, subtractor 1519, converter 1520, demapper 1521, deinterleaver 1522, and decoder 1523. These structural components may also be implemented as dedicated or general-purpose circuits.

Demapper 1511, deinterleaver 1512, decoder 1513, encoder 1514, interleaver 1515, mapper 1516, multiplier 1517, delayer 1518, subtractor 1519, converter 1520, demapper 1521, deinterleaver 1522, and decoder 1523 can also be represented collectively as a deriver. RF unit 1530 can also be represented as a receiver. RF unit 1530 may include an antenna.

Reception device 1500 receives by an antenna the multiplexed signal sent from transmission device 1200, 1300, or 1400, and inputs such a multiplexed signal into RF unit 1530. Stated differently, RF unit 1530 receives the multiplexed signal via the antenna. The multiplexed signal received by RF unit 1530 is also represented as a received signal, and corresponds to the superposed modulated symbol stream into which the first modulated symbol stream and the second modulated symbol stream are multiplexed. RF unit 1530 generates a baseband received signal from the radio-frequency received signal.

Demapper 1511 demaps the baseband received signal on the basis of the first constellation of the first mapping scheme to generate the first bit likelihood stream. For example, amplitude coefficient $a_1$ is reflected in the first constellation for demapping.

Deinterleaver 1512 permutes the first bit likelihood stream on the basis of a permutation rule that is a reverse rule of the first permutation rule. Such permutation is also referred to as deinterleaving. Decoder 1513 performs decoding that is based on the first error control coding scheme by use of the first bit likelihood stream permuted by deinterleaver 1512, and outputs the decoding result as the first data series.

Here, of the received signal corresponding to the superposed modulated symbol stream, demapper 1511 treats the components corresponding to the second modulated symbols in the second data series as an unknown signal (noise), and performs demapping on the basis of the first constellation of the first mapping scheme.

When only the first data series is to be obtained, reception device 1500 terminates the process upon completing the estimation of the first data series. Meanwhile, when the second data series is to be obtained in addition to the first data series, or when only the second data series is to be obtained, reception device 1500 performs the processes described below to obtain the second data series.

Encoder 1514 encodes the first data series obtained by decoder 1513 on the basis of the first error control coding scheme to generate the first bit stream. Interleaver 1515 permutes the bits in the first bit stream generated by encoder 1514 on the basis of the first permutation rule. Such permutation is also referred to as interleaving.

Mapper 1516 maps the first bit stream permuted by interleaver 1515 in accordance with the first mapping scheme to generate the first modulated symbol stream that includes a plurality of first modulated symbols. Multiplier 1517 multiplies the first modulated symbol stream outputted by mapper 1516 by first amplitude coefficient $a_1$.

Delayer 1518 delays the received signal outputted from RF unit 1530 during the time from when RF unit 1530 outputs the baseband received signal to when multiplier 1517 outputs the reproduced first modulated symbol stream.

Subtractor 1519 subtracts, from the received signal delayed by delayer 1518, the first modulated symbol stream multiplied by first amplitude coefficient $a_1$ by multiplier 1517. Through this, subtractor 1519 removes the components corresponding to the first modulated symbols from the received signal on which the components corresponding to the first modulated symbols, the components corresponding to the second modulated symbols, and noise are superposed. Subsequently, subtractor 1519 outputs a signal on which the components corresponding to the second modulated symbols and noise are superposed as a signal corresponding to the second modulated symbol stream.

Converter 1520 converts the signal outputted from subtractor 1519 as a signal corresponding to the second modulated symbol stream by use of the first bit stream reproduced through encoding, interleaving, etc. Demapper 1521 demaps the signal outputted by converter 1520 on the basis of the second constellation of the second mapping scheme to generate the second bit likelihood stream. For example, amplitude coefficient $a_2$ is reflected in the second constellation for demapping.

Deinterleaver 1522 permutes the second bit likelihood stream on the basis of a permutation rule that is a reverse rule of the second permutation rule. Such permutation is also referred to as deinterleaving. Decoder 1523 decodes the second bit likelihood stream permuted by deinterleaver 1522 on the basis of the second error control coding scheme, and outputs the decoding result as the second data series.

The following shows an example case in which BPSK is used as the first mapping scheme to describe the operation of converter 1520.

For example, when $S_1(t)$ is the t-th modulated symbol in the first modulated symbol stream generated by mapper 1516, and $b_1(t)$ is a bit to be mapped onto $S_1(t)$, modulated symbol $S_1(t)$ is given by Equation 21.

[Math. 21]

$$S_1(t) = 2 \cdot b_1(t) - 1 \quad \text{(Equation 21)}$$

Modulated symbol $S_1(t)$ may also be given by an equation in which the polarity in Equation 21 is reversed. Converter 1520 converts, into $S'_2(t)$, signal $S_2(t)$ corresponding to the t-th modulated symbol in the second modulated symbol stream among signals outputted by subtractor 1519, on the basis of $b_1(t)$ as shown by Equation 22.

[Math. 22]

$$S'_2(t) = (-1)^{b_1(t)} \cdot Re[S_2(t)] + i \cdot Im[S_2(t)] \quad \text{(Equation 22)}$$

Here, i denotes the imaginary unit. Further, $S'_2(t)$ is the signal that has undergone the conversion. Also, $Re[S_2(t)]$ is the value of the real part of $S_2(t)$, and $Im[S_2(t)]$ is the value of the imaginary part of $S_2(t)$. Signal $S'_2(t)$ that has undergone the conversion may be given by an equation in which one of or both of the polarities of the real part and the imaginary part of Equation 22 are reversed.

Through the above processes, reception device 1500 obtains one of or both of the first data series and the second data series from the signal received by the antenna. Note that in the above, superposition coding is performed on the real part. However, superposition coding may be performed on the imaginary part.

Figure 28:
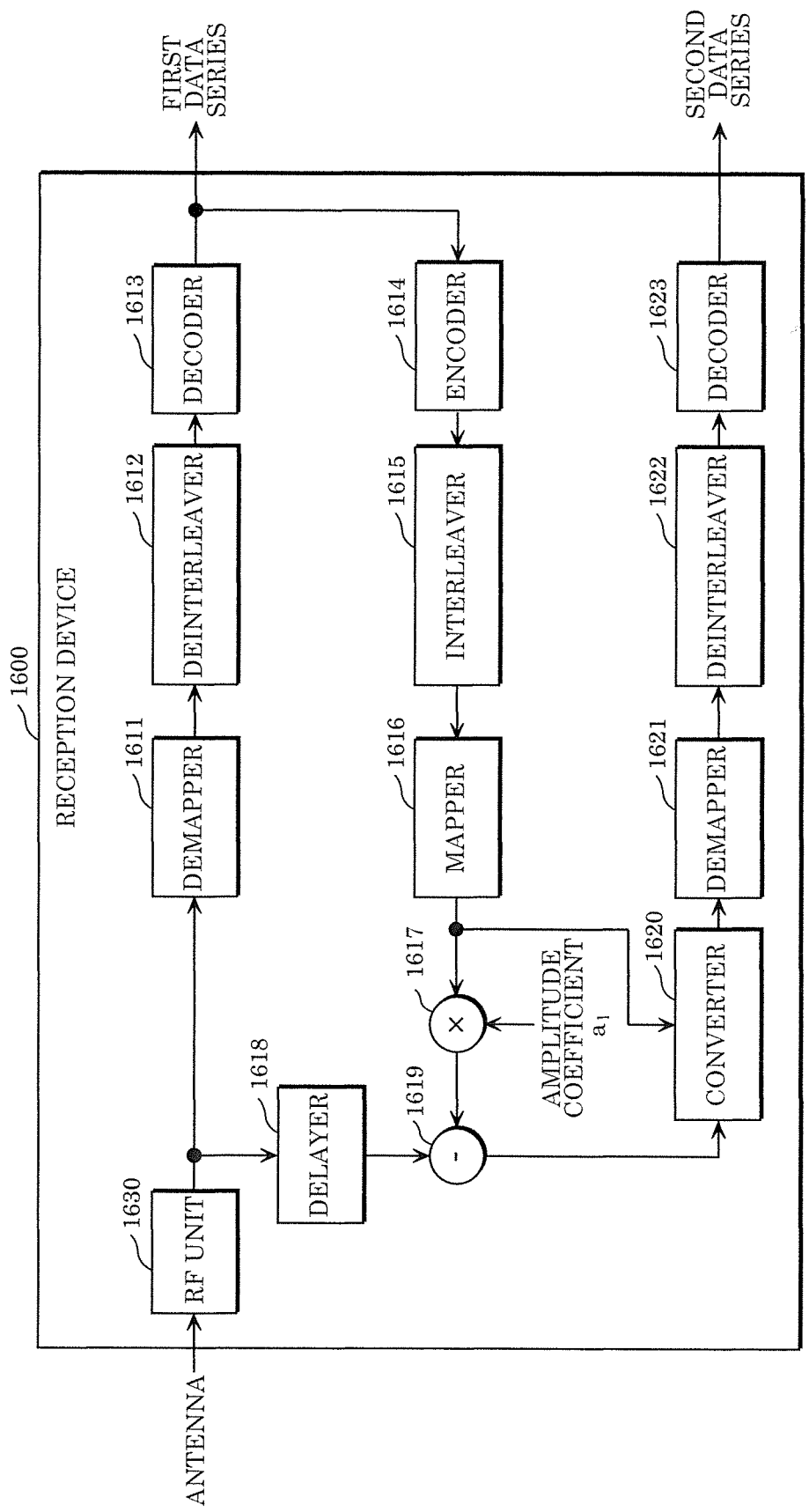
FIG. 28 is a block diagram showing a second example configuration of the reception device according to Embodiment 4.

FIG. 28 shows an example configuration of reception device 1600 capable of receiving and sequentially decoding the signal on which two data series are multiplexed onto two layers by the above-described variation of superposition coding, and capable of obtaining one of or both of the multiplexed two data series. The configuration of reception device 1600 is different from the configuration of reception device 1500. The configuration and operation of reception device 1600 will be described with reference to FIG. 28.

Reception device 1600 includes RF unit 1630, demapper 1611, deinterleaver 1612, decoder 1613, encoder 1614, interleaver 1615, mapper 1616, multiplier 1617, delayer 1618, subtractor 1619, converter 1620, demapper 1621, deinterleaver 1622, and decoder 1623. These structural components may also be implemented as dedicated or general-purpose circuits.

Demapper 1611, deinterleaver 1612, decoder 1613, encoder 1614, interleaver 1615, mapper 1616, multiplier 1617, delayer 1618, subtractor 1619, converter 1620, demapper 1621, deinterleaver 1622, and decoder 1623 can also be represented collectively as a deriver. RF unit 1630 can also be represented as a receiver. RF unit 1630 may include an antenna.

Reception device 1600 receives by an antenna the multiplexed signal sent from transmission device 1200, 1300, or 1400, and inputs such a multiplexed signal into RF unit 1630. Stated differently, RF unit 1630 receives the multiplexed signal via the antenna. The multiplexed signal received by RF unit 1630 is also represented as a received signal, and corresponds to the superposed modulated symbol stream into which the first modulated symbol stream and the second modulated symbol stream are multiplexed. RF unit 1630 generates a baseband received signal from the radio-frequency received signal.

Demapper 1611 demaps the baseband received signal on the basis of the first constellation of the first mapping scheme to generate the first bit likelihood stream. For example, amplitude coefficient $a_1$ is reflected in the first constellation for demapping.

Deinterleaver 1612 permutes the first bit likelihood stream on the basis of a permutation rule that is a reverse rule of the first permutation rule. Such permutation is also referred to as deinterleaving. Decoder 1613 performs decoding that is based on the first error control coding scheme by use of the first bit likelihood stream permuted by deinterleaver 1612, and outputs the decoding result as the first data series.

Here, of the received signal corresponding to the superposed modulated symbol stream, demapper 1611 treats the components corresponding to the second modulated symbols in the second data series as an unknown signal (noise), and performs demapping on the basis of the first constellation of the first mapping scheme.

When only the first data series is to be obtained, reception device 1600 terminates the process upon completing the estimation of the first data series. Meanwhile, when the second data series is to be obtained in addition to the first data series, or when only the second data series is to be obtained, reception device 1600 performs the processes described below to obtain the second data series.

Encoder 1614 encodes the first data series obtained by decoder 1613 on the basis of the first error control coding scheme to generate the first bit stream. Interleaver 1615 permutes the bits in the first bit stream generated by encoder 1614 on the basis of the first permutation rule. Such permutation is also referred to as interleaving.

Mapper 1616 maps the first bit stream permuted by interleaver 1615 in accordance with the first mapping scheme to generate the first modulated symbol stream that includes a plurality of first modulated symbols. Multiplier 1617 multiplies the first modulated symbol stream outputted by mapper 1616 by first amplitude coefficient $a_1$.

Delayer 1618 delays the received signal outputted from RF unit 1630 during the time from when RF unit 1630 outputs the baseband received signal to when multiplier 1617 outputs the reproduced first modulated symbol stream.

Subtractor 1619 subtracts, from the received signal delayed by delayer 1618, the first modulated symbol stream multiplied by first amplitude coefficient $a_1$ by multiplier 1617. Through this, subtractor 1619 removes the components corresponding to the first modulated symbols from the received signal on which the components corresponding to the first modulated symbols and the components corresponding to the second modulated symbols and noise are superposed. Subsequently, subtractor 1619 outputs a signal on which the components corresponding to the second modulated symbols and noise are superposed as a signal corresponding to the second modulated symbol stream.

Converter 1620 converts the signal outputted from subtractor 1619 as a signal corresponding to the second modulated symbol stream by use of the first modulated symbol stream reproduced through encoding, interleaving, mapping, etc. Demapper 1621 demaps the signal outputted by converter 1620 on the basis of the second constellation of the second mapping scheme to generate the second bit likelihood stream. For example, amplitude coefficient $a_2$ is reflected in the second constellation for demapping.

Deinterleaver 1622 permutes the second bit likelihood stream on the basis of a permutation rule that is a reverse rule of the second permutation rule. Such permutation is also referred to as deinterleaving. Decoder 1623 decodes the second bit likelihood stream permuted by deinterleaver 1622 on the basis of the second error control coding scheme, and outputs the decoding result as the second data series.

The following shows an example case in which BPSK is used as the first mapping scheme to describe the operation of converter 1620.

For example, when $S_1(t)$ is the t-th modulated symbol in the first modulated symbol stream generated by mapper 1616, and $b_1(t)$ is a bit to be mapped onto $S_1(t)$, modulated symbol $S_1(t)$ is given by Equation 23.

[Math. 23]

$$S_1(t) = 2 \cdot b_1(t) - 1 \qquad \text{(Equation 23)}$$

Modulated symbol $S_1(t)$ may also be given by an equation in which the polarity in Equation 23 are reversed. Converter 1620 converts, into $S'_2(t)$, signal $S_2(t)$ corresponding to the t-th modulated symbol in the second modulated symbol stream out of the signal outputted by subtractor 1619, on the basis of modulated symbol $S_1(t)$ as shown by Equation 24.

[Math. 24]

$$S'_2(t) = -\text{sgn}(S_1(t)) \cdot Re[S_2(t)] + i \cdot Im[S_2(t)] \qquad \text{(Equation 24)}$$

Here, i denotes the imaginary unit. Further, $S'_2(t)$ is the signal that has undergone the conversion. Also, $Re[S_2(t)]$ is the value of the real part of $S_2(t)$, and $Im[S_2(t)]$ is the value of the imaginary part of $S_2(t)$. Also, $\text{sgn}(S_1(t))$ is the polarity of $S_1(t)$. Signal $S'_2(t)$ that has undergone the conversion may be given by an equation in which one of or both of the polarities of the real part and the imaginary part of Equation 24 are reversed. Note that the conversion that is based on Equation 24 is substantially the same as the conversion that is based on Equation 22.

Through the above processes, reception device 1600 obtains one of or both of the first data series and the second data series from the signal received by the antenna. Note that in the above, superposition coding is performed on the real part, but may be performed on the imaginary part.

Figure 29:
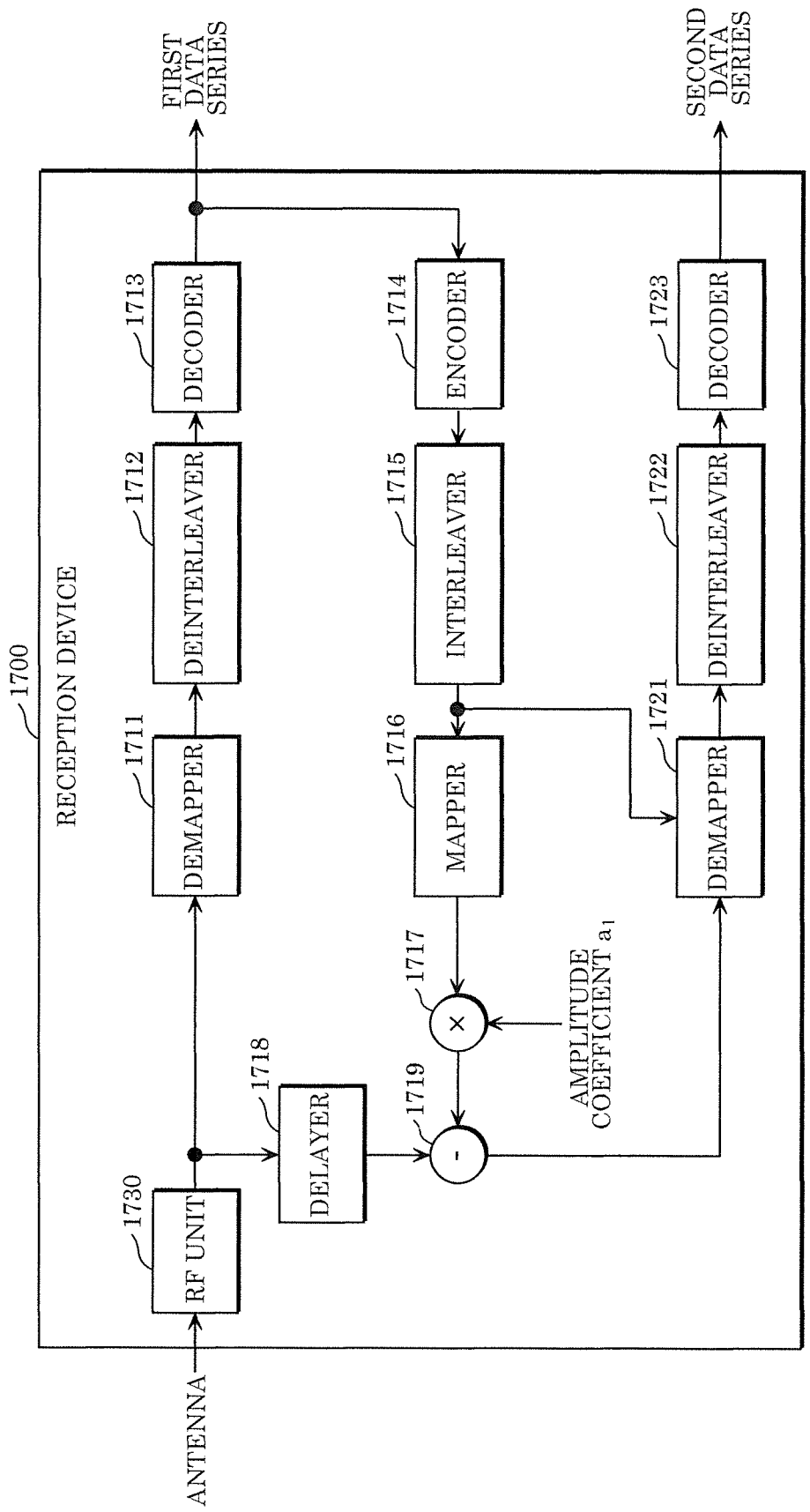
FIG. 29 is a block diagram showing a third example configuration of the reception device according to Embodiment 4.

FIG. 29 shows an example configuration of reception device 1700 capable of receiving and sequentially decoding the signal on which two data series are multiplexed onto two layers by the above-described variation of superposition coding, and capable of obtaining one of or both of the multiplexed two data series. The configuration of reception device 1700 is different from the configurations of reception devices 1500 and 1600. The configuration and operation of reception device 1700 will be described with reference to FIG. 29.

Reception device 1700 includes RF unit 1730, demapper 1711, deinterleaver 1712, decoder 1713, encoder 1714, interleaver 1715, mapper 1716, multiplier 1717, delayer 1718, subtractor 1719, demapper 1721, deinterleaver 1722, and decoder 1723. These structural components may also be implemented as dedicated or general-purpose circuits.

Demapper 1711, deinterleaver 1712, decoder 1713, encoder 1714, interleaver 1715, mapper 1716, multiplier 1717, delayer 1718, subtractor 1719, demapper 1721, deinterleaver 1722, and decoder 1723 can also be represented collectively as a deriver. RF unit 1730 can also be represented as a receiver. RF unit 1730 may include an antenna. Demapper 1721 may include a converter.

Reception device 1700 receives by an antenna the multiplexed signal sent from transmission device 1200, 1300, or 1400, and inputs such a multiplexed signal into RF unit 1730. Stated differently, RF unit 1730 receives the multiplexed signal via the antenna. The multiplexed signal received by RF unit 1730 is also represented as a received signal, and corresponds to the superposed modulated symbol stream into which the first modulated symbol stream and the second modulated symbol stream are multiplexed. RF unit 1730 generates a baseband received signal from the radio-frequency received signal.

Demapper 1711 demaps the baseband received signal on the basis of the first constellation of the first mapping scheme to generate the first bit likelihood stream. For example, amplitude coefficient $a_1$ is reflected in the first constellation for demapping.

Deinterleaver 1712 permutes the first bit likelihood stream on the basis of a permutation rule that is a reverse rule of the first permutation rule. Such permutation is also referred to as deinterleaving. Decoder 1713 performs decoding that is based on the first error control coding scheme by use of the first bit likelihood stream permuted by deinterleaver 1712, and outputs the decoding result as the first data series.

Here, of the received signal corresponding to the superposed modulated symbol stream, demapper 1711 treats the components corresponding to the second modulated symbols in the second data series as an unknown signal (noise), and performs demapping on the basis of the first constellation of the first mapping scheme.

When only the first data series is to be obtained, reception device 1700 terminates the process upon completing the estimation of the first data series. Meanwhile, when the second data series is to be obtained in addition to the first data series, or when only the second data series is to be obtained, reception device 1700 performs the processes described below to obtain the second data series.

Encoder 1714 encodes the first data series obtained by decoder 1713 on the basis of the first error control coding scheme to generate the first bit stream. Interleaver 1715 permutes the bits in the first bit stream generated by encoder 1714 on the basis of the first permutation rule. Such permutation is also referred to as interleaving.

Mapper 1716 maps the first bit stream permuted by interleaver 1715 in accordance with the first mapping scheme to generate the first modulated symbol stream that includes a plurality of first modulated symbols. Multiplier 1717 multiplies the first modulated symbol stream outputted by mapper 1716 by first amplitude coefficient $a_1$.

Delayer 1718 delays the received signal outputted from RF unit 1730 during the time from when RF unit 1730 outputs the baseband received signal to when multiplier 1717 outputs the reproduced first modulated symbol stream.

Subtractor 1719 subtracts, from the received signal delayed by delayer 1718, the first modulated symbol stream multiplied by first amplitude coefficient $a_1$ by multiplier 1717. Through this, subtractor 1719 removes the components corresponding to the first modulated symbols from the received signal on which the components corresponding to the first modulated symbols, the components corresponding to the second modulated symbols, and noise are superposed. Subsequently, subtractor 1719 outputs a signal on which the components corresponding to the second modulated symbols and noise are superposed as a signal corresponding to the second modulated symbol stream.

Demapper 1721 demaps the signal outputted from subtractor 1719 as a signal corresponding to the second modulated symbol stream on the basis of the second constellation of the second mapping scheme to generate the second bit likelihood stream. At this time, such a process reflects the first bit stream reproduced through encoding, interleaving, etc. For example, amplitude coefficient $a_2$ is reflected in the second constellation for demapping.

Deinterleaver 1722 permutes the second bit likelihood stream on the basis of a permutation rule that is a reverse rule of the second permutation rule. Such permutation is also referred to as deinterleaving. Decoder 1723 decodes the second bit likelihood stream permuted by deinterleaver 1722 on the basis of the second error control coding scheme, and outputs the decoding result as the second data series.

The following shows an example case in which BPSK is used as the first mapping scheme to describe the operation of demapper 1721.

For example, when $S_1(t)$ is the t-th modulated symbol in the first modulated symbol stream generated by mapper 1716, and $b_1(t)$ is a bit to be mapped onto $S_1(t)$, modulated symbol $S_1(t)$ is given by Equation 25.

[Math. 25]

$$S_1(t) = 2 \cdot b_1(t) - 1 \quad \text{(Equation 25)}$$

Modulated symbol $S_1(t)$ may also be given by an equation in which the polarity in Equation 25 is reversed. Demapper 1721 demaps signal $S_2(t)$ outputted from subtractor 1719 as a signal corresponding to the t-th modulated symbol in the second modulated symbol stream on the basis of the second constellation of the second mapping scheme.

Demapper 1721 reverses the bit likelihood corresponding to the bit that most contributes to the real part of the second constellation in accordance with $b_1(t)$ among the bit likelihoods in the bit likelihood stream obtained by demapping. For example, demapper 1721 performs exclusive-OR between $b_1(t)$ and the bit likelihood corresponding to the bit that most contributes to the real part of the second constellation among the bit likelihoods in the bit likelihood stream obtained by demapping.

Demapper 1721 then outputs the bit likelihood stream that has undergone the above-described reversal processes as the second bit likelihood stream.

In the above description, demapper 1721 converts the bit likelihood stream, thereby substantially converting the second mapping scheme (the second constellation). However, demapper 1721 may directly convert the second mapping scheme (the second constellation) without converting the bit likelihood stream. Stated differently, demapper 1721 may convert the correspondence between groups of bits and signal points in the second constellation.

Also, the conversion performed by demapper 1721 may be performed by the converter included in demapper 1721.

Through the above processes, reception device 1700 obtains one of or both of the first data series and the second data series from the signal received by the antenna. Note that in the above, superposition coding is performed on the real part. However, superposition coding may be performed on the imaginary part.

<Parallel Decoding of Signal Obtained by Variation of Superposition Coding>

The following describes a reception method for parallel decoding of a signal obtained by the variation of superposition coding according to the present embodiment. The configuration of the transmission device is the same as the configuration of transmission device 1200 shown in FIG. 24, transmission device 1300 shown in FIG. 25, or transmission device 1400 shown in FIG. 26, and thus will not be described. In parallel decoding in the variation of superposition coding, the reception device treats the components of the modulated symbol stream in the first layer as an unknown signal (noise) to decode the second layer, without removing the components of the modulated symbol stream in the first layer included in the received signal.

Figure 30:
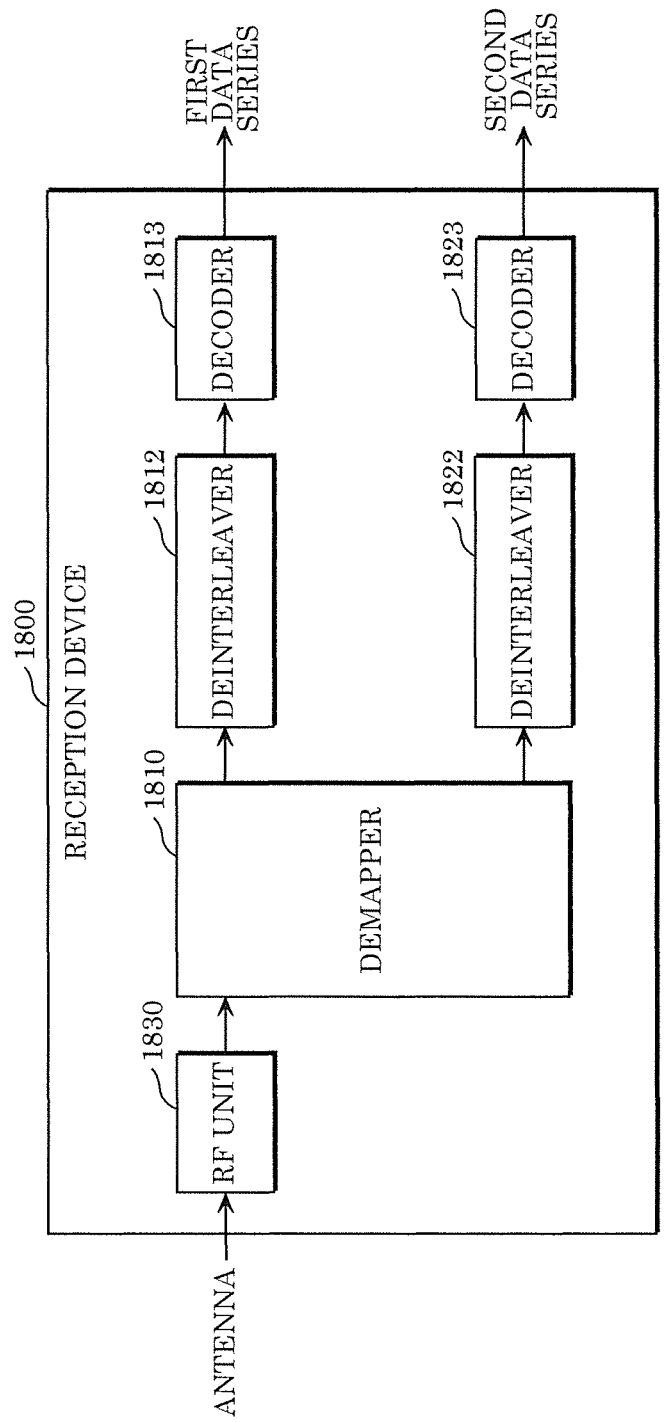
FIG. 30 is a block diagram showing a fourth example configuration of the reception device according to Embodiment 4.

FIG. 30 shows an example configuration of reception device 1800 capable of receiving and performing parallel decoding on the signal on which two data series are multiplexed onto two layers by the variation of superposition coding, and capable of obtaining one of or both of the multiplexed two data series. The configuration and operation of reception device 1800 will be described with reference to FIG. 30.

Reception device 1800 includes RF unit 1830, demapper 1810, deinterleaver 1812, decoder 1813, deinterleaver 1822, and decoder 1823. These structural components may also be implemented as dedicated or general-purpose circuits. Demapper 1810, deinterleaver 1812, decoder 1813, deinterleaver 1822, and decoder 1823 can also be represented collectively as a deriver. RF unit 1830 can also be represented as a receiver. RF unit 1830 may include an antenna.

Reception device 1800 receives by an antenna the multiplexed signal sent from transmission device 1200, 1300, or 1400, and inputs such a multiplexed signal into RF unit 1830. Stated differently, RF unit 1830 receives the multiplexed signal via the antenna. The multiplexed signal received by RF unit 1830 can also be represented as a received signal. RF unit 1830 generates a baseband received signal from the radio-frequency received signal.

Demapper 1810 demaps the baseband received signal to generate the first bit likelihood stream and the second bit likelihood stream. For example, demapper 1810 performs demapping on the basis of a variation superposition constellation that shows the arrangement of signal points of superposed modulated symbols obtained by superposing the first modulated symbols and the second modulated symbols by the variation of superposition coding.

The variation superposition constellation is determined in accordance with the first constellation of the first mapping scheme, the second constellation of the second mapping scheme, first amplitude coefficient $a_1$, second amplitude coefficient $a_2$, etc.

Figure 31:
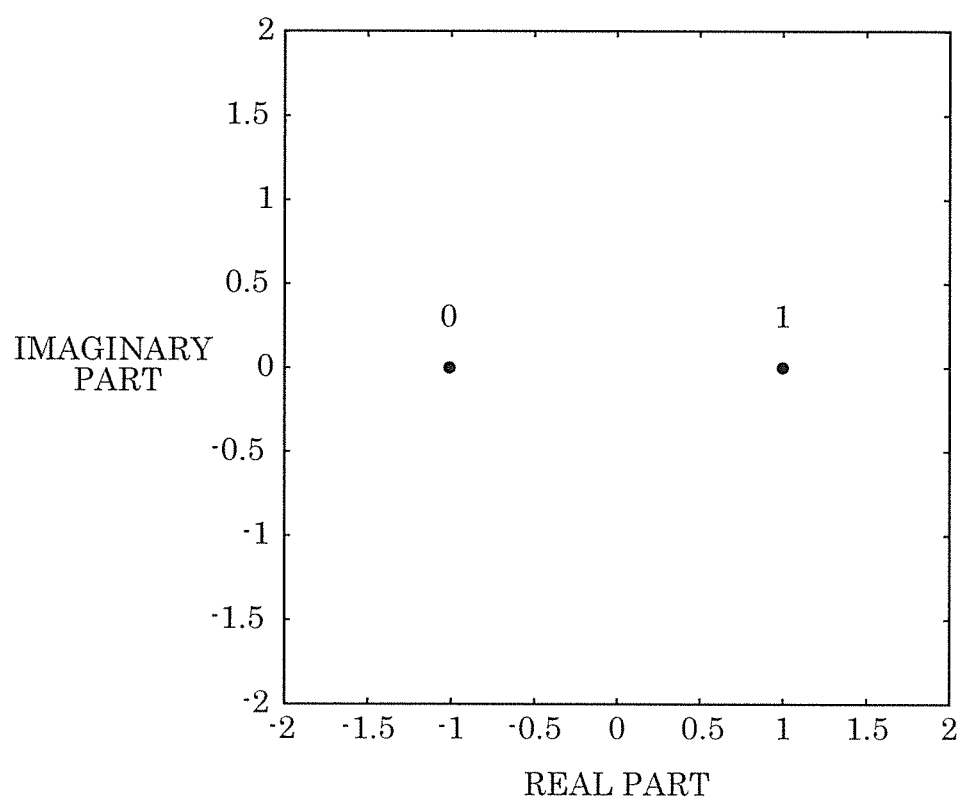
FIG. 31 is a diagram showing an example of a BPSK constellation.

FIG. 31 shows an example of a BPSK constellation. More specifically, two BPSK signal points are plotted in the complex plane, with the lateral axis representing the real part (the real component) and the vertical axis representing the imaginary part (the imaginary component). Note that BPSK means binary phase shift keying.

For example, in BPSK, a bit (0 or 1) is associated with a modulated symbol indicating a complex number on the basis of the constellation shown in FIG. 31. In this example, a bit is associated with a modulated symbol indicating a complex number whose imaginary part is 0. Specifically, in this example, a bit is substantially associated with a modulated symbol indicating a real number.

Figure 32:
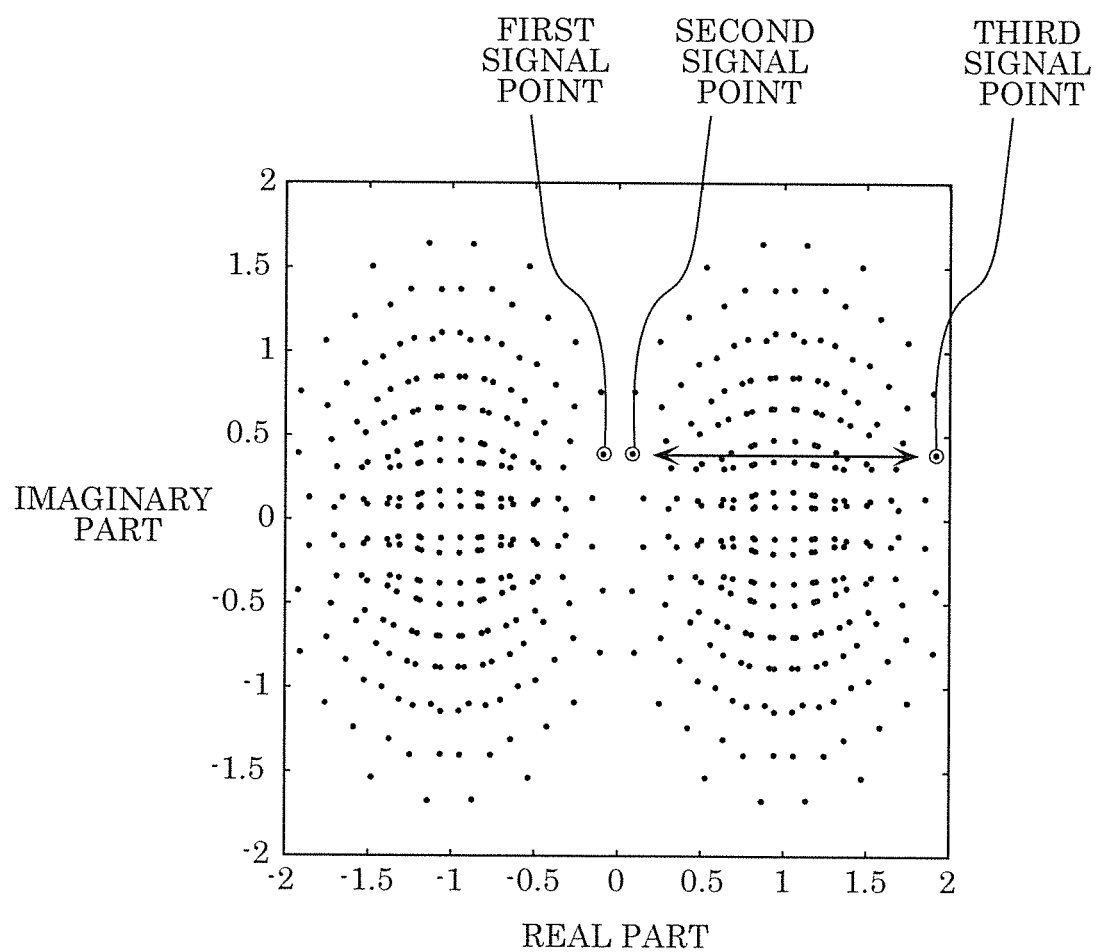
FIG. 32 is a diagram showing a first example of a variation superposition constellation according to Embodiment 4.

FIG. 32 shows the variation superposition constellation that supports the variation of superposition coding. More specifically, the variation superposition constellation is a combination of the BPSK constellation shown in FIG. 31 and the Nu-256QAM constellation shown in FIG. 5.

Even more specifically, the Nu-256QAM constellation (256 signal points) is placed on each of two regions in the complex plane in accordance with the two signal points of the BPSK constellation. These two regions, each corresponding to Nu-256QAM constellation, may partially overlap with each other. The present variation superposition constellation reflects the conversion performed on the second modulated symbol stream.

For example, when the Nu-256QAM constellation is combined with a signal point with a positive real part among the two signal points of the BPSK constellation, the polarity of the real part of the Nu-256QAM constellation is reversed. More specifically, a first signal point, a second signal point, and a third signal point are shown in FIG. 32. When the polarity of the real part of the Nu-256QAM constellation is not reversed, the first signal point and the third signal point correspond to the same bit values of the second bit stream.

When the polarity of the real part of the Nu-256QAM constellation is reversed, the first signal point and the second signal point correspond to the same bit values of the second bit stream. Stated differently, such reversal enables a plurality of signal points that correspond to the same bit values of the second bit stream to approach each other and converge. This mitigates the effect of noise on demapping.

Demapper 1810 performs demapping on the basis of the variation superposition constellation as shown in FIG. 32. Stated differently, demapper 1810 generates the first bit likelihood stream with the modulated symbol stream of the second layer remaining unknown, and generates the second bit likelihood stream with the modulated symbol stream of the first layer remaining unknown.

Note that demapper 1810 may use the first constellation of the first mapping scheme to generate the first bit likelihood stream, and may use the above-described variation superposition constellation to generate the second bit likelihood stream.

The first constellation, when used to generate the first bit likelihood stream, enables demapper 1810 to reduce the number of signal points that should be considered in generating the first bit likelihood stream, compared to when the variation superposition constellation is also used to generate the first bit likelihood stream. This thus enables demapper 1810 to reduce the number of arithmetic computations.

Demapper 1810 corresponds, for example, to the first demapper that demaps the received signal to generate the first bit likelihood stream and the second demapper that demaps the received signal to generate the second bit likelihood stream. Demapper 1810 may include the first demapper that demaps the received signal to generate the first bit likelihood stream and the second demapper that demaps the received signal to generate the second bit likelihood stream.

Demapper 1810 may convert the second bit likelihood stream that is generated using not the variation superposition constellation but the superposition constellation, in accordance with the first bit likelihood stream. This enables demapper 1810 to obtain the same second bit likelihood stream as the second bit likelihood stream that is generated using the variation superposition constellation.

Demapper 1810 may convert the multiplexed signal without using the variation superposition constellation to obtain the same second bit likelihood stream as the second bit likelihood stream that is generated using the variation superposition constellation.

Deinterleaver 1812 permutes the first bit likelihood stream on the basis of a permutation rule that is a reverse rule of the first permutation rule. Such permutation is also referred to as deinterleaving. Decoder 1813 decodes the first bit likelihood stream permuted by deinterleaver 1812 on the basis of the first error control coding scheme, and outputs the decoding result as the first data series.

Deinterleaver 1822 permutes the second bit likelihood stream on the basis of a permutation rule that is a reverse rule of the second permutation rule. Such permutation is also referred to as deinterleaving. Decoder 1823 decodes the second bit likelihood stream permuted by deinterleaver 1822 on the basis of the second error control coding scheme, and outputs the decoding result as the second data series.

Through the above processes, reception device 1800 obtains one of or both of the first data series and the second data series from the signal received by the antenna. Note that in the above, superposition coding is performed on the real part. However, superposition coding may be performed on the imaginary part.

Note that transmission devices 1200, 1300, and 1400, and reception devices 1500, 1600, 1700, and 1800 may omit permutation (interleaving and deinterleaving) as in the case of Embodiment 1. Stated differently, their respective interleavers and deinterleavers are optional structural components, and thus may not be included in these devices.

Interleaving and deinterleaving, however, make a pair. As such, when transmission devices 1200, 1300, and 1400 include their respective interleavers, reception devices 1500, 1600, 1700, and 1800 basically include their respective deinterleavers and interleavers. Meanwhile, when transmission devices 1200, 1300, and 1400 do not include their respective interleavers, reception devices 1500, 1600, 1700, and 1800 do not include their respective deinterleavers and interleavers.

Amplitude coefficient $a_1$ may be reflected in the mapping for generating the first modulated symbols performed in reception devices 1500, 1600, and 1700. In such a case, the multiplication of amplitude coefficient $a_1$ may be omitted. Reception devices 1500, 1600, and 1700 thus may not include multipliers 1517, 1617, and 1717, respectively.

Error control coding on the first data series and the second data series may be performed by an external device. In such a case, transmission devices 1200, 1300, and 1400 may omit error control coding, and may not include encoders 1211, 1221, 1311, 1321, 1411, and 1421.

As described above, superposition coding may be performed on the real part or on the imaginary part. Furthermore, superposition coding may be performed in a predetermined direction in the complex plane. For example, superposition coding may be performed in an oblique direction in an orthogonal coordinate system having a real axis and an imaginary axis.

Specifically, a first modulated symbol may include a component in the first direction in the complex plane, and a second modulated symbol may include a component in the first direction and a component in the second direction perpendicular to the first direction. The component that a first modulated symbol includes in the first direction and the component that a second modulated symbol includes in the first direction may be superposed on a single component in the first direction. In this case, for example, the polarity of the component of the second modulated symbol in the first direction is controlled in accordance with the component of the first modulated symbol in the first direction.

Specifically, in the description given herein, a real component may be replaced with an imaginary component, replaced with a component in the first direction that is one direction in the complex plane, or replaced with a component in the second direction perpendicular to the first direction. In addition, an imaginary component may be replaced with a real component, replaced with a component in the first direction that is one direction in the complex plane, or replaced with a component in the second direction perpendicular to the first direction.

For example, a component that a modulated symbol includes in the first direction includes a real part and an imaginary part, and the polarity of such a component is reversed, thus reversing both of the polarities of the real and imaginary parts of the component. Furthermore, the polarity of the component may be determined in accordance with the polarity of the real part of the component or in accordance with the polarity of the imaginary part of the component.

Specifically, when the polarity of the real part of the component is positive, the polarity of the component may be determined to be positive, and when the polarity of the real part of the component is negative, the polarity of the component may be determined to be negative. Alternatively, when the polarity of the imaginary part of the component is positive, the polarity of the component may be determined to be positive, and when the polarity of the imaginary part of the component is negative, the polarity of the component may be determined to be negative.

Furthermore, the direction of the real axis may be the first direction or may be the second direction perpendicular to the first direction. The direction of the imaginary axis may be the first direction or may be the second direction perpendicular to the first direction.

The first constellation of the first mapping scheme may have a plurality of signal points dispersed in only the first direction. Furthermore, the second constellation of the second mapping scheme may have a plurality of signal points dispersed in both the first direction and the second direction.

The first mapping scheme is not limited to BPSK. A constellation having three or more signal points may be used as the first constellation of the first mapping scheme. For example, a constellation having three or more signal points on a straight line in the complex plane may be used as the first constellation of the first mapping scheme.

In the first constellation of the first mapping scheme, the polarity in the first direction of the second mapping scheme is reversed for two signal points adjacent to each other along a straight line in the first direction. Specifically, the polarity is reversed such that a second modulated symbol superposed on a first modulated symbol corresponding to one of the two signal points and a second modulated symbol superposed on a first modulated symbol corresponding to the other have different polarities in the first direction. Thus, the polarities in the first direction are alternated along a sequence of three or more signal points on a straight line in the first direction.

Figure 33:
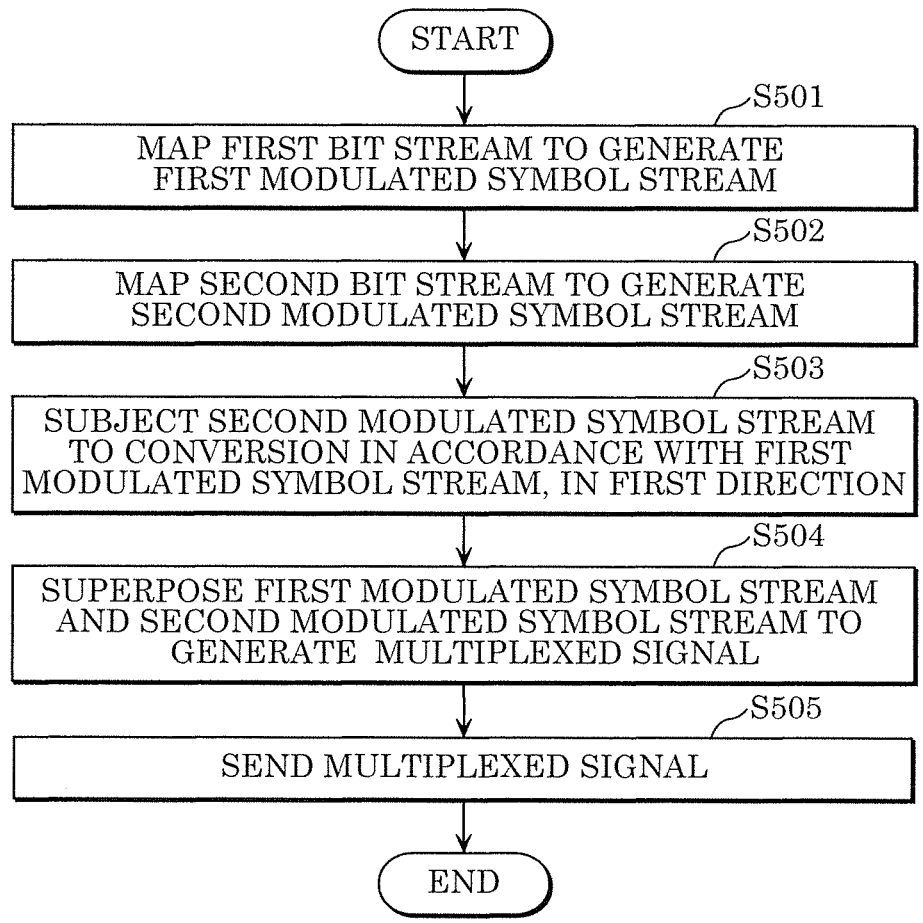
FIG. 33 is a flowchart of an example of transmission operations according to Embodiment 4.

FIG. 33 is a flowchart of example operations performed by transmission device 1200. First, mapper 1213 maps the first bit stream of the first data series to generate the first modulated symbol stream of the first data series (S501). Then, mapper 1223 maps the second bit stream of the second data series to generate the second modulated symbol stream of the second data series (S502).

Converter 1225 subjects the second modulated symbol stream to conversion in accordance with the first modulation symbol stream, in only the first direction among the first direction and the second direction (S503). Here, the first direction and the second direction are two directions perpendicular to each other in the complex plane in which the first modulated symbol stream and the second modulated symbol stream are represented.

Specifically, converter 1225 does not subject a component that the second modulated symbol stream includes in the second direction to conversion in accordance with the first modulation symbol stream, but subjects a component that the second modulated symbol stream includes in the first direction to the conversion. Furthermore, converter 1225 converts the second modulated symbol stream in accordance with the first bit stream, thereby subjecting the second modulated symbol stream to conversion in accordance with the first modulated symbol stream.

Next, the superposer superposes the first modulated symbol stream and the second modulated symbol stream that has been subjected to conversion in accordance with the first modulated symbol stream at a predetermined amplitude ratio, thereby generating the multiplexed signal (S504). Here, the superposer is constituted by first multiplier 1214, second multiplier 1224, and adder 1230. RF unit 1240 then sends the generated multiplexed signal (S505).

Note that in the above operation example, transmission device 1200 converts the second modulated symbol stream in accordance with the first bit stream, thereby subjecting the second modulated symbol stream to conversion in accordance with the first modulated symbol stream (S503). Alternatively, transmission device 1200 may convert the second modulated symbol stream in accordance with the first modulated symbol stream, as in the case of transmission device 1300, thereby subjecting the second modulated symbol stream to conversion in accordance with the first modulated symbol stream.

Alternatively, as in the case of transmission device 1400, transmission device 1200 may convert the second bit stream or the second mapping scheme (the second constellation) used to generate the second modulated symbol stream, in accordance with the first bit stream. Through this, the second modulated symbol stream may be subjected to conversion in accordance with the first modulated symbol stream. In such a case, the second bit stream or the second mapping scheme is converted before the second modulated symbol stream is generated.

Stated differently, the second bit stream, the second mapping scheme, or the second modulated symbol stream may be converted in accordance with the first bit stream or the first modulated symbol stream, thereby subjecting the second modulated symbol stream to conversion in accordance with the first modulated symbol stream.

Converter 1225 may subject the second modulated symbol stream to conversion in accordance with the first modulated symbol stream, thereby controlling the polarity of a component that each modulated symbol included in the second modulated symbol stream includes in the first direction. Through this, converter 1225 may reverse the polarity of a component that each second modulated symbol includes in the first direction when a component that the corresponding first modulated symbol includes in the first direction satisfies a predetermined condition.

The predetermined condition may be a condition that the polarity of a component that the first modulated symbol includes in the first direction should be a predetermined polarity, or may be a condition that the component that the first modulated symbol includes in the first direction should be within a predetermined range of one or more. The predetermined range of one or more may be a positive range or a negative range.

Figure 34:
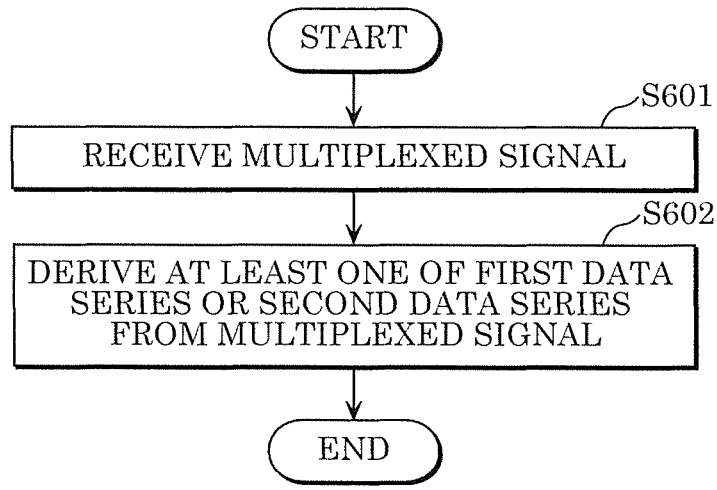
FIG. 34 is a flowchart of an example of reception operations according to Embodiment 4.

FIG. 34 is a flowchart of example operations performed by reception devices 1500, 1600, 1700, and 1800. First, the receiver receives the multiplexed signal (S601). Here, the receiver is RF unit 1530 of reception device 1500, RF unit 1630 of reception device 1600, RF unit 1730 of reception device 1700, or RF unit 1830 of reception device 1800.

The multiplexed signal is a signal into which a plurality of data series including the first data series in the first layer and the second data series in the second layer are multiplexed. The multiplexed signal is also a signal on which the first modulated symbol stream and the second modulated symbol stream are superposed at a predetermined amplitude ratio.

The first modulated symbol stream is a modulated symbol stream that is generated by mapping the first bit stream of the first data series. The second modulated symbol stream is a modulated symbol stream that is generated by mapping the second bit stream of the second data series, and that has been subjected to conversion in accordance with the first modulated symbol stream in only the first direction among the first direction and the second direction in a complex plane.

Next, the deriver derives at least one of the first data series or the second data series from the multiplexed signal (S602).

The deriver of reception device 1500 is constituted, for example, by demapper 1511, deinterleaver 1512, decoder 1513, encoder 1514, interleaver 1515, mapper 1516, multiplier 1517, delayer 1518, subtractor 1519, converter 1520, demapper 1521, deinterleaver 1522, and decoder 1523.

The deriver of reception device 1600 is constituted, for example, by demapper 1611, deinterleaver 1612, decoder 1613, encoder 1614, interleaver 1615, mapper 1616, multiplier 1617, delayer 1618, subtractor 1619, converter 1620, demapper 1621, deinterleaver 1622, and decoder 1623.

The deriver of reception device 1700 is constituted, for example, by demapper 1711, deinterleaver 1712, decoder 1713, encoder 1714, interleaver 1715, mapper 1716, multiplier 1717, delayer 1718, subtractor 1719, demapper 1721, deinterleaver 1722, and decoder 1723.

The deriver of reception device 1800 is constituted, for example, by demapper 1810, deinterleaver 1812, decoder 1813, deinterleaver 1822, and decoder 1823.

In accordance with the above operations, the multiplexed signal is received into which the first modulated symbol stream and the second modulated symbol stream that has been subjected to conversion in accordance with the first modulated symbol stream in the first direction are multiplexed. Then, at least one of the first data series or the second data series is derived from such a multiplexed signal. Stated differently, such a configuration enables: the reception of the multiplexed signal that has been superposed in such a manner that reduces performance degradation at the time of parallel decoding: and an efficient derivation of one of or both of the first data series and the second data series from such a multiplexed signal.

Reception device 1800 as shown in FIG. 30 that performs parallel decoding has lower performance in decoding the second layer than that of reception devices 1500, 1600, and 1700 as shown in FIG. 27, FIG. 28, and FIG. 29 that perform sequential decoding.

As described above, reception device 1800 according to the present embodiment that performs parallel decoding has lower performance in decoding the second data series transmitted on the second layer than that of reception devices 1500, 1600, and 1700 that perform sequential decoding. However, reception device 1800 reduces the number of structural components required to decode the second layer.

More specifically, reception device 1800 eliminates the need for the structural components that are required by reception devices 1500, 1600, and 1700 shown in FIG. 27, FIG. 28, and FIG. 29 performing sequential decoding to reproduce the modulated symbol stream of the first layer. Stated differently, encoders 1514, 1614, and 1714, interleavers 1515, 1615, and 1715, mappers 1516, 1616, and 1716, and multipliers 1517, 1617, and 1717 are not required.

Reception device 1800 also eliminates the need for delayers 1518, 1618, and 1718 that delay the received signal, and subtractors 1519, 1619, and 1719 that remove the components of the modulated symbols in the first layer reproduced from the received signal.

The circuit size can be thus reduced. Reception device 1800 also requires a smaller number of arithmetic computations and lower power consumption than those required by reception devices 1500, 1600, and 1700.

Reception devices 1500, 1600, and 1700 shown in FIG. 27, FIG. 28, and FIG. 29 that perform sequential decoding demodulate the first layer in the received signal to obtain the first data series, and generate the first modulated symbol stream from the obtained first data series. Subsequently, reception devices 1500, 1600, and 1700 start demodulating the second layer in the received signal to obtain the second data series.

Meanwhile, reception device 1800 according to the present embodiment that performs parallel decoding is capable of simultaneously obtaining the first data series and the second data series in parallel, thereby reducing processing delays.

The reception device may observe the SNR of the received signal to make selection between parallel decoding to be performed when the SNR is high and sequential decoding to be performed when the SNR is low.

In such a case, reception device 1500 shown in FIG. 27 includes, for example, a controller that makes selection between sequential decoding and parallel decoding depending on the SNR. Such a controller may be included in RF unit 1530 or demapper 1521. Furthermore, demapper 1521 is configured to perform demapping based on the variation superposition constellation, which is described as an operation performed by demapper 1810 shown in FIG. 30, in addition to demapping that is based on the second constellation.

Demapper 1521 switches between demapping to be performed on the signal outputted from converter 1520 on the basis of the second constellation and demapping to be performed on the signal outputted from RF unit 1530 on the basis of the variation superposition constellation. For example, demapper 1521 switches between these demapping operations in accordance with a control signal from the controller.

Note that such a configuration is also obtained by a combination of reception device 400 shown in FIG. 11, reception device 1500 (converter 1520, demapper 1521, etc.) shown in FIG. 27, and reception device 1800 (demapper 1810, etc.) shown in FIG. 30.

Another configuration is that reception device 1600 shown in FIG. 28 includes, for example, a controller that makes selection between sequential decoding and parallel decoding depending on the SNR. Such a controller may be included in RF unit 1630 or demapper 1621. Furthermore, demapper 1621 is configured to perform demapping based on the variation superposition constellation, which is described as an operation performed by demapper 1810 shown in FIG. 30, in addition to demapping that is based on the first bit stream and the second constellation.

Demapper 1621 switches between demapping to be performed on the signal outputted from converter 1620 on the basis of the second constellation and demapping to be performed on the signal outputted from RF unit 1630 on the basis of the variation superposition constellation. For example, demapper 1621 switches between these demapping operations in accordance with a control signal from the controller.

Note that such a configuration is also obtained by a combination of reception device 400 shown in FIG. 11, reception device 1600 (converter 1620, demapper 1621, etc.) shown in FIG. 28, and reception device 1800 (demapper 1810, etc.) shown in FIG. 30.

Still another configuration is that reception device 1700 shown in FIG. 29 includes, for example, a controller that makes selection between sequential decoding and parallel decoding depending on the SNR. Such a controller may be included in RF unit 1730 or demapper 1721. Furthermore, demapper 1721 is configured to perform demapping based on the variation superposition constellation, which is described as an operation performed by demapper 1810 shown in FIG. 30, in addition to demapping that is based on the first bit stream and the second constellation.

Demapper 1721 switches between demapping to be performed on the signal outputted from subtractor 1719 on the basis of the second constellation and demapping to be performed on the signal outputted from RF unit 1730 on the basis of the variation superposition constellation. For example, demapper 1721 switches between these demapping operations in accordance with a control signal from the controller.

Note that such a configuration is also obtained by a combination of reception device 400 shown in FIG. 11, reception device 1700 (demapper 1721, etc.) shown in FIG. 29, and reception device 1800 (demapper 1810, etc.) shown in FIG. 30.

As described above, reception devices 1500, 1600, and 1700 perform parallel decoding when the SNR is high, thereby reducing the number of arithmetic computations and power consumption. Reception devices 1500, 1600, and 1700 also perform parallel decoding when the SNR is high, thereby reducing processing delays. Meanwhile, reception devices 1500, 1600, and 1700 perform sequential decoding when the SNR is low, thereby increasing the possibility of correctly decoding the second data series.

In the present embodiment, different mapping rules may be used for the real part and the imaginary part in the second mapping scheme. When superposition coding is performed on the real part, the receiving level of the real part is lower than the receiving level of the imaginary part in the second mapping scheme. Accordingly, in the second mapping scheme, it is better that the noise tolerance of the real part is higher than the noise tolerance of the imaginary part.

Accordingly, it is suitable to make the multilevel number for mapping the real part smaller than the multilevel number for mapping the imaginary part. A multilevel number is also referred to as a modulation multilevel number. For example, 32-PAM may be used to map the real part in accordance with the second mapping scheme, and 64-PAM may be used to map the imaginary part.

When a non-uniform constellation is used as the second constellation of the second mapping scheme, it is suitable to use a non-uniform constellation in which the real part corresponds to an SNR lower than that of the imaginary part. For example, non-uniform 32-PAM corresponding to an SNR of about 15 dB may be used to map the real part in accordance with the second mapping scheme, and non-uniform 32-PAM corresponding to an SNR of about 20 dB may be used to map the imaginary part.

Note that 32 indicated as the multilevel number for mapping the real part and 64 indicated as the multilevel number for mapping the imaginary part are mere examples and may be other values. For example, 4-PAM may be used for the real part, and 8-PAM may be used for the imaginary part. Furthermore, 2-PAM may be used for the real part, and 4-PAM may be used for the imaginary part. Furthermore, 2-PAM may be used for the real part, and 8-PAM may be used for the imaginary part. Thus, a combination of any values may be used to map the real part and the imaginary part.

The second data series may include two series. Among the two series, a bit stream in one series is mapped on the real part, and a bit stream in the other series may be mapped on the imaginary part. One modulated symbol stream may be generated as the second modulated symbol stream by mapping the two bit streams in the two series on the real part and the imaginary part. In such a case, PAM that can be used as a single-axis modulation scheme is effective. Note that PAM means pulse amplitude modulation.

Figure 35:
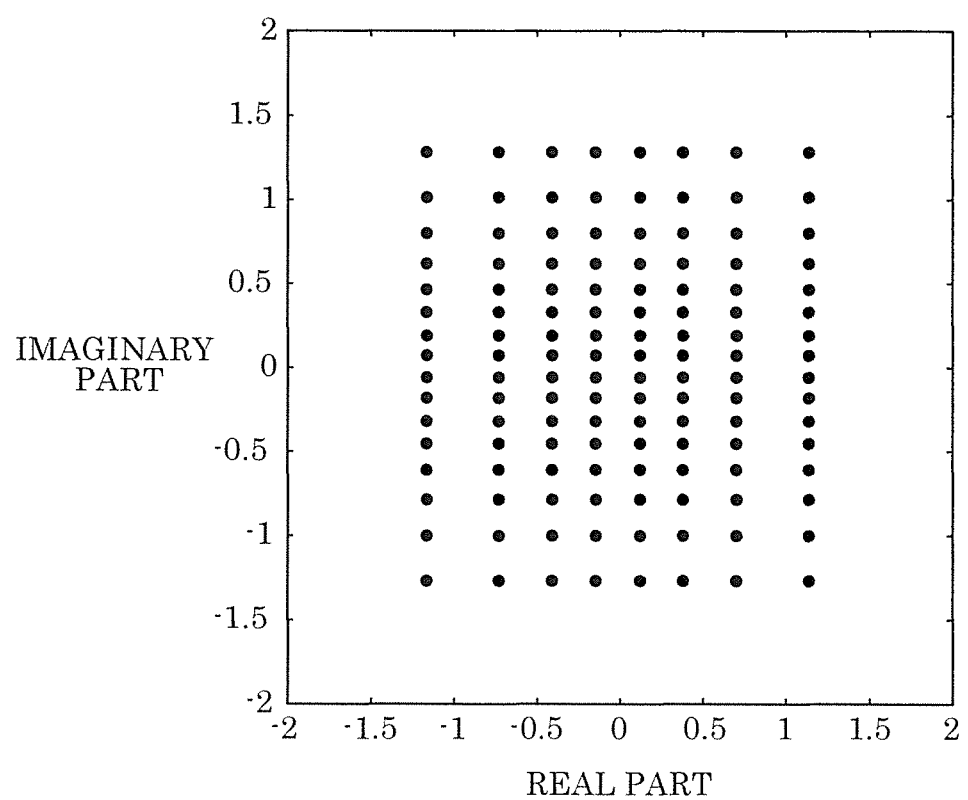
FIG. 35 is a diagram showing an example of a constellation based on PAM.

FIG. 35 shows an example of a constellation based on PAM. Specifically, a plurality of signal points based on PAM are plotted in the complex plane, with the lateral axis representing the real part (the real component) and the vertical axis representing the imaginary part (the imaginary component). In this example, non-uniform 8-PAM is used for the real part and non-uniform 16-PAM is used for the imaginary part.

The constellation shown in FIG. 35 may be used as the second constellation of the second mapping scheme. Specifically, a constellation in which more signal points are arranged in the vertical axis direction corresponding to the imaginary part than in the horizontal axis direction corresponding to the real part may be used as the second constellation of the second mapping scheme.

Figure 36:
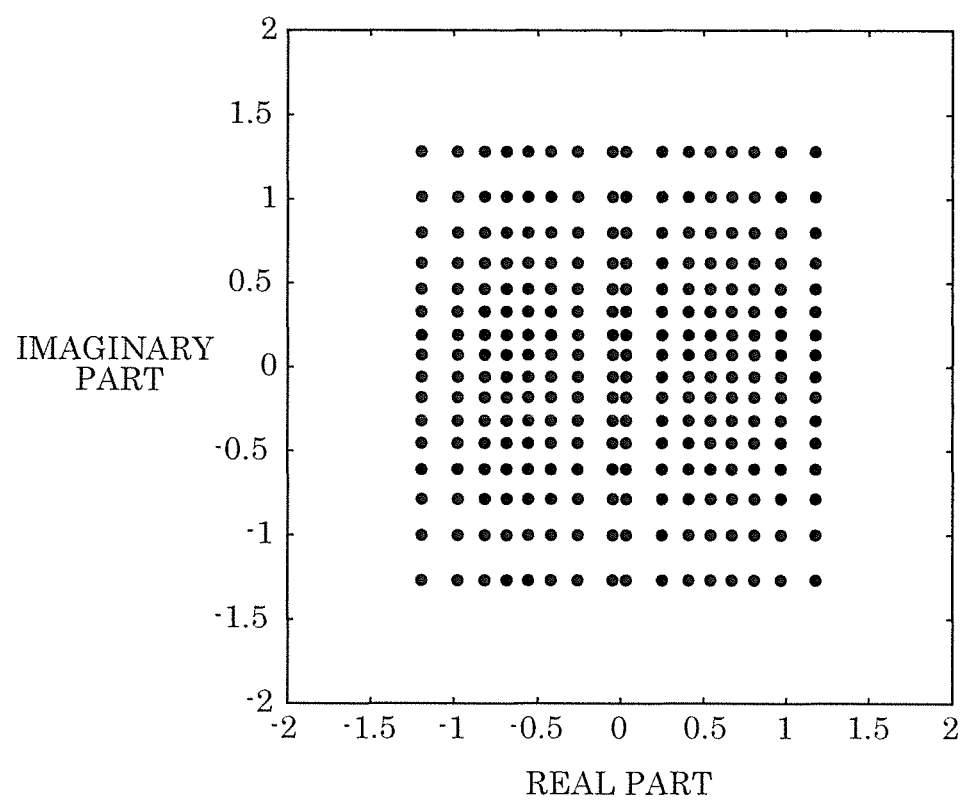
FIG. 36 is a diagram showing a second example of the variation superposition constellation according to Embodiment 4.

FIG. 36 shows an example of the variation superposition constellation corresponding to the variation of superposition coding. Specifically, the constellation shown in FIG. 31 and the constellation shown in FIG. 35 are combined. Stated differently, a BPSK constellation and a constellation based on PAM are combined. The first constellation of the first mapping scheme is the BPSK constellation, and the second constellation of the second mapping scheme is the constellation based on PAM.

More specifically, in accordance with two signal points in the BPSK constellation, the constellation based on PAM (128 signal points) is placed on each of two regions in the complex plane. The two regions, each corresponding to the constellation based on PAM, may partially overlap each other.

In this example, first amplitude coefficient $a_1$ is a positive square root of 0.75, second amplitude coefficient $a_2$ is a positive square root of 0.25, and two constellations are combined based on the amplitude coefficients. Note that in superposition coding in this example, the imaginary part of the second modulated symbol stream is not multiplied by second amplitude coefficient $a_2$, and the value of the imaginary part at a signal point included in the second constellation that is a constellation based on PAM is maintained.

The variation superposition constellation reflects the conversion performed on the second modulated symbol stream. For example, when the constellation based on PAM is combined with a signal point with a positive real part among two signal points in the BPSK constellation, the polarity of the real part in the constellation based on PAM is reversed.

Note that in the above second mapping scheme, the mapping rule for the real part and the mapping rule for the imaginary part are based on PAM, yet the second mapping scheme may be a mapping scheme other than this.

For example, arbitrary QAM or arbitrary non-uniform QAM which has arrangement of signal points each with the real part and the imaginary part both represented by PAM of an arbitrary multilevel number may be used as the second mapping scheme. As another example, arbitrary non-uniform QAM which has arrangement of signal points each with the real part and the imaginary part either or both of which are not represented by PAM may be used as the second mapping scheme.

In this case, for example, the arrangement of signal points each with the real part corresponding to an SNR of about 15 dB and the imaginary part corresponding to an SNR of about 20 dB may be used for the second mapping scheme. As another example, the arrangement of signal points in which the greatest value of the real components at the signal points is smaller than the greatest value of the imaginary components at the signal points may be used as the second mapping scheme.

In the above, superposition coding is performed on the real part, yet processing on the real part and processing on the imaginary part may be switched, and superposition coding may be performed on the imaginary part. Stated differently, a first modulated symbol may be constituted by the imaginary component, and the imaginary component of the first modulated symbol and the imaginary component of a second modulated symbol may be superposed on a single imaginary component.

In addition, the second modulated symbol stream is not necessarily subjected to conversion in accordance with the first modulated symbol stream. Specifically, the polarity may not be reversed, and may not need to be controlled. Even if such conversion is not applied, simple superposition coding can be performed along the real axis, the imaginary axis, or one direction corresponding to another axis. Accordingly, this provides more flexible superposition coding.

Even if conversion is not applied, superposition coding is performed more efficiently by use of a mapping scheme or a constellation according to the direction of superposition coding.

As described above, a transmission device according to an aspect of the present disclosure is a transmission device that multiplexes a plurality of data series including a first data series in a first layer and a second data series in a second layer, and transmits a multiplexed signal into which the plurality of data series have been multiplexed, the transmission device including: a first mapper that maps a first bit stream of the first data series to generate a first modulated symbol stream of the first data series; a second mapper that maps a second bit stream of the second data series to generate a second modulated symbol stream of the second data series; a converter that subjects the second modulated symbol stream to conversion in accordance with the first modulated symbol stream in only a first direction among the first direction and a second direction perpendicular to each other in a complex plane in which the first modulated symbol stream and the second modulated symbol stream are represented; a superposer that superposes the first modulated symbol stream and the second modulated symbol stream subjected to the conversion, at a predetermined amplitude ratio, to generate the multiplexed signal; and a transmitter that transmits the multiplexed signal.

Accordingly, for example, the transmission device can convert a component which each modulated symbol in the second modulated symbol stream of the second data series includes in the first direction, in accordance with the first modulated symbol stream of the first data series. Accordingly, the transmission device can appropriately adjust the second modulated symbol stream of the second data series, in accordance with the first modulated symbol stream of the first data series, thus allowing the second data series to be readily derived from the multiplexed signal into which the first modulated symbol stream and the second modulated symbol stream are multiplexed.

Accordingly, the transmission device can help inhibiting a processing delay in the reception device, and can efficiently perform processing in a multiplexing scheme that utilizes superposition coding.

For example, the converter may control a polarity of a component that each of modulated symbols in the second modulated symbol stream includes in the first direction, by subjecting the second modulated symbol stream to the conversion.

Accordingly, the transmission device can control the polarity of a component that each modulated symbol in the second modulated symbol stream includes in the first direction, in accordance with the first modulated symbol stream. Thus, the transmission device can superpose the first modulated symbol stream and the second modulated symbol stream in which the polarity of each modulated symbol in the first direction is controlled in accordance with the first modulated symbol stream. Stated differently, the transmission device can superpose the first modulated symbol stream and the second modulated symbol stream in which the polarity is appropriately adjusted in accordance with the first modulated symbol stream.

For example, in superposing the first modulated symbol stream and the second modulated symbol stream, the superposer may superpose a first modulated symbol in the first modulated symbol stream and a second modulated symbol in the second modulated symbol stream in which the polarity is controlled, and in controlling the polarity, when a component that the first modulated symbol includes in the first direction satisfies a predetermined condition, the converter may reverse a polarity of a component that the second modulated symbol includes in the first direction.

Accordingly, the transmission device can transmit the multiplexed signal on which the first modulated symbol and the second modulated symbol the polarity of which in the first direction is reversed in accordance with the first modulated symbol are superposed. The reversal of the polarity of the second modulated symbol brings a plurality of signal points associated with the same bit group of the second data series close to each other. Accordingly, the transmission device can more appropriately adjust the second modulated symbol stream of the second data series in accordance with the first modulated symbol stream of the first data series, and allows the second data series to be readily derived from the multiplexed signal.

For example, the converter may subject the second modulated symbol stream to the conversion by converting the second bit stream, a constellation used to map the second bit stream, or the second modulated symbol stream, in accordance with the first bit stream or the first modulated symbol stream.

Accordingly, the transmission device can convert information corresponding to the second modulated symbol stream in accordance with information corresponding to the first modulated symbol stream, and can appropriately subject the second modulated symbol stream to the conversion in accordance with the first modulated symbol stream.

For example, the first mapper may map the first bit stream by use of a first constellation in which a plurality of signal points are dispersed in only the first direction among the first direction and the second direction, and the second mapper may map the second bit stream by use of a second constellation in which a plurality of signal points are dispersed in both the first direction and the second direction.

Accordingly, the transmission device can apply superposition coding in the first direction. Thus, the transmission device can superpose, on a single component, a component that the first modulated symbol in the first modulated symbol stream includes in the first direction, and a component that the second modulated symbol in the second modulated symbol stream includes in the first direction. The transmission device can apply suitable superposition coding in the first direction, using the second modulated symbol stream adjusted with respect to the first direction.

For example, the second constellation used by the second mapper to map the second bit stream may be a constellation in which noise tolerance in the first direction is higher than noise tolerance in the second direction.

Accordingly, the transmission device can inhibit the influence of noise tolerance which decreases due to superposition coding, for the first direction in which superposition coding is applied.

For example, the second constellation used by the second mapper to map the second bit stream may be a constellation in which a multilevel number in the first direction is smaller than a multilevel number in the second direction.

Accordingly, the transmission device can inhibit the influence of the multilevel number which increases due to superposition coding, for the first direction in which superposition coding is applied. Thus, the transmission device can inhibit the influence of noise tolerance which decreases due to superposition coding, for the first direction in which superposition coding is applied.

For example, the multiplexed signal generated by the superposer may be a signal on which (i) a first modulated symbol in the first modulated symbol stream, (ii) a first component that a second modulated symbol in the second modulated symbol stream includes in the first direction, and (iii) a second component that the second modulated symbol includes in the second direction are superposed, and a proportion of the first component superposed on the multiplexed signal may be lower than a proportion of the second component superposed on the multiplexed signal.

Accordingly, the transmission device relatively decreases the first component in the first direction in which superposition coding is applied, and can relatively increase the second component in the second direction perpendicular to the first direction. Thus, the transmission device can appropriately apply superposition coding for the first component, and inhibit the influence caused by superposition coding for the second component.

For example, the converter may control a polarity of a component that each of modulated symbols in the second modulated symbol stream includes in the first direction, by subjecting the second modulated symbol stream to the conversion, in superposing the first modulated symbol stream and the second modulated symbol stream, the superposer may superpose a first modulated symbol in the first modulated symbol stream and a second modulated symbol in the second modulated symbol stream in which the polarity is controlled, and in controlling the polarity, the converter may reverse a polarity of a component that the second modulated symbol includes in the first direction when the first modulated symbol corresponds to one of two signal points adjacent to each other in the first constellation, and may maintain the polarity of the component that the second modulated symbol includes in the first direction when the first modulated symbol corresponds to the other of the two signal points.

Accordingly, the transmission device can appropriately control the polarity of the component that the second modulated symbol in the second modulated symbol stream includes in the first direction, in accordance with the first modulated symbol in the first modulated symbol stream.

A reception device according to an aspect of the present disclosure includes: a receiver that receives a multiplexed signal into which a plurality of data series including a first data series in a first layer and a second data series in a second layer have been multiplexed, and on which a first modulated symbol stream and a second modulated symbol stream are superposed at a predetermined amplitude ratio, the first modulated symbol stream being generated by mapping a first bit stream of the first data series, the second modulated symbol stream being generated by mapping a second bit stream of the second data series; and a deriver that derives at least one of the first data series or the second data series from the multiplexed signal. The multiplexed signal received by the receiver is a signal on which the first modulated symbol stream and the second modulated symbol stream are superposed, the second modulated symbol stream being subjected to conversion in accordance with the first modulated symbol stream in only a first direction among the first direction and a second direction perpendicular to each other in a complex plane in which the first modulated symbol stream and the second modulated symbol stream are represented.

Accordingly, the reception device can receive the multiplexed signal into which the first modulated symbol stream and the second modulated symbol stream adjusted in accordance with the first modulated symbol stream with respect to the first direction in the complex plane are multiplexed. Thus, the reception device can appropriately derive the first data series or the second data series from the multiplexed signal into which the first data series and the second data series are appropriately multiplexed. Hence, the reception device can efficiently perform processing in a multiplexing scheme that utilizes superposition coding.

A transmission method according to an aspect of the present disclosure is a transmission method of multiplexing a plurality of data series including a first data series in a first layer and a second data series in a second layer, and transmitting a multiplexed signal into which the plurality of data series have been multiplexed, the transmission method including: mapping a first bit stream of the first data series to generate a first modulated symbol stream of the first data series; mapping a second bit stream of the second data series to generate a second modulated symbol stream of the second data series; subjecting the second modulated symbol stream to conversion in accordance with the first modulated symbol stream in only a first direction among the first direction and a second direction perpendicular to each other in a complex plane in which the first modulated symbol stream and the second modulated symbol stream are represented; superposing the first modulated symbol stream and the second modulated symbol stream subjected to the conversion, at a predetermined amplitude ratio, to generate the multiplexed signal; and transmitting the multiplexed signal.

Accordingly, for example, the transmission device, etc. employing this transmission method can convert the component that each modulated symbol in the second modulated symbol stream of the second data series includes in the first direction, in accordance with the first modulated symbol stream of the first data series. The transmission device, etc. employing this transmission method thus can appropriately adjust the second modulated symbol stream of the second data series in accordance with the first modulated symbol stream of the first data series, and allow the second data series to be readily derived from the multiplexed signal into which the first modulated symbol stream and the second modulated symbol stream are multiplexed.

Thus, the transmission device, etc. employing this transmission method can help inhibiting a processing delay in the reception device, and can efficiently perform processing in a multiplexing scheme that utilizes superposition coding.

For example, a polarity of a component that each of modulated symbols in the second modulated symbol stream includes in the first direction may be controlled by the second modulated symbol stream being subjected to the conversion.

Accordingly, the transmission device, etc. employing this transmission method can control the polarity of a component that each modulated symbol in the second modulated symbol stream includes in the first direction, in accordance with the first modulated symbol stream. Thus, the transmission device, etc. employing this transmission method can superpose the first modulated symbol stream, and the second modulated symbol stream in which the polarity of each modulated symbol in the first direction is controlled in accordance with the first modulated symbol stream. Stated differently, the transmission device, etc. employing this transmission method can superpose the first modulated symbol stream, and the second modulated symbol stream in which the polarity is appropriately adjusted in accordance with the first modulated symbol stream.

For example, in superposing the first modulated symbol stream and the second modulated symbol stream, a first modulated symbol in the first modulated symbol stream and a second modulated symbol in the second modulated symbol stream in which the polarity is controlled may be superposed, and in controlling the polarity, when a component that the first modulated symbol includes in the first direction satisfies a predetermined condition, a polarity of a component that the second modulated symbol includes in the first direction may be reversed.

Thus, the transmission device, etc. employing this transmission method can transmit the multiplexed signal on which the first modulated symbol and the second modulated symbol the polarity of which in the first direction is reversed in accordance with the first modulated symbol are superposed. The reversal of the polarity of the second modulated symbol brings a plurality of signal points associated with the same bit group of the second data series close to each other. Thus, the transmission device, etc. employing this transmission method can more appropriately adjust the second modulated symbol stream of the second data series in accordance with the first modulated symbol stream of the first data series, and allow the second data series to be readily derived from the multiplexed signal.

For example, the second modulated symbol stream may be subjected to the conversion by converting the second bit stream, a constellation used to map the second bit stream, or the second modulated symbol stream, in accordance with the first bit stream or the first modulated symbol stream.

Thus, the transmission device, etc. employing this transmission method can convert information corresponding to the second modulated symbol stream in accordance with information corresponding to the first modulated symbol stream, and can appropriately subject the second modulated symbol stream to the conversion in accordance with the first modulated symbol stream.

For example, in mapping the first bit stream, a first constellation may be used to map the first bit stream, the first constellation being a constellation in which a plurality of signal points are dispersed in only the first direction among the first direction and the second direction, and in mapping the second bit stream, a second constellation may be used to map the second bit stream, the second constellation being a constellation in which a plurality of signal points are dispersed in both the first direction and the second direction.

Accordingly, the transmission device, etc. employing this transmission method can apply superposition coding in the first direction. Thus, the transmission device, etc. employing this transmission method can superpose, onto a single component, a component that the first modulated symbol in the first modulated symbol stream includes in the first direction and a component that the second modulated symbol in the second modulated symbol stream includes in the first direction. Further, the transmission device, etc. employing this transmission method can apply suitable superposition coding in the first direction, using the second modulated symbol stream adjusted with respect to the first direction.

For example, in mapping the second bit stream, the second constellation used to map the second bit stream may be a constellation in which noise tolerance in the first direction is higher than noise tolerance in the second direction.

Accordingly, the transmission device, etc. employing this transmission method can inhibit the influence of noise tolerance that decreases due to superposition coding, for the first direction in which superposition coding is applied.

For example, in mapping the second bit stream, the second constellation used to map the second bit stream may be a constellation in which a multilevel number in the first direction is smaller than a multilevel number in the second direction.

Accordingly, the transmission device, etc. employing this transmission method can inhibit the influence of a multilevel number which increases due to superposition coding, for the first direction in which superposition coding is applied. Specifically, the transmission device, etc. employing this transmission method can inhibit the influence of noise tolerance which decreases due to superposition coding, for the first direction in which superposition coding is applied.

For example, in generating the multiplexed signal, the multiplexed signal generated may be a signal on which (i) a first modulated symbol in the first modulated symbol stream, (ii) a first component that a second modulated symbol in the second modulated symbol stream includes in the first direction, and (iii) a second component that the second modulated symbol includes in the second direction are superposed, and a proportion of the first component superposed on the multiplexed signal may be lower than a proportion of the second component superposed on the multiplexed signal.

Accordingly, the transmission device, etc. employing this transmission method can make the first component in the first direction in which superposition coding is applied relatively small and can make the second component in the second direction perpendicular to the first direction relatively large. Thus, the transmission device, etc. employing this transmission method can appropriately apply superposition coding to the first component, and can inhibit the influence caused by superposition coding on the second component.

For example, a polarity of a component that each of modulated symbols in the second modulated symbol stream includes in the first direction may be controlled by the second modulated symbol stream being subjected to the conversion, in superposing the first modulated symbol stream and the second modulated symbol stream, a first modulated symbol in the first modulated symbol stream and a second modulated symbol in the second modulated symbol stream in which the polarity is controlled may be superposed, and in controlling the polarity, a polarity of a component that the second modulated symbol includes in the first direction may be reversed when the first modulated symbol corresponds to one of two signal points adjacent to each other in the first constellation, and the polarity of the component that the second modulated symbol includes in the first direction may be maintained when the first modulated symbol corresponds to the other of the two signal points.

Accordingly, the transmission device, etc. employing this transmission method can appropriately control the polarity of a component that the second modulated symbol in the second modulated symbol stream includes in the first direction, in accordance with the first modulated symbol in the first modulated symbol stream.

A receiving method according to an aspect of the present disclosure includes: receiving a multiplexed signal into which a plurality of data series including a first data series in a first layer and a second data series in a second layer have been multiplexed, and on which a first modulated symbol stream and a second modulated symbol stream are superposed at a predetermined amplitude ratio, the first modulated symbol stream being generated by mapping a first bit stream of the first data series, the second modulated symbol stream being generated by mapping a second bit stream of the second data series; and deriving at least one of the first data series or the second data series from the multiplexed signal. In receiving the multiplexed signal, the multiplexed signal received is a signal on which the first modulated symbol stream and the second modulated symbol stream are superposed, the second modulated symbol stream being subjected to conversion in accordance with the first modulated symbol stream in only a first direction among the first direction and a second direction perpendicular to each other in a complex plane in which the first modulated symbol stream and the second modulated symbol stream are represented.

Accordingly, the reception device, etc. employing this reception method can receive a multiplexed signal into which the first modulated symbol stream and the second modulated symbol stream adjusted in accordance with the first modulated symbol stream with respect to the first direction in the complex plane are multiplexed. Accordingly, the reception device, etc. employing this reception method can appropriately derive the first data series or the second data series from the multiplexed signal into which the first data series and the second data series are appropriately multiplexed. Thus, the reception device, etc. employing this reception method can efficiently perform processing in a multiplexing scheme that utilizes superposition coding.

Note that although the above description of the embodiments illustrates an example in which two data series are multiplexed and transmitted on the two layers to simplify the description, it is clear that the present disclosure is readily extendable to multiplexing and transmitting three or more data series, following the embodiments.

Also, FIG. 1, FIG. 13 to FIG. 15, and FIG. 24 to FIG. 26 illustrate an example in which a radio-frequency signal is sent from an external antenna connected to the transmission device that does not include an antenna, but the transmission device may include an antenna such that a radio-frequency signal is sent from such an antenna of the transmission device.

Also, FIG. 2, FIG. 7, FIG. 16 to FIG. 19, and FIG. 27 to FIG. 30 illustrate an example in which a radio-frequency signal is sent from an external antenna connected to the reception device that does not include an antenna, but the reception device may include an antenna such that a radio-frequency signal is sent from such an antenna of the reception device.

Also, the antennas used to send/receive a radio-frequency signal may be an antenna unit that includes a plurality of antennas.

Although not illustrated in FIG. 1, FIG. 13 to FIG. 15, and FIG. 24 to FIG. 26, the transmission device may include a frame configuration unit that arranges a superposed signal generated by the adder in accordance with a predetermined frame configuration to generate a frame, and outputs such a frame into the RF unit.

Here, the configuration of a frame generated by the frame configuration unit may be uniform, or may be changed in accordance with a control signal sent from a controller not illustrated. The frame configuration unit arranges, in a frame, a superposed modulated symbol stream in which the first data series and the second data series are multiplexed, in accordance with a predetermined rule.

The frame generated by the frame configuration unit may include a pilot symbol, a control information symbol, a preamble, etc. in addition to a data symbol. Note that a pilot symbol, a control information symbol, and a preamble can each be referred to by another name.

For example, a pilot symbol may be a symbol that is generated by mapping a bit stream known to the reception device on the basis of PSK modulation such as BPSK and QPSK. A pilot symbol may also be a symbol that includes an amplitude and in-phase (or complex value) known to the reception device. A pilot symbol may also be a symbol, according to which the reception device can estimate the amplitude and in-phase (or complex value) sent by the transmission device.

Then, the reception device uses the pilot symbol to perform frequency synchronization, time synchronization, channel estimation, etc. on the received signal. Channel estimation is also referred to as the estimation of channel state information (CSI).

A control information symbol is a symbol used to transmit information that should be notified to the reception device as information required to demodulate a received signal and obtain a desired data series.

For example, the transmission device sends a control information symbol corresponding to control information. The control information may indicate the mapping (modulation) scheme and error control coding scheme used for each data series, the code rate and code length of the error control coding scheme, and the positions where the modulated symbols of each data series are arranged in a frame, etc. The reception device demodulates the control information symbol to obtain the control information. The reception device then demodulates a data symbol on the basis of the obtained control information to obtain the data series.

The control information may also include information used to control the operations of an application, such as settings information for an upper layer.

A preamble is a signal added at the leading end of a frame. For example, the reception device may receive a signal that includes a preamble to perform processes such as frame detection and frame synchronization on the basis of the preamble. A preamble may also include a pilot symbol and a control information symbol. A frame may also include not only a preamble but also a postamble, which is a signal added at the rear end of the frame.

The encoders use low density parity check (LDPC) coding, turbo coding, etc., for example, as the error control coding scheme. The encoders may also use another coding scheme.

The transmission devices illustrated in FIG. 1, FIG. 13 to FIG. 15, and FIG. 24 to FIG. 26 include their respective interleavers, but may not include interleavers as described above. In such a case, the transmission device may input a bit stream generated by each encoder directly into each mapper or may perform a process different from interleaving on the bit stream before inputting it into each mapper. When the transmission device does not include any interleavers, the reception devices illustrated in FIG. 2, FIG. 7, FIG. 16 to FIG. 19, and FIG. 27 to FIG. 30 may not include any deinterleavers.

The deinterleavers of the reception devices illustrated in FIG. 2, FIG. 7, FIG. 16 to FIG. 19, and FIG. 27 to FIG. 30 perform permutation on the basis of a permutation rule that is a reverse rule of the permutation rule used by the transmission side, but may perform an operation different from such permutation. For example, each deinterleaver may input into the corresponding decoder a plurality of bit likelihoods of a bit likelihood stream generated by the corresponding demapper in the bit order required for decoding performed by the decoder.

In the above description, although superposition coding and the variation of superposition coding are applied to wireless transmission, but the present disclosure is not limited to the application to wireless transmission, and thus may be applied to wired transmission, optical transmission, etc. and also to storage into a recording medium. A frequency band used for transmission is not limited to a radio-frequency band, and thus may be a baseband.

"A plurality of" used in the present disclosure is synonymous with "two or more". Ordinal numbers such as first, second, and third may be removed from the expressions, replaced by other wording, or newly added as appropriate.

Note that the devices, methods, etc. according to the present disclosure are not limited to the respective embodiments, and thus allow for various modifications for implementation. For example, in the embodiments, the technology of the present disclosure is implemented as a communication device (transmission device or reception device), but the technology of the present disclosure is not limited to this, and thus may be implemented as software used to execute a communication method (transmission method or reception method) executed by such a communication device.

Also, two or more structural components of the transmission device or the reception device may be integrated as a single structural component, and a single structural component may be divided into two or more structural components. Also, the transmission device and the reception device may form a single transmission/reception device. In such a case, a plurality of structural components of the same kind may be integrated into a single structural component. For example, a transmission antenna and a reception antenna may be formed by a single antenna.

Also, for example, a process performed by a specified structural component may be performed by another structural component. The order of performing processes may be changed, and a plurality of processes may be performed in parallel.

Note that a program for executing the above-described communication method may be previously stored in a read only memory (ROM) to be executed by a central processing unit (CPU).

Moreover, the program for executing the above communication method may be stored in a computer-readable recording medium. Such a program stored in the recording medium may be recorded in a random access memory (RAM) in a computer so that the computer may execute the communication method according to the program.

Note that each of the structural components according to the embodiments, etc. may be implemented as a large-scale integration (LSI), which is typically an integrated circuit. The structural components may take the form of individual chips, or one or more or all of the structural components according to the embodiments may be encapsulated into a single chip. Although LSI is illustrated here as an example, such chips may be referred to as integrated circuits (ICs), system LSIs, super LSIs, or ultra LSIs, depending on their degree of integration.

The ICs are not limited to LSIs. Each of the structural components thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

Furthermore, when the progress in a semiconductor technology or another derivative technology results in a new IC technology that replaces LSI, such new technology may of course be employed to integrate the devices or some of their structural components according to the embodiments. For example, adaptation to biotechnology is possible.

Furthermore, when the progress in a semiconductor technology or another derivative technology results in a new IC technology that replaces LSI, such new technology may of course be employed to integrate the devices or some of their structural components according to the embodiments. For example, adaptation to biotechnology is possible.

In this disclosure, the phrase of "at least one of A or B" should be interpreted that the phrase includes only A, only B, and both A and B.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a wireless communication system and a broadcasting system, etc. The present disclosure is widely applicable to a system for multiplexing a plurality of data series by superposition coding.

The present disclosure is also applicable to a wired communication system, etc. such as a power line communication (PLC) system, an optical communication system, and a digital subscriber line (DSL) system. The present disclosure is further applicable to a storage system, etc. for recording data into a recording medium such as an optical disk and a magnetic disk.

What is claimed is:

1. A transmission device comprising:
a first mapper configured to map a first bit stream of a first data series to generate a first modulated symbol stream;
a second mapper configured to map a second bit stream of a second data series to generate a second modulated symbol stream, the first modulated symbol stream and the second modulated symbol stream being representable on a complex plane extending in a first direction and a second direction perpendicular to the first direction;
a converter configured to convert the second modulated symbol stream in accordance with the first modulated symbol stream only in the first direction on the complex plane;
a superposer configured to superpose the first modulated symbol stream and the second modulated symbol stream converted by the converter, at an amplitude ratio, to generate a multiplexed signal; and
a transmitter configured to transmit the multiplexed signal.

2. The transmission device according to claim 1, wherein the converter controls a polarity of a component that each of modulated symbols in the second modulated symbol stream includes in the first direction, by converting the second modulated symbol stream.

3. The transmission device according to claim 2, wherein
in superposing the first modulated symbol stream and the second modulated symbol stream, the superposer superposes a first modulated symbol in the first modulated symbol stream and a second modulated symbol in the second modulated symbol stream in which the polarity is controlled, and
in controlling the polarity, when a component that the first modulated symbol includes in the first direction satisfies a predetermined condition, the converter reverses a polarity of a component that the second modulated symbol includes in the first direction.

4. The transmission device according to claim 1, wherein the converter converts the second modulated symbol stream by converting the second bit stream, a constellation used to map the second bit stream, or the second modulated symbol stream, in accordance with the first bit stream or the first modulated symbol stream.

5. The transmission device according to claim 1, wherein
the first mapper maps the first bit stream by use of a first constellation in which a plurality of signal points are dispersed in only the first direction among the first direction and the second direction, and
the second mapper maps the second bit stream by use of a second constellation in which a plurality of signal points are dispersed in both the first direction and the second direction.

6. The transmission device according to claim 5, wherein the second constellation used by the second mapper to map the second bit stream is a constellation in which noise tolerance in the first direction is higher than noise tolerance in the second direction.

7. The transmission device according to claim 5, wherein the second constellation used by the second mapper to map the second bit stream is a constellation in which a multilevel number in the first direction is smaller than a multilevel number in the second direction.

8. The transmission device according to claim 5, wherein the multiplexed signal generated by the superposer is a signal on which (i) a first modulated symbol in the first modulated symbol stream, (ii) a first component that a second modulated symbol in the second modulated symbol stream includes in the first direction, and (iii) a second component that the second modulated symbol includes in the second direction are superposed, and a proportion of the first component superposed on the multiplexed signal is lower than a proportion of the second component superposed on the multiplexed signal.

9. The transmission device according to claim 5, wherein the converter controls a polarity of a component that each of modulated symbols in the second modulated symbol stream includes in the first direction, by converting the second modulated symbol stream, in superposing the first modulated symbol stream and the second modulated symbol stream, the superposer superposes a first modulated symbol in the first modulated symbol stream and a second modulated symbol in the second modulated symbol stream in which the polarity is controlled, and in controlling the polarity, the converter reverses a polarity of a component that the second modulated symbol includes in the first direction when the first modulated symbol corresponds to one of two signal points adjacent to each other in the first constellation, and maintains the polarity of the component that the second modulated symbol includes in the first direction when the first modulated symbol corresponds to the other of the two signal points.

10. The transmission device according to claim 1,
wherein the superposer is configured to generate the multiplexed signal for multiple access,
wherein the first data series is provided for a first reception device, and
wherein the second data series is provided for a second reception device.

11. The transmission device according to claim 1, wherein the first direction is provided along one of a real axis and an imaginary axis of the complex plane.

12. The transmission device according to claim 1, wherein the converter reverses a polarity of a real part of a second modulated symbol included in the second modulated symbol stream if a first modulated symbol included in the first modulated symbol stream has a positive real part.

13. A reception device comprising:
a receiver configured to receive a multiplexed signal on which a first modulated symbol stream and a second modulated symbol stream are superposed at an amplitude ratio, the first modulated symbol stream being generated by mapping a first bit stream of a first data series, the second modulated symbol stream being generated by mapping a second bit stream of a second data series, the first modulated symbol stream and the second modulated symbol stream being representable on a complex plane extending in a first direction and a second direction perpendicular to the first direction; and a deriver configured to derive at least one of the first data series or the second data series from the multiplexed signal, wherein
the receiver receives the multiplexed signal on which the second modulated symbol stream is converted in accordance with the first modulated symbol stream only in the first direction on the complex plane.

14. The reception device according to claim 13,
wherein the receiver is configured to receive the multiplexed signal provided for multiple access,
wherein the deriver is configured to derive only the first data series, and
wherein the second data series is provided to be derived in another reception device.

15. The reception device according to claim 13, wherein the first direction is provided along one of a real axis and an imaginary axis of the complex plane.

16. The reception device according to claim 13, wherein the receiver receives the multiplexed signal in which a polarity of a real part of a second modulated symbol included in the second modulated symbol stream is reversed and in which a first modulated symbol included in the first modulated symbol stream has a positive real part.

17. A transmission method comprising:
mapping a first bit stream of a first data series to generate a first modulated symbol stream;
mapping a second bit stream of a second data series to generate a second modulated symbol stream, the first modulated symbol stream and the second modulated symbol stream being representable on a complex plane extending in a first direction and a second direction perpendicular to the first direction;
converting the second modulated symbol stream in accordance with the first modulated symbol stream only in the first direction on the complex plane;
superposing the first modulated symbol stream and the second modulated symbol stream, at an amplitude ratio, to generate a multiplexed signal after the second modulated symbol stream is converted; and
transmitting the multiplexed signal.

18. The transmission method according to claim 17, wherein
a polarity of a component that each of modulated symbols in the second modulated symbol stream includes in the first direction is controlled by converting the second modulated symbol stream being subjected.

19. The transmission method according to claim 18, wherein
in superposing the first modulated symbol stream and the second modulated symbol stream, a first modulated symbol in the first modulated symbol stream and a second modulated symbol in the second modulated symbol stream in which the polarity is controlled are superposed, and
in controlling the polarity, when a component that the first modulated symbol includes in the first direction satisfies a predetermined condition, a polarity of a component that the second modulated symbol includes in the first direction is reversed.

20. The transmission method according to claim 17, wherein
the second modulated symbol stream is converted by converting the second bit stream, a constellation used to map the second bit stream, or the second modulated symbol stream, in accordance with the first bit stream or the first modulated symbol stream.

21. The transmission method according to claim 17, wherein
in mapping the first bit stream, a first constellation is used to map the first bit stream, the first constellation being a constellation in which a plurality of signal points are dispersed in only the first direction among the first direction and the second direction, and
in mapping the second bit stream, a second constellation is used to map the second bit stream, the second constellation being a constellation in which a plurality of signal points are dispersed in both the first direction and the second direction.

22. The transmission method according to claim 21, wherein
in mapping the second bit stream, the second constellation used to map the second bit stream is a constellation in which noise tolerance in the first direction is higher than noise tolerance in the second direction.

23. The transmission method according to claim 21, wherein
in mapping the second bit stream, the second constellation used to map the second bit stream is a constellation in which a multilevel number in the first direction is smaller than a multilevel number in the second direction.

24. The transmission method according to claim 21, wherein
in generating the multiplexed signal, the multiplexed signal generated is a signal on which (i) a first modulated symbol in the first modulated symbol stream, (ii) a first component that a second modulated symbol in the second modulated symbol stream includes in the first direction, and (iii) a second component that the second modulated symbol includes in the second direction are superposed, and
a proportion of the first component superposed on the multiplexed signal is lower than a proportion of the second component superposed on the multiplexed signal.

25. The transmission method according to claim 21, wherein
a polarity of a component that each of modulated symbols in the second modulated symbol stream includes in the first direction is controlled by the second modulated symbol stream being converted,
in superposing the first modulated symbol stream and the second modulated symbol stream, a first modulated symbol in the first modulated symbol stream and a second modulated symbol in the second modulated symbol stream in which the polarity is controlled are superposed, and
in controlling the polarity, a polarity of a component that the second modulated symbol includes in the first direction is reversed when the first modulated symbol corresponds to one of two signal points adjacent to each other in the first constellation, and the polarity of the component that the second modulated symbol includes in the first direction is maintained when the first modulated symbol corresponds to the other of the two signal points.

26. A reception method comprising:
receiving a multiplexed signal on which a first modulated symbol stream and a second modulated symbol stream are superposed at an amplitude ratio, the first modulated symbol stream being generated by mapping a first bit stream of a first data series, the second modulated symbol stream being generated by mapping a second bit stream of a second data series, the first modulated symbol stream and the second modulated symbol stream being representable on a complex plane extending in a first direction and a second direction perpendicular to the first direction; and
deriving at least one of the first data series or the second data series from the multiplexed signal, wherein
the second modulated symbol stream is converted in accordance with the first modulated symbol stream only in the first direction on the complex plane when the multiplexed signal is received.

* * * * *